(12) United States Patent
Gold et al.

(10) Patent No.: US 7,200,259 B1
(45) Date of Patent: Apr. 3, 2007

(54) OPTICAL INSPECTION SYSTEM

(75) Inventors: Uri Gold, Holon (IL); Eli Parente, Rishon le Zion (IL); Tally Gilat-Bernshtein, Yavne (IL); Edward Baranovsky, Rehovot (IL); Tamir Margalit, Mazor (IL)

(73) Assignee: Orbotech Ltd., Yavne (IL)

( * ) Notice: Subject to any disclaimer, the term of this patent is extended or adjusted under 35 U.S.C. 154(b) by 734 days.

(21) Appl. No.: 10/031,045

(22) PCT Filed: Jul. 23, 2000

(86) PCT No.: PCT/IL00/00434

§ 371 (c)(1),
(2), (4) Date: Jan. 14, 2002

(87) PCT Pub. No.: WO01/07893

PCT Pub. Date: Feb. 1, 2001

(30) Foreign Application Priority Data

Jul. 25, 1999 (IL) ...................................... 131092

(51) Int. Cl.
*G06K 9/00* (2006.01)
(52) U.S. Cl. ........................ 382/149; 382/199; 382/299
(58) Field of Classification Search ................ 382/149, 382/151, 162, 167, 173, 181, 190, 199, 204, 382/232, 254, 257, 259, 299
See application file for complete search history.

(56) References Cited

U.S. PATENT DOCUMENTS 4,758,888 A    7/1988    Lapidot ...................... 358/106

(Continued)

FOREIGN PATENT DOCUMENTS

| IL | 81450 | 10/1994 |
|---|---|---|
| WO | WO 00/11454 | 3/2000 |
| WO | WO 00/19372 | 4/2000 |

OTHER PUBLICATIONS

Philippe Pujas and Marie-Jose Aldon, "Robust Colour Image Segmentation", 7th International Conference on Advanced Robotics, San Filiu de Guixols, Spain Sep. 22, 1995.

(Continued)

*Primary Examiner*—Sheela Chawan
(74) *Attorney, Agent, or Firm*—Ladas and Parry LLP

(57) ABSTRACT

This invention discloses a method for determining a location of a border in a color image, the image comprising at least two color populations, between a first color region associated with a first one of the two color populations and a second color region associated with a second one of the two color populations, both the first color region and the second color region being comprised in the color image, the method includes identifying an approximate border location between the first color region and the second color region, determining a plurality of candidate border locations between the first color region and the second color region, each of the plurality of candidate border locations being determined by applying a corresponding border location method chosen from among a plurality of border location methods, choosing one method from among the plurality of border location methods as a preferred method, and determining a location of a border between the first color region and the second color region by designating one of the plurality of candidate border locations associated with the preferred method as the border. An automated optical inspection device suitable for inspection of patterned articles is also disclosed.

48 Claims, 34 Drawing Sheets

U.S. PATENT DOCUMENTS

| | | | | |
|---|---|---|---|---|
| 4,928,313 | A * | 5/1990 | Leonard et al. | 382/149 |
| 5,058,982 | A | 10/1991 | Katzir | 385/33 |
| 5,586,058 | A | 12/1996 | Aloni et al. | 364/552 |
| 5,774,572 | A | 6/1998 | Caspi | 382/141 |
| 5,774,573 | A | 6/1998 | Caspi et al. | 382/141 |
| 6,145,648 | A | 11/2000 | Teichman et al. | 198/468.6 |
| 6,201,892 | B1 * | 3/2001 | Ludlow et al. | 382/149 |
| 6,269,179 | B1 * | 7/2001 | Vachtsevanos et al. | 382/149 |
| 6,456,899 | B1 * | 9/2002 | Gleason et al. | 700/212 |
| 6,586,829 | B1 * | 7/2003 | Yaniv et al. | 257/693 |

OTHER PUBLICATIONS

Leila Shararenko, Maria Petrou and Josef Kittler, Automatic Watershed Segmentation of Randomly Textured Colour Images, IEEE, 1997.

Dorin Comaniciu and Peter Meer, "Distribution Free Decomposition of Multivariate Date", SPR '98, invited Submission, Department of Electrical and Computer Engineering, Rutgers University, Piscataway, NJ 08855, USA.

Liang et al., "Hierarchical Algorithms for Morphological Image Processing", Pattern Recognition, vol. 26, No 4, pp. 511-529, 1993.

Allen et al., "Comparing Color Edge Detection and Segmentation Methods", IEEE Proceedings of the 1989 Southeastcon (Apr. 1989), 722-28.

Allen, J. Thomas, et al. "Comparing Color Edge Detection and Segmentation Methods." Proceedings of Southeast Conference, IEEE, vol. 9 (1989) pp, 722-727.

C. Gonzalez and P. Wintz, *Digital Image Processing*, Addison Wesley, Reading, MA, 1987, Chapters 7 and 8.

John c. Russ, *The Image Processing Handbook*, CRC Press, 1994, Chapters 6 and7.

D. Marr and E. Hildreth, *Theory of Edge Detection*, Proceedings of the Royal Society of London, B 207, pp. 187-217 (1980).

M. Chapron, "A New Chromatic Edge-Detector Used For Color Image Segmentation", 11th APR International Conference on Pattern Recognition.

Philippe Pujas and Marie-Jose Aldon, "Robust Colour Image Segmentation", 7th International Conference on Advanced Robotics, San Filiu de Guixols, Spain Sep. 22, 1995.

Dorin Comaniciu and Peter Meer, "Distribution Free Decomposition of Multivariate Data", SPR '98, Invited Submission, Department of Electrical and Computer Engineering, Rutgers University, Piscataway, NJ 08855, USA.

Liang et al., "Hierarchical Algorithms for Morphological Image Processing", Pattern Recognition, vol. 26, No. 4, pp. 511-529, 1993.

Allen et al., "Comparing Color Edge Detection and Segmentation Methods", IEEE Proceedings of the 1989 Southeastcon (Apr., 1989), 722-28.

Allen, J. Thomas, et al. "Comparing Color Edge Detection and Segmentation Methods," Proceedings of Southeast Conference, IEEE, vol. 9 (1989) pp. 722-727.

\* cited by examiner

FIG. 5

| 1 | 4 | 6 | 4 | 1 |
|---|---|---|---|---|
| 4 | 16 | 24 | 16 | 4 |
| 6 | 24 | 36 | 24 | 6 |
| 4 | 16 | 24 | 16 | 4 |
| 1 | 4 | 6 | 4 | 1 |

FIG. 6

| 1 | 2 | 1 |
|---|---|---|
| 2 | 4 | 2 |
| 1 | 2 | 1 |

FIG. 20
| OKDIR VALUE | DIRECTION FOR MEASUREMENT | GRADIENT OPERATOR |
|---|---|---|
| 0 | DO NOT MEASURE | NONE |
| 1 | 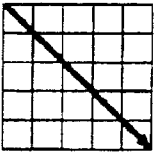 | LINEARDIFF |
| 2 | 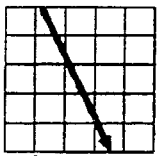 | LINEARDIFF |
| 3 | 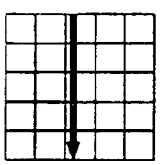 | LINEARDIFF |
| 4 | 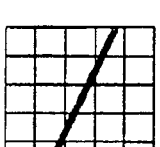 | LINEARDIFF |
| 5 | 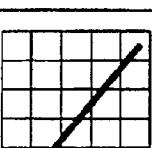 | LINEARDIFF |
| 6 | 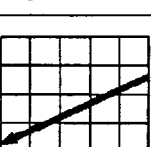 | LINEARDIFF |
| 7 |  | LINEARDIFF |
| 8 | 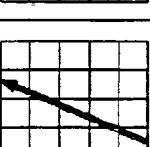 | LINEARDIFF |
| 15 (0xf) | MEASURE IN ALL DIRECTIONS | HALFSOBEL |

FIG. 23A

| 3x3 MATRIX OCCUPATION | SUB OKDIR VALUE | MEANING |
|---|---|---|
| 1) ALL PIXELS ARE MATERIAL PIXELS | 0x80 | MEASURE IN ALL DIRECTIONS; USE SOBEL OPERATORS. |
| 2) C IS EDGE PIXEL | 0x0 | DO NOT MEASURE |
| 3) AT LEAST ONE OF VD PIXELS IS EDGE PIXEL AND BOTH OF HD PIXELS ARE MATERIAL PIXELS | 0x20 | 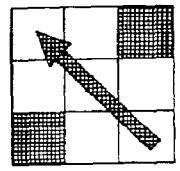 |
| 4) AT LEAST ONE OF HD PIXELS IS EDGE PIXEL AND BOTH OF VD PIXELS ARE MATERIAL PIXELS | 0x40 | 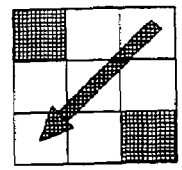 |
| 5) 1-4 DOES NOT EXIST, BOTH VER PIXELS ARE MATERIAL | 0x10 | 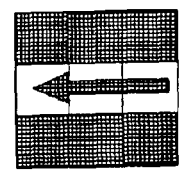 |
| 6) 1-4 DOES NOT EXIST, BOTH HOR PIXELS ARE MATERIAL | 0x08 | 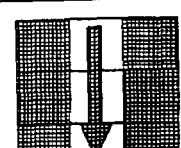 |
| 7) BOTH 5 AND 6 EXIST | 0x18 | 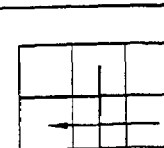 |

FIG. 23B

| HD | VER | VD |
|---|---|---|
| HOR | C | HOR |
| VD | VER | HD |

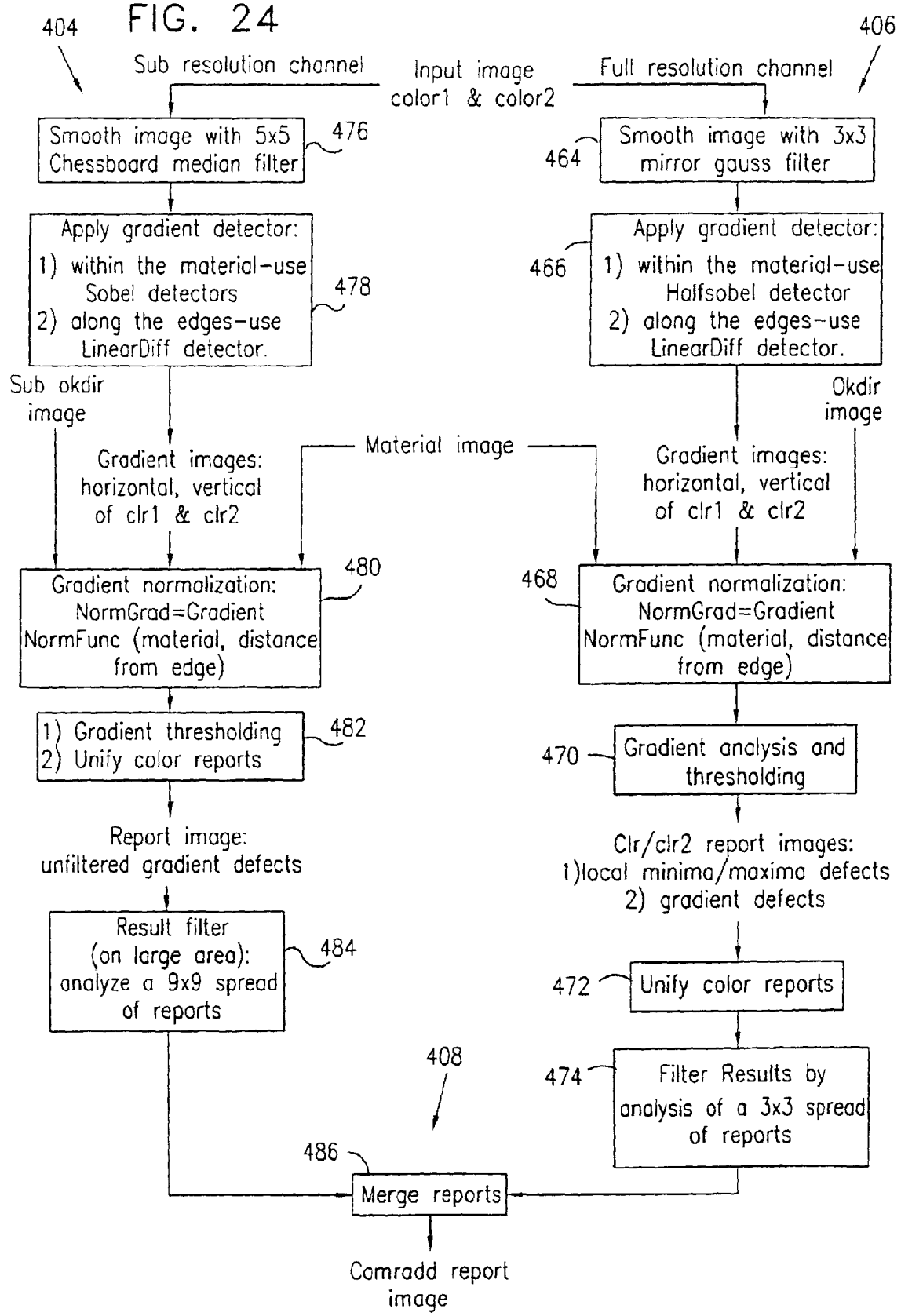

FIG. 27
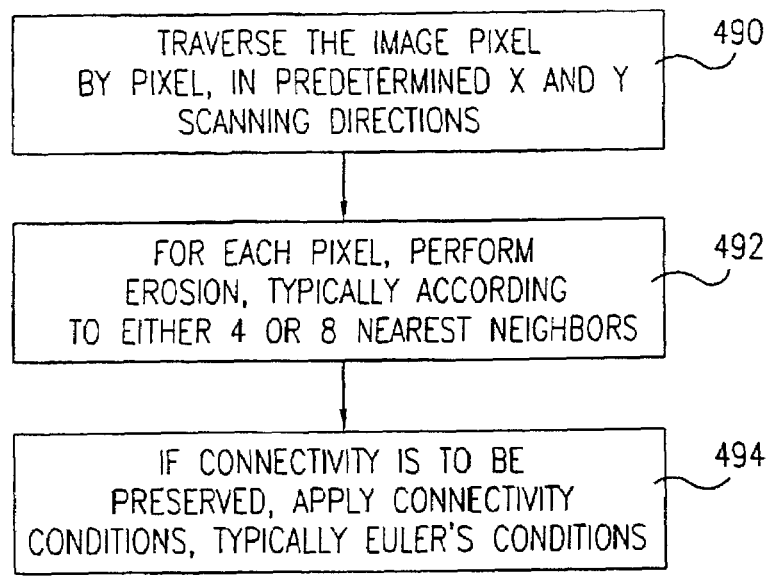
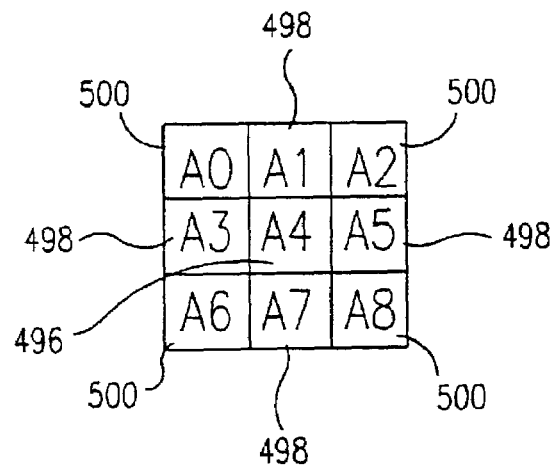
FIG. 28A
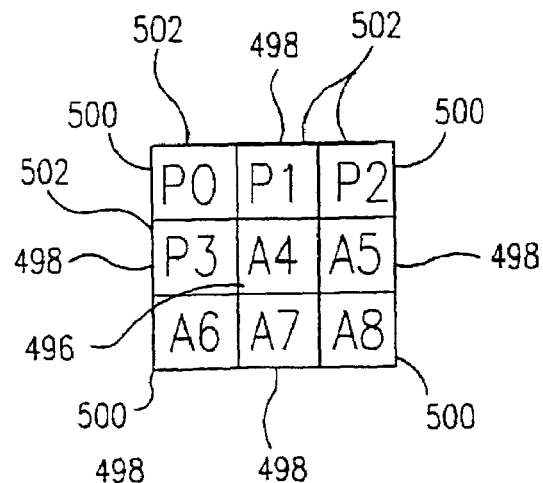
FIG. 28B

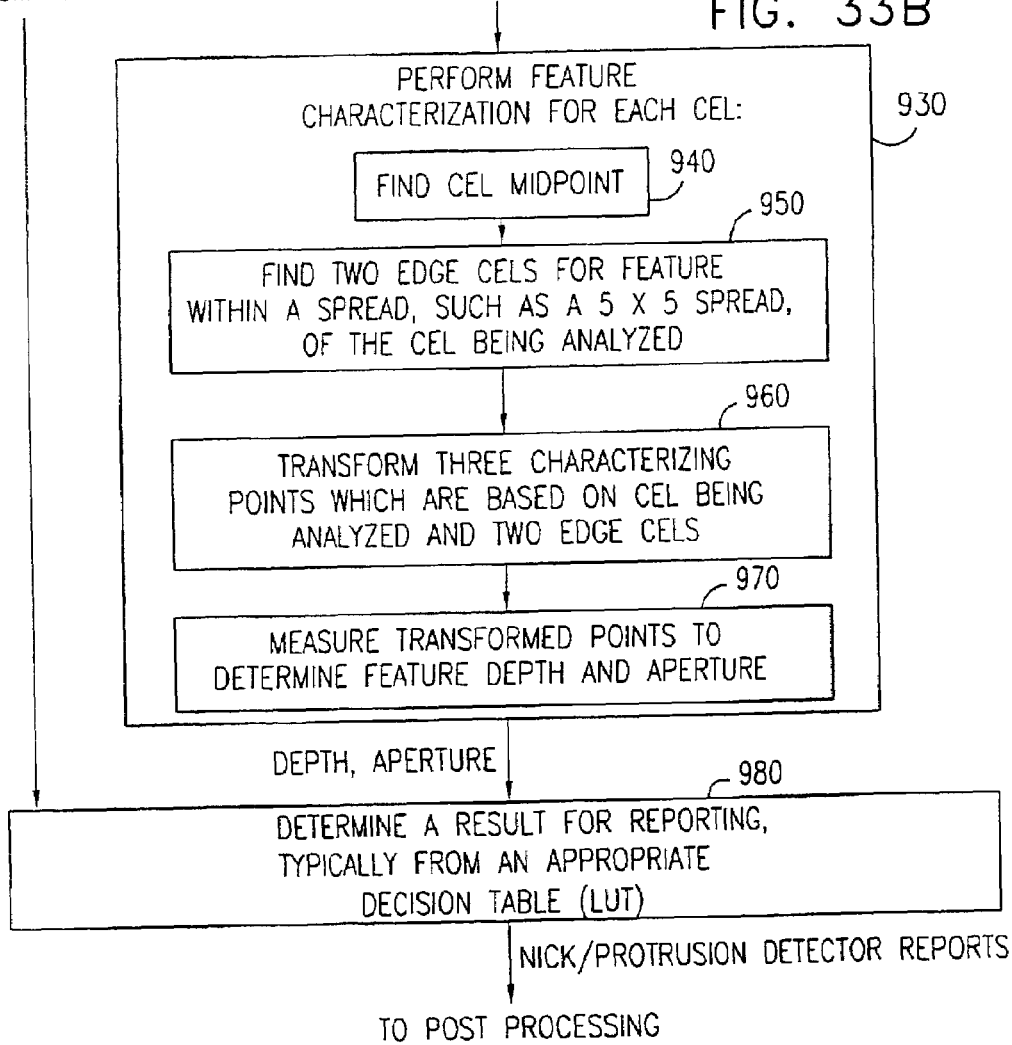
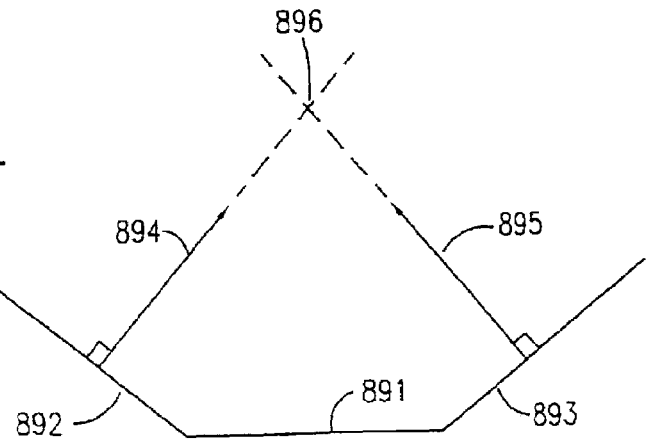

OPTICAL INSPECTION SYSTEM

FIELD OF THE INVENTION

The present invention relates to apparatus and methods for analyzing images, especially but not exclusively color images, and more specifically to apparatus and methods of image analysis which are useful in inspection of a patterned object.

BACKGROUND OF THE INVENTION

Apparatus and methods for analyzing images, and in particular for image analysis which is useful in inspection of a patterned object, are well known in the art.

The following references describe image processing methods which may be useful in understanding the present invention:

C. Gonzalez and P. Wintz, *Digital Image Processing*, Addison Wesley, Reading, Mass., 1987; and John C. Russ, *The Image Processing Handbook*, CRC Press, 1994.

The following references describe edge detection methods which may be useful in understanding the present invention:

D. Marr and E. Hildreth, *Theory of Edge Detection*, Proceedings of the Royal Society of London; and M. Chapron, "A new chromatic edge-detector used for color image segmentation", 11$^{th}$ APR International Conference on Pattern Recognition.

The following references describe color image segmentation methods which may be useful in understanding the present invention:

Philippe Pujas and Marie-Jose Aldon, "Robust Colour Image Segmentation", 7$^{th}$ International Conference on Advanced Robotics, San Filiu de Guixols, Spain, Sep. 22, 1995, and Leila Shararenko, Maria Petrou, and Josef Kittler, "Automatic Watershed Segmentation of Randomly Textured Colour Images, IEEE.

U.S. Pat. No. 4,758,888 to Lapidot describes a method of and means for inspecting workpieces traveling along a production line, including on-line inspection for flaws without interrupting the progress or workpieces along the production line.

U.S. Pat. No. 5,058,982 to Katzir describes an illumination system particularly useful for inspection of a workpiece by an optical scanner.

Israel Patent 81450, owned by Orbotech Ltd., Yavne, Israel, granted Jan. 8, 1995 and entitled "Illumination Device for an Optical Scanner", describes an illumination device particularly suited for use with an optical scanner used in automatic inspection, especially for delivering intense, multi-directional light energy to a target area.

U.S. Pat. No. 5,586,058 to Aloni et al. describes apparatus and methods for inspecting objects and detecting defects therein, including inspecting a binary level representation of the object, inspecting a gray level representation of the object, and preferably reinspecting the grayscale representation of the object to filter false alarms and to classify defects.

U.S. Pat. No. 5,774,572 to Caspi describes an automatic visual inspection system, which is preferably operative to convolve a 2-dimensional digital gray scale image of an object with a filter function related to the second derivative of a Gaussian function forming a 2-dimensional convoluted image have signed values. The location of an edge in the object is achieved by finding zero crossings between adjacent oppositely signed values.

U.S. Pat. No. 5,774,573 to Caspi et al. describes a visual inspection system which uses convolution of a 2-dimensional digital gray scale image of an object with a filter function related to the second derivative of a Gaussian function forming a 2-dimensional convolved imaged having signed values. The convolution of Caspi et al. can be performed with a difference-of-two-Gaussians, one positive and one negative.

PCT Application IL98/00393 describes inspection of printed circuit boards using color, including the use of color to identify certain types of conditions, such as conductor oxidation, using color.

PCT Application IL98/00477 describes methods for analytically representing an image so that morphological operations such as dilation, erosion, and scale measurement may be performed on non-binary pixels, preferably more efficiently than using previous methods.

Methods which may be useful in image analysis are described in the following publication:

Dorin Comaniciu and Peter Meer, "Distribution Free Decomposition of Multivariate Data", SPR '98 Invited Submission, Department of Electrical and Computer Engineering, Rutgers University, Piscataway, N.J. 08855, USA.

The disclosures of all references mentioned above and throughout the present specification are hereby incorporated herein by reference.

SUMMARY OF THE INVENTION

The present invention seeks to provide an improved apparatus and method for visually inspecting objects and analyzing their images, especially but not exclusively color images. The apparatus and methods of the present invention are believed to be particularly applicable to analyzing images of a patterned object, and more particularly, applicable to analyzing images of a patterned object which includes a plurality of elements that have characteristic optical attributes. Objects for which the apparatus and method of the present invention are particularly suited to inspect include ball grid array substrates ("BGA"), printed circuit board substrates, particularly printed circuit board substrates including multiple conductor materials, laminated printed circuit boards, lead frames, flat panel displays, hybrid chip packaging substrates, tape automated bonding substrates, and other similar multi-material patterned objects.

All prior art object inspection systems suffer from certain limitations which make them useful for inspecting only certain types of objects, even if the objects being inspected are limited to the fields of printed circuit boards, integrated circuits, and similar electronic components. The present invention seeks to provide improved apparatus and methods of analyzing images, particularly color images, particularly for the purpose of improving the functionality of object inspection systems, increasing the diversity of objects that can be inspected by the system, and generally reducing the limitations thereof.

It is believed that improved color processing may be particularly effective in analyzing images of multi-colored objects, particularly in cases where adjacent colored areas in the multi-colored objects have colors which are difficult to distinguish from each other in a monochrome image. For example, in the case of inspection of a ball grid array substrate or a laminated printed circuit board, it may be desirable to distinguish between areas which are, on the surface thereof, gold and areas which are, on the surface thereof, copper, and to distinguish between metallic areas which are covered by partially transparent masks and areas which are uncovered. Similarly, areas which are, on the surface thereof, silver may be distinguished from other areas. It is believed that distinguishing between such areas may be accomplished more effectively using the methods and apparatus of the present invention than in the prior art.

In the case of a ball grid array substrate, by way of example only, other areas among which it may be desirable to distinguish or characterize, using the apparatus and methods of the present invention, include: a bare substrate, a metal coating such as gold plating over copper pads and connectors; the existence of an at least partially transparent coating, such as a solder mask, covering copper connectors, gold plated connectors or substrate; different substances such as copper connector or gold plated connectors lying under an at least partially transparent coating such as a solder mask; surface residues such as, for example, a photoresist residue; voids in a metal coating; surface irregularities; scratches; foreign materials; stains; and oxidation of copper connectors or gold plating. It may also be desirable to distinguish the shape of an area such as a metal connector, a metal coating or a surface mark. The examples given immediately above are intended to be by way of example and not to be limiting, it being appreciated that it may be desirable to distinguish or characterize many kinds of areas. It is believed that the apparatus and methods which form the current invention are sufficiently flexible to enable inspection and image analysis for many different materials and materials combinations on objects, such as BGAs, under inspection.

It is appreciated that different regions in BGAs, as referred to above, will generally have different colors, color populations or other optical characteristics as described below, and that different areas may therefore be distinguished by distinguishing the colors and optical characteristics thereof. It is particularly noted in this regard that different substances, including different metals, and materials lying under a partially transparent coating, such as a solder mask, may generally be distinguished and classified, using the present invention, accordance with the different colors and other optical characteristics thereof.

The present invention also seeks to provide improvements in processing of monochrome images, especially in applications similar to those mentioned above with respect to color images.

There is thus provided in accordance with a preferred embodiment of the present invention a method for determining a location of a border in a color image, the image including at least two color populations, between a first color region associated with a first one of the two color populations and a second color region associated with a second one of the two color populations, both the first color region and the second color region being included in the color image, the method including identifying an approximate border location between the first color region and the second color region, determining a plurality of candidate border locations between the first color region and the second color region, each of the plurality of candidate border locations being determined by applying a corresponding border location method chosen from among a plurality of border location methods, choosing one method from among the plurality of border location methods as a preferred method, and determining a location of a border between the first color region and the second color region by designating one of the plurality of candidate border locations associated with the preferred method as the border.

Further in accordance with a preferred embodiment of the present invention the color image includes an image of a patterned article.

Still further in accordance with a preferred embodiment of the present invention the color image includes a color image of an electrical circuit.

Additionally in accordance with a preferred embodiment of the present invention the color image includes a color image of a lead frame.

Moreover in accordance with a preferred embodiment of the present invention the preferred border location method is chosen based on a rule for choosing a preferred border location method for a predetermined combination of color populations.

Further in accordance with a preferred embodiment of the present invention the preferred border location method is chosen based on comparison of the border location result from applying at least two border location methods.

There is also provided in accordance with another preferred embodiment of the present invention a method for determining a location of a border in a color image, the image including at least two color populations, between a first color region associated with a first one of the two color populations and a second color region associated with a second one of the two color populations, both the first color region and the second color region being included in the color image, the method including providing a border analysis map including, for each distinct pair of color populations, an indication of a preferred method for identifying the location of a border between the color populations, identifying an approximate border location between the first color region and the second color region, and determining a location of a border between the first color region and the second color region by using the preferred method indicated, in the border analysis map, for identifying the location of a border between the first color population and the second color population.

Further in accordance with a preferred embodiment of the present invention the color image includes an image of a patterned article.

Still further in accordance with a preferred embodiment of the present invention the color image includes a color image of an electrical circuit.

Additionally in accordance with a preferred embodiment of the present invention the color image includes a color image of a lead frame.

Moreover in accordance with a preferred embodiment of the present invention the electrical circuit includes a printed circuit board.

Further in accordance with a preferred embodiment of the present invention the color image includes a color image of an object, and each color population is associated with one material of a plurality of available materials Still further in accordance with a preferred embodiment of the present invention the color image also includes a third color region associated with a third color population, and the identifying step includes, for each two color regions among the first color region, the second color region, and the third color region which border each other, identifying an approximate border location between the two color regions, and the determining step includes, for each the two color regions, determining a location of a border between the two color regions by using the preferred method indicated, in the border analysis map, for identifying the location of a border between the two color populations associated with the two color regions.

Additionally in accordance with a preferred embodiment of the present invention the method also includes defining a window having a window size, examining a portion of the color image falling within the window to determine the number of distinct color regions at least a part of which are included in the portion, and if the number of distinct color regions is greater than two, classifying all borders within the window as belonging to a junction and determining a location of each border within the window using a preferred method for determining the location of a border belonging to a junction.

Moreover in accordance with a preferred embodiment of the present invention the preferred method for determining the location of a border belonging to a junction includes a high-water-mark method.

Further in accordance with a preferred embodiment of the present invention the color image is represented using a color image representation method having a plurality of color defining characteristics, and each preferred method is selected from a plurality of available methods, and the plurality of available methods includes, for each color defining characteristic within the plurality of color defining characteristics, a method including performing an edge locating method in a component of the color image associated with the color defining characteristic.

Still further in accordance with a preferred embodiment of the present invention the performing an edge locating method in a component includes performing a sub-pixel contour-element locating method.

Additionally in accordance with a preferred embodiment of the present invention the performing an edge locating method only in a component includes performing a high-water-mark method.

Moreover in accordance with a preferred embodiment of the present invention the color image representation method includes an RGB method and the plurality of color defining characteristics includes an R component, a G component, and a B component.

Further in accordance with a preferred embodiment of the present invention the color image representation method includes an HSI method and the plurality of color defining characteristics includes an H component, and S component, and an I component.

There is also provided in accordance with another preferred embodiment of the present invention a method for producing a color morphology map from a color image, the method including providing a color image, reducing the color image to produce a reduced image including a plurality of color populations, determining borders between adjacent ones of the plurality of color populations in the reduced image, segmenting the reduced image to produce a binary image including borders and at least one non-border region, producing a skeleton image of the at least one non-border region, the skeleton image including a plurality of portions, and assigning to each portion of the skeleton a color identity corresponding to one of the color populations.

Further in accordance with a preferred embodiment of the present invention the assigning step includes assigning a color population as a function of the spatial location of a portion of the skeleton relative to the color population.

Still further in accordance with a preferred embodiment of the present invention the assigning step further includes superimposing the skeleton image on the reduced image.

Additionally in accordance with a preferred embodiment of the present invention the color image includes a 24 bit color image.

Moreover in accordance with a preferred embodiment of the present invention the reduced image includes a 3 bit image, and the plurality of color populations includes at most 8 color populations.

Further in accordance with a preferred embodiment of the present invention the determining step includes determining borders to an accuracy of one pixel.

Still further in accordance with a preferred embodiment of the present invention the method also includes identifying the presence of at least one morphological feature based, at least in part, on a result of the method.

Additionally in accordance with a preferred embodiment of the present invention the color image includes an image of an patterned article.

Moreover in accordance with a preferred embodiment of the present invention the patterned article includes an electrical circuit.

There is also provided in accordance with another preferred embodiment of the present invention a method for determining color contour elements (cels) in a color image, the method including providing a color image, reducing the color image to produce a reduced image including a plurality of color populations, determining borders between adjacent ones of the plurality of color populations, the borders including a plurality of border segments each border segment being surrounded by two color populations, and for each border segment, assigning a value to the border segment based, at least in part, on the two color populations surrounding the border segment.

Further in accordance with a preferred embodiment of the present invention the color image includes a 24 bit color image.

Still further in accordance with a preferred embodiment of the present invention the reduced image includes a 3 bit image.

Additionally in accordance with a preferred embodiment of the present invention the determining step includes determining borders to an accuracy of one pixel.

Moreover in accordance with a preferred embodiment of the present invention the determining step includes determining borders to an accuracy of less than one pixel.

Further in accordance with a preferred embodiment of the present invention each border segment has a first side and a second side, and the assigning step includes assigning a value based, at least in part, on the color population on the first side of the border segment and on the color population on the second side of the border segment.

Still further in accordance with a preferred embodiment of the present invention the color image includes an image of an patterned article.

Additionally in accordance with a preferred embodiment of the present invention the patterned article includes an electrical circuit.

There is also provided in accordance with another preferred embodiment of the present invention a method for identifying irregularities in a smooth curve in an image, the method including identifying an ordered plurality of points along the smooth curve, each of the ordered plurality of points having at least one neighboring point in the ordered plurality of points, determining a normal direction to the smooth curve at each of the ordered plurality of points, and identifying a point of the ordered plurality of points as being part of an irregularity based, at least in part, on a local normal difference including a difference between the normal direction to the smooth curve at the point and a normal direction to the smooth curve at the at least one neighboring point of the point.

Further in accordance with a preferred embodiment of the present invention the image includes an image of a patterned article.

Still further in accordance with a preferred embodiment of the present invention the image includes an image of an electrical circuit.

Additionally in accordance with a preferred embodiment of the present invention the local normal difference includes a difference in direction of more than a predetermined angle.

Moreover in accordance with a preferred embodiment of the present invention the predetermined angle includes an angle of approximately 22 degrees.

Further in accordance with a preferred embodiment of the present invention the image includes a multiplicity of pixels and each of the ordered plurality of points is associated with one pixel.

Still further in accordance with a preferred embodiment of the present invention each pixel included in the smooth curve is associated with one of the ordered plurality of points.

Additionally in accordance with a preferred embodiment of the present invention only some pixels included in the smooth curve are associated with one of the ordered plurality of points.

Moreover in accordance with a preferred embodiment of the present invention the some pixels are chosen so that a fixed number of pixels not associated with one of the ordered plurality of points falls between each one of the ordered plurality of points and each the at least one neighbor of each one of the ordered plurality of points.

Further in accordance with a preferred embodiment of the present invention the method also includes determining a feature depth and feature aperture for the irregularity, and classifying the feature based, at least in part, on a result of the determining step.

Still further in accordance with a preferred embodiment of the present invention the classifying includes classifying into one of a predetermined set of categories including at least one of the following categories: a nick, a protrusion, and a contour.

Additionally in accordance with a preferred embodiment of the present invention the method includes a method for detecting an irregularity in an electrical circuit, the method including identifying an irregularity in a smooth curve representing a border between two materials in an image of the electrical circuit in accordance with the method.

There is also provided in accordance with another preferred embodiment of the present invention a method for classifying an irregularity in an image of an object, the method including determining a feature depth and feature aperture for the irregularity, and classifying the feature based, at least in part, on a result of the determining step.

Further in accordance with a preferred embodiment of the present invention the object includes an electrical circuit.

Still further in accordance with a preferred embodiment of the present invention the classifying includes classifying into one of a predetermined set of categories including at least one of the following categories: a nick, a protrusion, and a contour.

There is also provided in accordance with another preferred embodiment of the present invention a method for identifying a defect in a portion of an image of an object, the portion being close to a location in the image identified as an edge, the method including identifying an excluded direction associated with the edge, and searching for defects, close to the location identified as an edge, in a plurality of directions not including the excluded direction.

Further in accordance with a preferred embodiment of the present invention the object includes an electrical circuit.

Still further in accordance with a preferred embodiment of the present invention the excluded direction includes a direction perpendicular to the edge.

Additionally in accordance with a preferred embodiment of the present invention the defect includes a scratch.

Moreover in accordance with a preferred embodiment of the present invention the defect includes a stain.

There is also provided in accordance with another preferred embodiment of the present invention a method for identifying a surface defect in an image of an object, the image including a multiplicity of pixels, the method including choosing a region in which a surface defect is to be identified, subsampling the region thereby producing a subsampled image of the region, analyzing the subsampled image and identifying therefrom a surface defect in the region.

Further in accordance with a preferred embodiment of the present invention the image includes a color image of an electrical circuit.

Still further in accordance with a preferred embodiment of the present invention the subsampling includes subsampling non-adjacent pixels.

Additionally in accordance with a preferred embodiment of the present invention separation of non-adjacent pixels respective of adjacent pixels includes a subsampling ratio.

Moreover in accordance with a preferred embodiment of the present invention the subsampling ratio is between approximately 113 and approximately 149.

Further in accordance with a preferred embodiment of the present invention the subsampling includes subsampling in accordance with an approximate average distance between subsampled pixels.

Still further in accordance with a preferred embodiment of the present invention the approximate average distance between subsampled pixels is between approximately 5 pixels and approximately 11 pixels.

Additionally in accordance with a preferred embodiment of the present invention the subsampling step includes subsampling a portion of the region, and the subsampling step is performed a plurality of times using a plurality of portions of the region.

Moreover in accordance with a preferred embodiment of the present invention at least two of the plurality of portions of the region include partially overlapping portions of the region.

There is also provided in accordance with another preferred embodiment of the present invention a method for applying an image processing operator to a pixel in an array of pixels to produce a value, the method including providing an n×n spread of a central pixel, if the central pixel includes an edge pixel, assigning the value 0 to a result, if the central pixel does not include an edge pixel, performing the following steps for each one pixel in the n×n spread if the one pixel is not an edge pixel, choosing the one pixel as a chosen pixel, if the one pixel is an edge pixel and a mirror image of the one pixel within the n×n spread is not an edge pixel, choosing the mirror image as the chosen pixel, otherwise choosing the central pixel as the chosen pixel, and adding to the sum a product of the value of the chosen pixel and the result of applying a Gaussian operator to the central pixel, and dividing the sum by the square of (n+1) to produce a result.

Further in accordance with a preferred embodiment of the present invention n is equal to 3.

There is also provided in accordance with another preferred embodiment of the present invention a method for computing a gradient with a convoluted operator including providing an image processing operator in the form of an n×n array of values, wherein n is an odd integer and the central value of the n×n array may take on either a positive value or a negative value, applying the image processing operator with the central value having a positive value to produce a first intermediate result, applying the image processing operator with the central value having a negative value to produce a second intermediate result, and summing the first intermediate result and the second intermediate result to produce a final result.

Further in accordance with a preferred embodiment of the present invention the method also includes comparing the arithmetic sign of the first intermediate result and the arithmetic sign of the second intermediate result, and determining the presence of a local extremum based on a result of the comparing step.

Still further in accordance with a preferred embodiment of the present invention the determining includes determining with less than complete certainty.

Additionally in accordance with a preferred embodiment of the present invention n is equal to 5.

There is also provided in accordance with another preferred embodiment of the present invention an automated optical inspection device suitable for inspection of patterned articles including at least one detector providing a polychromatic image output of at least a portion of a patterned article having a plurality of elements, and processing circuitry receiving the polychromatic image output and providing at least one of the following inspection functionalities inspection of a metal coating on at least one of the elements in the plurality of elements, and inspection of an at least partially transparent coating on at least one element in the plurality of elements.

There is also provided in accordance with still another preferred embodiment of the present invention an automated optical inspection device suitable for inspection of patterned articles including at least one detector providing a polychromatic image output of at least a portion of a patterned article including a plurality of elements, and processing circuitry receiving the polychromatic image output and providing the following inspection functionalities: inspection of a metal coating on at least one element in the plurality of elements, and inspection of an at least partially transparent coating on at least one element in the plurality of elements.

Further in accordance with a preferred embodiment of the present invention the processing circuitry receiving the polychromatic image output provides the following additional inspection functionality: detection of residues on a surface of the patterned article.

Still further in accordance with a preferred embodiment of the present invention the processing circuitry receiving the polychromatic image output provides the following additional inspection functionality: detection of residues on a surface of the patterned article.

Additionally in accordance with a preferred embodiment of the present invention the functionality of inspection of a metal coating on at least one of the elements in the plurality of elements includes at least one of the following inspection modalities: detection of voids in the metal coating, detection of surface irregularities in the metal coating, detection of scratches in the metal coating, detection of the presence of foreign materials on the metal coating, detection of stains on the metal coating, detection of oxidation of the metal coating, and detection of the shape of the metal coating.

Moreover in accordance with a preferred embodiment of the present invention the functionality of inspection of a metal coating on at least one of the elements in the plurality of elements includes at least one of the following inspection modalities: detection of voids in the metal coating, detection of surface irregularities in the metal coating, detection of scratches in the metal coating, detection of the presence of foreign materials on the metal coating, detection of stains on the metal coating, detection of oxidation of the metal coating, and detection of the shape of the metal coating.

Further in accordance with a preferred embodiment of the present invention the functionality of inspection of an at least partially transparent coating on at least one of the elements in the plurality of elements includes at least one of the following inspection modalities: detection of voids in the at least partially transparent coating, detection of surface irregularities in the at least partially transparent coating, detection of scratches in the at least partially transparent coating, detection of the presence of foreign materials on the at least partially transparent coating, detection of stains on the at least partially transparent coating, and detection of the shape of the at least partially transparent coating.

Still further in accordance with a preferred embodiment of the present invention the functionality of inspection of an at least partially transparent coating on at least one of the elements in the plurality of elements includes at least one of the following inspection modalities: detection of voids in the at least partially transparent coating, detection of surface irregularities in the at least partially transparent coating, detection of scratches in the at least partially transparent coating, detection of the presence of foreign materials on the at least partially transparent coating, detection of stains on the at least partially transparent coating, and detection of the shape of the at least partially transparent coating.

Additionally in accordance with a preferred embodiment of the present invention the functionality of detection of residues on a surface of the patterned article includes at least one of the following detection modalities: detection of surface irregularities on a surface of the patterned article, detection of the presence of foreign materials on a surface of the patterned article, detection of stains on a surface of the patterned article, and detection of the shape of marks on a surface of the patterned article.

Moreover in accordance with a preferred embodiment of the present invention the functionality of detection of residues on a surface of the patterned article includes at least one of the following detection modalities: detection of surface irregularities on a surface of the patterned article, detection of the presence of foreign materials on a surface of the patterned article, detection of stains on a surface of the patterned article, and detection of the shape of marks on a surface of the patterned article.

Further in accordance with a preferred embodiment of the present invention the patterned article includes an electrical circuit.

Still further in accordance with a preferred embodiment of the present invention the elements include conductors in the electrical circuit.

Additionally in accordance with a preferred embodiment of the present invention the electrical circuit includes a printed circuit board.

Moreover in accordance with a preferred embodiment of the present invention the electrical circuit includes a ball grid array substrate.

Further in accordance with a preferred embodiment of the present invention the patterned article comprises a lead frame.

Still further in accordance with a preferred embodiment of the present invention the metal coating includes a metal plating.

Additionally in accordance with a preferred embodiment of the present invention the elements include balls in the ball grid array substrate.

Moreover in accordance with a preferred embodiment of the present invention the patterned article includes an etched metal substrate.

Further in accordance with a preferred embodiment of the present invention the patterned article includes an engraved metal substrate.

There is also provided in accordance with another preferred embodiment of the present invention an automated optical inspection device suitable for inspection of an article and including at least one detector providing a polychromatic image output of at least a portion of an article, and processing circuitry receiving the polychromatic image output and providing edge detection to sub-pixel accuracy operative to distinguish borders among regions of different color.

Further in accordance with a preferred embodiment of the present invention the processing circuitry is operative to distinguish a border between a first color region associated with a first color population and a second color region associated with a second color population by identifying an approximate border location between the first color region and the second color region and determining a location of a border between the first color region and the second color region by using a preferred method for identifying the location of a border between the first color population and the second color population.

Still further in accordance with a preferred embodiment of the present invention the polychromatic image output includes a color image represented using a color image representation method having a plurality of color defining characteristics, and each preferred method is selected from a plurality of available methods, and the plurality of available methods includes, for each color defining characteristic within the plurality of color defining characteristics, a method including performing an edge locating method in a component of the color image associated with the color defining characteristic.

Additionally in accordance with a preferred embodiment of the present invention the edge locating method includes a sub-pixel contour-element locating method.

There is also provided in accordance with another preferred embodiment of the present invention an automated optical inspection device suitable for inspection of an article and including at least one detector providing an image output of at least a portion of an article having at least three different regions, each of which regions is distinguished at least by an optical characteristic detectable by the detector, and processing circuitry receiving the image output and providing edge detection to sub-pixel accuracy operative to distinguish borders of at least two of the at least three different regions.

Further in accordance with a preferred embodiment of the present invention the processing circuitry receives the image output and provides edge detection to sub-pixel accuracy operative to distinguish borders of the at least three different regions.

Still further in accordance with a preferred embodiment of the present invention the processing circuitry provides mapping based at least partially on the image output which identifies materials in each of the different regions having a common border.

There is also provided in accordance with another preferred embodiment of the present invention an automated optical inspection device suitable for inspection of an article and including at least one detector providing an image output of at least a portion of an article, and processing circuitry receiving the image output and providing mapping based at least partially on the image output which identifies materials in each of different regions of the at least a portion of the article having a common border.

Further in accordance with a preferred embodiment of the present invention the processing circuitry is operative to sub-pixel accuracy.

There is also provided in accordance with another preferred embodiment of the present invention an automated optical inspection device suitable for inspection of an article including at least one detector providing a polychromatic image output of at least a portion of an article, processing circuitry receiving the polychromatic image output and providing at least one of the following inspection functionalities segmentation of the polychromatic image into a segmented color image including a plurality of color regions each having one of a plurality of representative color possibilities, binarization of the segmented color image into a binary image including regions and borders, morphological erosion of the regions to provide a skeleton representing the regions, and assignment of color regions to elements in the skeleton.

Further in accordance with a preferred embodiment of the present invention the processing circuitry is operative to superimpose the skeleton and the segmented color image, and to assign data representative of regions to elements in the skeleton as a function of the superimposition.

Still further in accordance with a preferred embodiment of the present invention the processing circuitry is operative to assign data representative of regions to elements in the skeleton the superimposed location of an element of the skeleton in a color region.

There is also provided in accordance with another preferred embodiment of the present invention an automated optical inspection device suitable for inspection of an article including at least one detector providing a polychromatic image output of at least a portion of an article, and processing circuitry receiving the polychromatic image output and operative to segment the polychromatic image into plurality of color regions chosen from among a predefined number of color region possibilities, and to generate a representation of the polychromatic image including color region data representing each color region in the image, and border data for representing each border among color regions.

There is also provided in accordance with still another preferred embodiment of the present invention a color image representing a patterned article, the color image including a morphologically eroded polychromatic image of the patterned article.

Further in accordance with a preferred embodiment of the present invention colors of portions of the morphologically eroded polychromatic image indicate materials at various regions of the patterned article.

Still further in accordance with a preferred embodiment of the present invention the patterned article includes an electrical circuit.

Additionally in accordance with a preferred embodiment of the present invention the elements include conductors in the electrical circuit.

Moreover in accordance with a preferred embodiment of the present invention the electrical circuit includes a printed circuit board.

Further in accordance with a preferred embodiment of the present invention the electrical circuit includes a ball grid array substrate.

Still further in accordance with a preferred embodiment of the present invention the patterned article includes a lead frame.

Additionally in accordance with a preferred embodiment of the present invention the metal coating includes a metal plating.

Moreover in accordance with a preferred embodiment of the present invention the elements include balls in the ball grid array substrate.

Further in accordance with a preferred embodiment of the present invention the patterned article includes an etched metal substrate.

Still further in accordance with a preferred embodiment of the present invention the patterned article includes an engraved metal substrate.

There is also provided in accordance with another preferred embodiment of the present invention an automated optical inspection device suitable for inspection of an article including at least one detector providing a polychromatic image output of at least a portion of an article, and processing circuitry receiving the polychromatic image output and providing a color image representing the article, the color image including a morphologically eroded polychromatic image of at least part of the article.

Further in accordance with a preferred embodiment of the present invention colors of portions of the morphologically eroded polychromatic image indicate materials at various regions of the article.

There is also provided in accordance with another preferred embodiment of the present invention a color image representing a patterned article, the color image including a map which indicates borders between different regions of an article and identifies materials in each of the different regions having a common border.

Further in accordance with a preferred embodiment of the present invention colors of portions of the map indicate materials at the different regions.

Still further in accordance with a preferred embodiment of the present invention each color includes one color from a predetermined possibility of colors.

Additionally in accordance with a preferred embodiment of the present invention the patterned article includes an electrical circuit.

Moreover in accordance with a preferred embodiment of the present invention the elements include conductors in the electrical circuit.

Further in accordance with a preferred embodiment of the present invention the electrical circuit includes a printed circuit board.

Still further in accordance with a preferred embodiment of the present invention the electrical circuit includes a ball grid array substrate.

Additionally in accordance with a preferred embodiment of the present invention the patterned article includes a lead frame.

Moreover in accordance with a preferred embodiment of the present invention the metal coating includes a metal plating.

Further in accordance with a preferred embodiment of the present invention the elements include balls in the ball grid array substrate.

Still further in accordance with a preferred embodiment of the present invention the patterned article includes an etched metal substrate.

Additionally in accordance with a preferred embodiment of the present invention the patterned article includes an engraved metal substrate.

There is also provided in accordance with another preferred embodiment of the present invention an automated optical inspection device suitable for inspection of an article including at least one detector providing a polychromatic image output of at least a portion of an article, and processing circuitry receiving the polychromatic image output and providing a color image representing the article, the color image including a map which indicates borders between different regions of an article and identifies materials in each of the different regions having a common border.

Further in accordance with a preferred embodiment of the present invention colors of portions of the map indicate materials at various regions of the article.

Still further in accordance with a preferred embodiment of the present invention the processing circuitry receives the image output and provides border indication to sub-pixel accuracy.

Additionally in accordance with a preferred embodiment of the present invention each color includes a color chosen from among a predetermined possibility of colors.

Moreover in accordance with a preferred embodiment of the present invention the patterned article includes an electrical circuit.

Further in accordance with a preferred embodiment of the present invention the electrical circuit includes a printed circuit board.

Still further in accordance with a preferred embodiment of the present invention the electrical circuit includes a ball grid array substrate.

Additionally in accordance with a preferred embodiment of the present invention the patterned article includes a lead frame.

Moreover in accordance with a preferred embodiment of the present invention the different materials include different metals.

Further in accordance with a preferred embodiment of the present invention the different regions include uncoated metal conductors, coated metal conductors, uncoated substrate, and coated substrate.

Still further in accordance with a preferred embodiment of the present invention the patterned article includes an etched metal substrate.

Additionally in accordance with a preferred embodiment of the present invention the patterned article includes an engraved metal substrate.

There is also provided in accordance with another preferred embodiment of the present invention an automated optical inspection device suitable for inspection of a patterned article including at least one detector providing an image output of at least a portion of a patterned article including at least three materials having detectable edges, and processing circuitry receiving the image output and providing an inspection functionality including binarization of the image output to provide a binary image including region image data and border image data.

Further in accordance with a preferred embodiment of the present invention the patterned article includes an electrical circuit.

Still further in accordance with a preferred embodiment of the present invention the electrical circuit includes a printed circuit board.

Additionally in accordance with a preferred embodiment of the present invention the printed circuit board includes a ball grid array substrate.

Moreover in accordance with a preferred embodiment of the present invention the patterned article includes a lead frame.

Further in accordance with a preferred embodiment of the present invention the patterned article includes an etched metal substrate.

Still further in accordance with a preferred embodiment of the present invention the patterned article includes an engraved metal substrate.

There is also provided in accordance with another preferred embodiment of the present invention an automated optical inspection device suitable for inspection of a patterned article including at least one detector providing an image output of at least a portion of a patterned article including a plurality of materials having detectable borders between the plurality of materials, and processing circuitry receiving the image output and providing an inspection functionality including pattern analysis of image data relating to the borders to provide an indication of the presence of nicks and protrusions along the borders.

Further in accordance with a preferred embodiment of the present invention the patterned article includes an electrical circuit.

Still further in accordance with a preferred embodiment of the present invention the patterned article includes a printed circuit board.

Additionally in accordance with a preferred embodiment of the present invention the printed circuit board includes a ball grid array substrate.

Moreover in accordance with a preferred embodiment of the present invention the patterned article includes a lead frame.

Further in accordance with a preferred embodiment of the present invention the plurality of materials includes at least three materials.

Still further in accordance with a preferred embodiment of the present invention the materials include materials from the following group uncoated metal conductors, coated material conductors, uncoated substrate, coated substrate.

Additionally in accordance with a preferred embodiment of the present invention the patterned article includes an etched metal substrate.

Moreover in accordance with a preferred embodiment of the present invention the patterned article includes an engraved metal substrate.

Further in accordance with a preferred embodiment of the present invention wherein the inspection functionality including pattern analysis includes identifying an ordered plurality of points along a border defined by the image data relating to the borders, each of the ordered plurality of points having at least one neighboring point in the ordered plurality of points, determining a normal direction to the smooth curve at each of the ordered plurality of points, and identifying a point of the ordered plurality of points as being part of an irregularity including one of a nick and a protrusion based, at least in part, on a local normal difference including a difference between the normal direction to the smooth curve at the point and a normal direction to the smooth curve at the at least one neighboring point of the point.

There is also provided in accordance with another preferred embodiment of the present invention an automated optical inspection device suitable for inspection of an article including at least one detector providing an image output of at least a portion of an article including multiple materials having detectable borders between the materials, and processing circuitry receiving the image output and providing at least one of the following inspection functionalities: segmentation of the image output into a segmented image including region image data and border image data, analysis of the region image data using a first technique, and analysis of the border image data using a second technique, different from the first technique.

Further in accordance with a preferred embodiment of the present invention the article includes an electrical circuit.

Still further in accordance with a preferred embodiment of the present invention the first technique includes neighborhood analysis and the second technique includes border following analysis for differentiating border-near pixels from non-border-near pixels.

There is also provided in accordance with another preferred embodiment of the present invention an automated optical inspection device suitable for inspection of an article including at least one detector providing a polychromatic image output of at least a portion of an article including multiple materials having detectable borders between the materials, and processing circuitry receiving the polychromatic image output and providing at least one of the following inspection functionalities: segmentation of the polychromatic image output into a segmented color image including color regions chosen from among a set of predetermined colors, analysis of the region image data relating to a first color using a first technique, and analysis of the region image data relating to a second color using a second technique, different from the first technique.

Further in accordance with a preferred embodiment of the present invention the article includes an electrical circuit.

Still further in accordance with a preferred embodiment of the present invention the electrical circuit includes a printed circuit board.

Additionally in accordance with a preferred embodiment of the present invention the printed circuit board includes a ball grid array substrate.

Moreover in accordance with a preferred embodiment of the present invention the article includes a lead frame.

There is also provided in accordance with another preferred embodiment of the present invention an automated optical inspection device suitable for inspection of an article including at least one detector providing an image output of at least a portion of an article including multiple materials having detectable borders between the materials, and processing circuitry receiving the image output and providing at least one of the following inspection functionalities: segmentation of the image output into a segmented image including region image data and border image data, and smoothing the region image data in a manner not influenced by at least some of the border image data.

Further in accordance with a preferred embodiment of the present invention the article includes an electrical circuit.

Still further in accordance with a preferred embodiment of the present invention the electrical circuit includes a printed circuit board.

Additionally in accordance with a preferred embodiment of the present invention the printed circuit board includes a ball grid array substrate.

Moreover in accordance with a preferred embodiment of the present invention the article includes a lead frame.

There is also provided in accordance with another preferred embodiment of the present invention an automated optical inspection device suitable for inspection of an electrical circuit including at least one detector providing an image output of at least a portion of an electrical circuit including multiple materials, and processing circuitry receiving the image output and providing an output indication of the presence of at least one predetermined material.

Further in accordance with a preferred embodiment of the present invention the electrical circuit includes a printed circuit board.

Still further in accordance with a preferred embodiment of the present invention the printed circuit board includes a ball grid array substrate.

Additionally in accordance with a preferred embodiment of the present invention the electrical circuit includes a flat panel display substrate.

Moreover in accordance with a preferred embodiment of the present invention the processing circuitry provides an output indication of the presence of at least two materials out of a group of at least three predetermined materials.

Further in accordance with a preferred embodiment of the present invention the processing circuitry provides an output indication of the presence of at least three predetermined materials.

Still further in accordance with a preferred embodiment of the present invention the processing circuitry provides an output indication of the presence of copper.

Additionally in accordance with a preferred embodiment of the present invention the processing circuitry provides an output indication of the presence of gold.

Moreover in accordance with a preferred embodiment of the present invention the processing circuitry provides an output indication of the presence of a solder mask material.

Further in accordance with a preferred embodiment of the present invention the processing circuitry provides an output indication of the presence of silver.

Still further in accordance with a preferred embodiment of the present invention the processing circuitry provides an output indication of the presence of photoresist residue.

Additionally in accordance with a preferred embodiment of the present invention the processing circuitry provides an output indication of the presence of oxidized metal.

Moreover in accordance with a preferred embodiment of the present invention the image output represents a portion of the electrical circuit as viewed through a translucent overlay.

There is also provided in accordance with another preferred embodiment of the present invention an automated optical inspection device suitable for inspection of a patterned article including at least one detector providing an image output of at least a portion of a patterned article through a translucent overlay at least partially covering the patterned article, and processing circuitry receiving the image output and providing an output indication which is independent of the translucent overlay.

Further in accordance with a preferred embodiment of the present invention the patterned article includes an electrical circuit.

Still further in accordance with a preferred embodiment of the present invention the electrical circuit includes a printed circuit board.

Additionally in accordance with a preferred embodiment of the present invention the printed circuit board includes a ball grid array substrate.

Moreover in accordance with a preferred embodiment of the present invention the processing circuitry is operative to provide an indication of parts of the pattern covered by the translucent overlay and parts of the pattern not covered by the translucent overlay.

There is also provided in accordance with another preferred embodiment of the present invention apparatus for determining a location of a border in a color image, the image including at least two color populations, between a first color region associated with a first one of the two color populations and a second color region associated with a second one of the two color populations, both the first color region and the second color region being included in the color image, the apparatus including a border identification unit operative to identify an approximate border location between the first color region and the second color region, a candidate border determination unit operative to determine a plurality of candidate border locations between the first color region and the second color region, each of the plurality of candidate border locations being determined by applying a corresponding border location method chosen from among a plurality of border location methods, a method selector operative to choose one method from among the plurality of border location methods as a preferred method, and a border determination unit operative to determine a location of a border between the first color region and the second color region by designating one of the plurality of candidate border locations associated with the preferred method as the border.

There is also provided in accordance with still another preferred embodiment of the present invention apparatus for determining a location of a border in a color image, the image including at least two color populations, between a first color region associated with a first one of the two color populations and a second color region associated with a second one of the two color populations, both the first color region and the second color region being included in the color image, the apparatus including a border analysis map unit operative to provide a border analysis map including, for each distinct pair of color populations, an indication of a preferred method for identifying the location of a border between the color populations, a border identification unit operative to identify an approximate border location between the first color region and the second color region, and a border determination unit operative to determine a location of a border between the first color region and the second color region by using the preferred method indicated, in the border analysis map, for identifying the location of a border between the first color population and the second color population.

There is also provided in accordance with yet another preferred embodiment of the present invention apparatus for producing a color morphology map from a color image, the apparatus including a reducing unit operative to reduce the color image to produce a reduced image including a plurality of color populations, a border determination unit operative to determine borders between adjacent ones of the plurality of color populations in the reduced image, a segmentation unit operative to segment the reduced image to produce a binary image including borders and at least one non-border region, a skeleton production unit operative to produce a skeleton image of the at least one non-border region, the skeleton image including a plurality of portions, and an assigning unit operative to assign to each portion of the skeleton a color identity corresponding to one of the color populations.

There is also provided in accordance with another preferred embodiment of the present invention apparatus for identifying irregularities in a smooth curve in an image, the apparatus including an identification unit operative to identify an ordered plurality of points along the smooth curve, each of the ordered plurality of points having at least one neighboring point in the ordered plurality of points, a normal direction unit operative to determine a normal direction to the smooth curve at each of the ordered plurality of points, and an irregularity unit operative to identify a point of the ordered plurality of points as being part of an irregularity based, at least in part, on a local normal difference including a difference between the normal direction to the smooth curve at the point and a normal direction to the smooth curve at the at least one neighboring point of the point.

There is also provided in accordance with still another preferred embodiment of the present invention apparatus for classifying an irregularity in an image of an object, the apparatus including a dimension determination unit operative to determine a feature depth and feature aperture for the irregularity, and a classification unit operative to classify the feature based, at least in part, on an output of the dimension determination unit.

There is also provided in accordance with yet another preferred embodiment of the present invention apparatus for identifying a defect in a portion of an image of an object, the portion being close to a location in the image identified as an edge, the apparatus including an excluded direction unit operative to identify an excluded direction associated with the edge, and a defects unit operative to search for defects, close to the location identified as an edge, in a plurality of directions not including the excluded direction.

There is also provided in accordance with another preferred embodiment of the present invention apparatus for identifying a surface defect in a region of an image of an object, the image including a multiplicity of pixels, the apparatus including a subsampling unit operative to subsample the region in accordance with a subsampling ratio, thus producing a subsampled image of the region, a defect identification unit operative to identify a surface defect in the subsampled image, and a correspondence unit operative to identify a surface defect in the region corresponding to the surface defect in the subsampled image.

There is also provided in accordance with still another preferred embodiment of the present invention a method for inspection of patterned articles including providing a polychromatic image output of at least a portion of a patterned article having a plurality of elements, and receiving the polychromatic image output and providing at least one of the following inspection functionalities: inspection of a metal coating on at least one of the elements in the plurality of elements, and inspection of an at least partially transparent coating on at least one element in the plurality of elements.

There is also provided in accordance with yet another preferred embodiment of the present invention a method for inspection of patterned articles including providing a polychromatic image output of at least a portion of a patterned article including a plurality of elements, and receiving the polychromatic image output and providing the following inspection functionalities inspection of a metal coating on at least one element in the plurality of elements, and inspection of an at least partially transparent coating on at least one element in the plurality of elements.

There is also provided in accordance with another preferred embodiment of the present invention a method for inspection of an article including providing a polychromatic image output of at least a portion of an article, and receiving the polychromatic image output and providing edge detection to sub-pixel accuracy operative to distinguish borders among regions of different color.

There is also provided in accordance with still another preferred embodiment of the present invention a method for inspection of an article including providing an image output of at least a portion of an article having at least three different regions, each of which regions is distinguished at least by an optical characteristic, and receiving the image output and providing edge detection to sub-pixel accuracy operative to distinguish borders of at least two of the at least three different regions.

There is also provided in accordance with yet another preferred embodiment of the present invention a method for inspection of an article including providing an image output of at least a portion of an article, and receiving the image output and providing mapping based at least partially on the image output which identifies materials in each of different regions of the at least a portion of the article having a common border.

There is also provided in accordance with another preferred embodiment of the present invention a method for inspection of an article including providing a polychromatic image output of at least a portion of an article, and receiving the polychromatic image output and providing at least one of the following inspection functionalities segmentation of the polychromatic image into a segmented color image including a plurality of color regions each having one of a plurality of representative color possibilities, binarization of the segmented color image into a binary image including regions and borders, morphological erosion of the regions to provide a skeleton representing the regions, and assignment of color regions to elements in the skeleton.

There is also provided in accordance with still another preferred embodiment of the present invention a method for inspection of an article including providing a polychromatic image output of at least a portion of an article, and receiving the polychromatic image output and providing a color image representing the article, the color image including a morphologically eroded polychromatic image of at least part of the article.

There is also provided in accordance with yet another preferred embodiment of the present invention a method for inspection of an article including providing a polychromatic image output of at least a portion of an article, and receiving the polychromatic image output and providing a color image representing the article, the color image including a map which indicates borders between different regions of an article and identifies materials in each of the different regions having a common border.

There is also provided in accordance with another preferred embodiment of the present invention a method for inspection of a patterned article including providing an image output of at least a portion of a patterned article including at least three materials having detectable edges, and receiving the image output and providing an inspection functionality including binarization of the image output to provide a binary image including region image data and border image data.

There is also provided in accordance with still another preferred embodiment of the present invention a method for inspection of a patterned article including providing an image output of at least a portion of a patterned article including a plurality of materials having detectable borders between the plurality of materials, and receiving the image output and providing an inspection functionality including pattern analysis of image data relating to the borders to provide an indication of the presence of nicks and protrusions along the borders.

There is also provided in accordance with yet another preferred embodiment of the present invention a method for inspection of an article including providing an image output of at least a portion of an article including multiple materials having detectable borders between the materials, receiving the image output and providing at least one of the following inspection functionalities: segmentation of the image output into a segmented image including region image data and border image data, analysis of the region image data using a first technique, and analysis of the border image data using a second technique, different from the first technique.

There is also provided in accordance with another preferred embodiment of the present invention a method for inspection of an article including providing a polychromatic image output of at least a portion of an article including multiple materials having detectable borders between the materials, and receiving the polychromatic image output and providing at least one of the following inspection functionalities: segmentation of the polychromatic image output into a segmented color image including color regions chosen from among a set of predetermined colors, analysis of the region image data relating to a first color using a first technique, and analysis of the region image data relating to a second color using a second technique, different from the first technique.

There is also provided in accordance with still another preferred embodiment of the present invention a method for inspection of an article including providing an image output of at least a portion of an article including multiple materials having detectable borders between the materials, and receiving the image output and providing at least one of the following inspection functionalities: segmentation of the image output into a segmented image including region image data and border image data, and smoothing the region image data in a manner not influenced by at least some of the border image data.

There is also provided in accordance with yet another preferred embodiment of the present invention a method for inspection of an electrical circuit including providing an image output of at least a portion of an electrical circuit including multiple materials, and receiving the image output and providing an output indication of the presence of at least one predetermined material.

There is also provided in accordance with another preferred embodiment of the present invention a method for inspection of a patterned article including providing an image output of at least a portion of a patterned article through a translucent overlay at least partially covering the patterned article, and receiving the image output and providing an output indication which is independent of the translucent overlay.

There is also provided in accordance with still another preferred embodiment of the present invention a method for automatically optically inspecting color images of objects, including acquiring polychromatic images of an object, processing the polychromatic images and outputting a report indicating candidate defects and features chosen from among a predetermined set of features, and providing an image of a region surrounding each the candidate defect and feature.

There is also provided in accordance with yet another preferred embodiment of the present invention apparatus for automatically optically inspecting color images of objects, including a sensor operative to acquire polychromatic images of an object, an image processor operative to process the polychromatic images and output a report indicating candidate defects and features chosen from among a predetermined set of features, and to provide an image of a region surrounding each the candidate defect and feature.

Further in accordance with a preferred embodiment of the present invention the processor includes a binary image processor operative to process binary images generated from the polychromatic image, and a color image processor operative to process the polychromatic images.

Still further in accordance with a preferred embodiment of the present invention the apparatus also includes a morphological image processor operative to generate a skeleton map from a multicolor image derived from the polychromatic image.

BRIEF DESCRIPTION OF THE DRAWINGS

The present invention will be understood and appreciated more fully from the following detailed description, taken in conjunction with the drawings in which:

FIGS. 5 and 6 are simplified pictorial illustrations of a preferred 5×5 large kernel and a preferred 3×3 corresponding small kernel, respectively;

FIG. 20 is a table showing okdir values, corresponding directions of measurement, and a preferred gradient operator for measuring, useful in understanding the method of FIG. 18;

FIG. 23A is a table illustrating preferred heuristics for use in step 462 of FIG. 21;

FIG. 23B is a simplified pictorial illustration showing a naming convention for the 9 pixels of the 3×3 virtual spread, useful in understanding FIG. 23A;

FIG. 24 is a simplified flowchart illustration of a preferred method of operation of a portion of the apparatus of FIG. 12;

FIG. 27 is a simplified flowchart illustration of a preferred method of operation of the line and space skeleton subunit 230 of FIG. 1;

FIGS. 28A and 28B are simplified pictorial illustrations of an array of pixels, before and after partial erosion, useful in understanding the method of FIG. 27;

FIGS. 33A and 33B, taken together, comprise a simplified flowchart illustration of a preferred method of operation of the nicks and protrusions subunit 220 of FIG. 1;

FIG. 34 is a simplified pictorial illustration helpful in understanding step 890 of FIG. 33A;

DETAILED DESCRIPTION OF A PREFERRED EMBODIMENT

Overview

Figure 1:
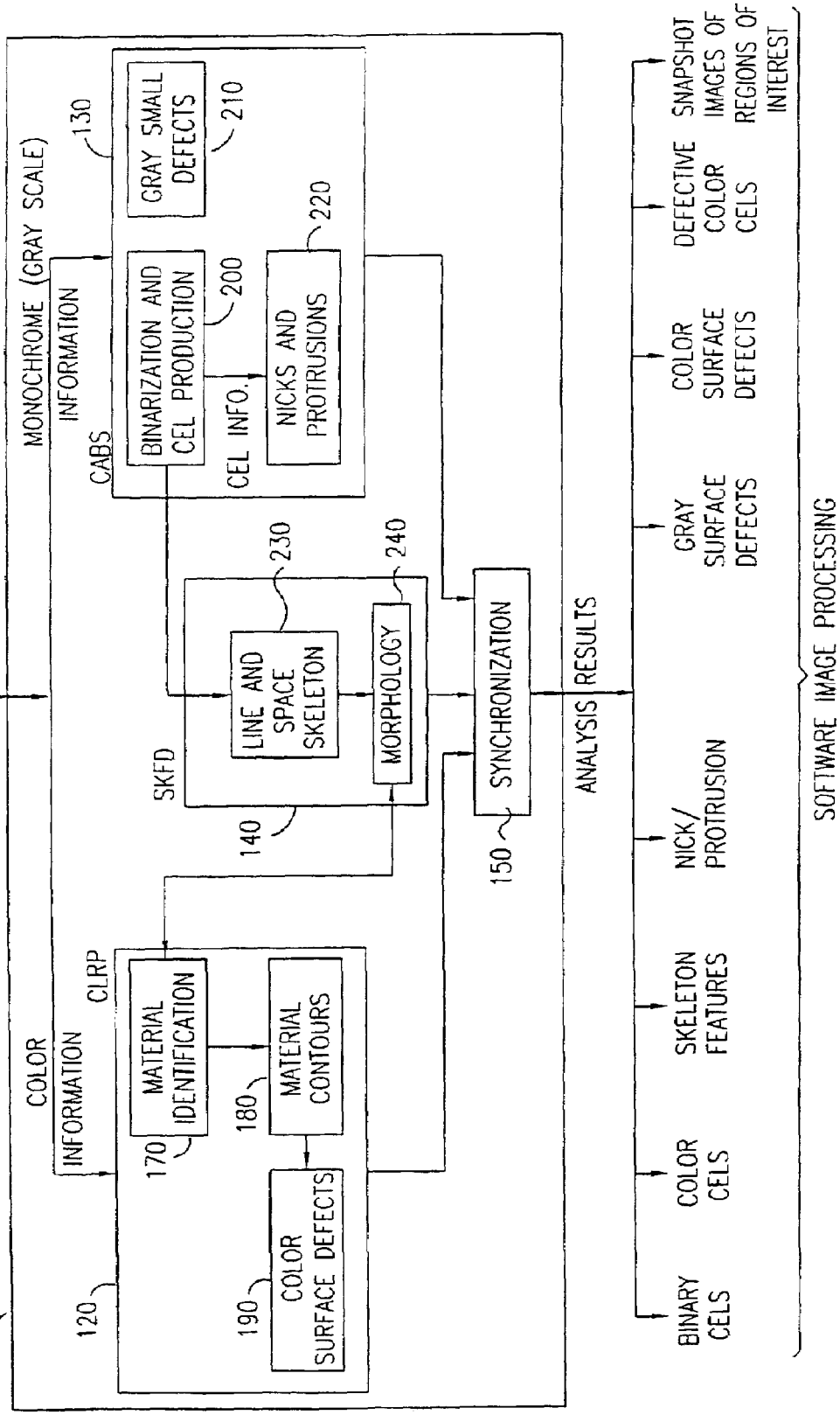
FIG. 1 is a simplified block diagram illustration of an image analysis system constructed and operative in accordance with a preferred embodiment of the present invention.

Reference is now made to FIG. 1 which is a simplified block diagram illustration of an image analysis system 100 constructed and operative in accordance with a preferred embodiment of the present invention. It is appreciated that, while the system of FIG. 1 is particularly useful in analyzing an image which represents a patterned object, for example a BGA or other electric circuit, the system of FIG. 1 may generally be useful in image analysis, whether or not an image being analyzed represents a patterned object or any other object. Although reference in the present specification is made to BGAs for the purposes of illustrating the present invention, the term BGA as used in the present specification shall be deemed to refer to and additionally include printed circuit board substrates, laminated printed circuit boards, lead frames, flat panel displays, hybrid chip packaging substrates, tape automated bonding substrates, and any suitable patterned object including various etched and engraved metal substrates as may be used in medical implants.

Image analysis system 100 is preferably included in an inspection system comprising illumination, image acquisition, object transportation, and software based image processing subsystems. Thus, in a case where an image being analyzed by the image analysis system 100 does comprise an image of an object, such as a patterned object like a BGA, it is appreciated that an appropriate image acquisition system (not shown) is typically employed to capture an image of the object, and that the image being analyzed by the image analysis system 100 is typically corrected in appropriate ways well-known in the art, including focus, compensation, resampling, and alignment. An appropriate image acquisition system suitable to provide an image to image analysis system 100 typically comprises at least one detector providing a polychromatic image output, as is well known in the art. The output of such an image acquisition system, or any similar image produced by other appropriate means, is generally termed herein a "color image".

The input image to be analyzed typically comprises a color image in an appropriate color format, as is well known in the art. Preferably, the color image is provided in RGB (red-green-blue) format at high bit resolution, such as 24-bit resolution.

The image analysis system 100 is preferably operative to analyze an input image and to pass results of the analysis on for further processing, preferably a software image processing unit, or for reporting directly to an operator by way of an appropriate application interface.

Preferably, as is well known in the art, the image analysis system 100 is implemented in custom hardware. While a software implementation of the image analysis system 100, to run on a general purpose computer, is believed to be possible and would, it is believed, be fully operative, a hardware implementation is preferred in order to achieve faster performance. For ease of description of the present invention, the methods are usually described so as to enable implementation of the principles of the present invention in either hardware of software.

The image analysis system 100 preferably comprises a color processor, or "CLRP" unit 120, which preferably receives color information about the input image and is preferably operative, as described further below, to analyze the input image based on the received color information.

The image analysis system 100 also preferably comprises a CABS unit 130, which preferably receives monochrome, also known as gray level, information about the input image and is preferably operative, as described further below, to analyze the input image based on the received gray level information. The monochrome information may comprise information in one color, typically but not necessarily the color red, and typically comprises a high number of bits, such as 8 bits, of gray level information. A preferred implementation of the CABS unit 130 is described below with reference to FIGS. 33A and 33B.

The image analysis system 100 also preferably comprises a SKFD unit 140, which preferably receives as input an output, described further below and typically comprising binarization information, from the CABS unit 130, and color information from the CLRP unit 120. The SKFD unit 140 is preferably operative, as described further below, to analyze the input thereto and to produce therefrom characteristic information typically including a skeleton representation of the input image and morphology features found in the input image.

The image analysis system 100 also preferably comprises a synchronization unit 150. Preferably and in order to obtain faster performance of the image analysis system 100, the CLRP unit 120, the CABS unit 130, and the SKFD unit 140 operate in parallel. The synchronization unit 150 is preferably operatively associated with each of the CLRP unit 120, the CABS unit 130, and the SKFD unit 140 and preferably receives output from each of the CLRP unit 120, the CABS unit 130, and the SKFD unit 140. Using any appropriate synchronization methods, such as hardware-based delay and synchronization methods which are well-known in the art, the synchronization unit 150 is preferably operative to mutually synchronize each of the inputs received thereat and to pass the synchronized inputs along as an output of the image analysis system 100.

Preferably the image analysis system 100 generates a number of reports, which include information about various features and defects detected on an object being inspected, such as Binary Cels, Color Cels, Morphology Skeleton, Skeleton Features, Nick/Protrusion, Gray Surface Defects, Color Surface Defects, Defective Color Cels and Snapshot Images of Regions of Interest. These reports are inputted to a Software Image Processing device as described in detail in the Applicant's copending Israel Patent Application No. 131,282. In addition the image analysis system 100 generated snapshot images of each feature and defect, as well as snapshot defects of particular regions of interest on the article as are predefined by a user prior to inspection. Typically a snapshot image is a polychromatic image of a region surrounding each feature, defect and predefined region of interest.

Preferably, the snapshot image output of the image analysis system 100 may be post-processed by a post-processing subsystem (not shown) in order to produce appropriate final reports regarding structure and defects of an object inspected.

The CLRP unit 120 preferably comprises the following subunits:

1. A material identification subunit 170 which preferably receives the color image data input to the CLRP unit 120 and is preferably operative to derive therefrom information about materials comprised in an object of which the input image is the image. A preferred implementation of the material identification subunit 170 is described in more detail below with reference to FIG. 2.

2. A material contours subunit 180 which preferably receives an output from the material identification subunit 170 and is preferably operative to derive therefrom contour information representing contours and/or borders in the input image. A preferred implementation of the material contours subunit 180 is also described in more detail below with reference to FIG. 2.

It is appreciated that, in a case where the input image does not comprise an image of an object that the term "material" as used throughout the present specification and claims, particularly but not exclusively with respect to the material identification subunit 170 and the material contours subunit 180, is used to refer to features in the input image which, upon analysis, appear to correspond to features of one or more materials in an object which the image would represent, if the image did represent an object. In other words, with a broadened understanding and definition of the term "material", it is believed that the operations performed by the material identification subunit 170 and the material contours subunit 180 are also useful in analyzing an image which does not comprise an image of an object.

3. A color surface defects subunit 190 which preferably receives the color image data input to the CLRP unit 120 and is preferably operative to derive, from the input, information about surface defects in the input image, the surface defects typically corresponding to defects in an object of which the input image is an image. A preferred method of operation of the color surface defects subunit 190 is described in more detail below with reference to FIG. 12.

The CABS unit 130 preferably comprises the following subunits:

1. A binarization and cel production subunit 200 which preferably receives the monochrome image data input to the CABS unit 130 and is preferably operative to derive therefrom binary information representing a binary image corresponding to the input image, based on the monochrome image data. Additionally, in a preferred embodiment of the present invention the binarization and cel production subunit 200 receives a reduced color image from the material identification subunit 170, and is operative to derive therefrom binary information representing a binary image corresponding to the input reduced color image. The binarization and cel production subunit 200 also is preferably operative to define borders within the image, preferably by means of contour elements, also known as cels, and to output information comprising a description of the cels produced. A preferred method of operation of the binarization and cel production subunit 200 is similar to that described below for one component of a color image, with reference to FIG. 7.

The term "binary" in all of its forms, as used throughout the present specification and claims and particularly in describing information, an image, or a method for processing information or processing an image, refers to having two states or two outcomes. In the case of an image, for example, a binary image is an image in which each element, such as a pixel, comprised in the image has only two possible states, which may be represented as "black" and "white" or, alternatively, "0" or "1". The term binary, in referring to images or image information, is thus used in contrast to the terms "gray scale" and "color", which are well-known in the art and which refer to particular types of images in which there are more than two possible states or outcomes for each element.

2. A nicks and protrusions unit 220 which preferably receives the cel information output by the binarization and cel production unit 200 and is preferably operative to derive therefrom information about small border irregularities, known as nicks and protrusions, in borders defined by the binarization and cel production unit 200, and to report the nicks and protrusions as output. A preferred method of operation of the nicks and protrusions subunit 220 is described in more detail below with reference to FIGS. 33A and 33B.

3. A gray small defects subunit 210 which preferably receives the monochrome image data input to the CABS unit 130 and is preferably operative, using the monochrome image data, to identify small defects in the input image which may, in a case where the image is an image of an object, indicate defects in the object of which the image is an image. Methods of identifying small defects using monochrome information are well known in the art and are described, for example, in U.S. Pat. No. 5,586,058 to Aloni et al., referred to above, the disclosure of which is hereby incorporated herein by reference.

The SKFD unit 140 preferably comprises the following subunits:

1. A line and space skeleton subunit 230 which preferably receives the binary information output from CABS unit 130, typically via the binarization and cel production subunit 200, and is preferably operative to derive therefrom and to produce as output line and space skeleton information describing the input image. Typically, the line and skeleton information is derived using a pixel consumption method, as is well known in the art. A preferred method of operation of the line and space skeleton subunit 230 is described in more detail below with reference to FIG. 27.

2. A morphology subunit 240 which preferably receives the line and space skeleton information output by the line and space skeleton subunit 230 and is preferably operative to identify morphological features of the input image based on the line and space skeleton information and to produce information describing the morphological features as output. A preferred method of operation of the morphology subunit 240 is described in more detail below with reference to FIGS. 30A–30C.

The following definitions and general discussion may be of assistance in understanding the present specification and claims.

A population of pixels which have largely homogeneous color characteristics is termed herein a "largely homogeneous color population". Typically, a color image to be analyzed comprises, as is well-known in the art, a plurality of regions of largely homogeneous color population.

It is well known in the art to represent a color image in a color format or color space, such as, for example: RGB format, comprising separate color values for red, green, and blue; and HSI format, comprising separate values for hue, intensity, and saturation. For the sake of simplicity of description, throughout the present specification and claims, unless stated otherwise, the example of RGB format will be used, it being appreciated that other formats may, in most cases, also be used.

It is well known in the art that a single color component of an RGB image may considered separately from other components of the RGB image; for example, the green component may be considered separately. A derived image comprising only the green component may be considered, for the sake of simplicity of processing and description, to be a monochrome image. In discussing such a single component derived image, the value of a pixel may be referred to as a gray scale value for the sake of simplicity of description, even though the value is in some sense a "green scale value".

In the field of grayscale image analysis, the concept of gradient is well known and corresponds generally to a first derivative of a function of pixel values, indicating the rate of change of pixel value at a predetermined location. It will therefore be evident to persons reasonably skilled in the art that areas of homogeneous color in a single color component, such as the red component, will generally comprise pixels having a zero or near-zero gradient value. Areas of non-homogeneous color, including borders and edges, will generally comprise pixels having a significantly non-zero gradient value.

Preferred prior art methods which may be used in determining an edge in a grayscale image, including determination to sub-pixel accuracy in a grayscale image, include second derivative computation methods, which typically use a difference of Gaussians (DOG) method to calculate a second derivative approximation of a pixel intensity function. Typical prior art methods are described in the following US Patents, the disclosures of which are hereby incorporated herein by reference:

1. U.S. Pat. No. 5,774,572 to Caspi, which describes an automatic visual inspection system, which is preferably operative to convolve a 2-dimensional digital gray scale image of an object with a filter function related to the second derivative of a Gaussian function forming a 2-dimensional convoluted image have signed values. The location of an edge in the object is achieved by finding zero crossings between adjacent pixels having oppositely signed intensity values.

2. U.S. Pat. No. 5,774,573 to Caspi et al, which describes a visual inspection system which uses convolution of a 2-dimensional digital gray scale image of an object with a filter function related to the second derivative of a Gaussian function forming a 2-dimensional convolved image having signed pixel intensity values. The convolution of Caspi et al. can be performed with a difference-of-two-Gaussians, one positive and one negative.

Color Image Processing

Figure 2:
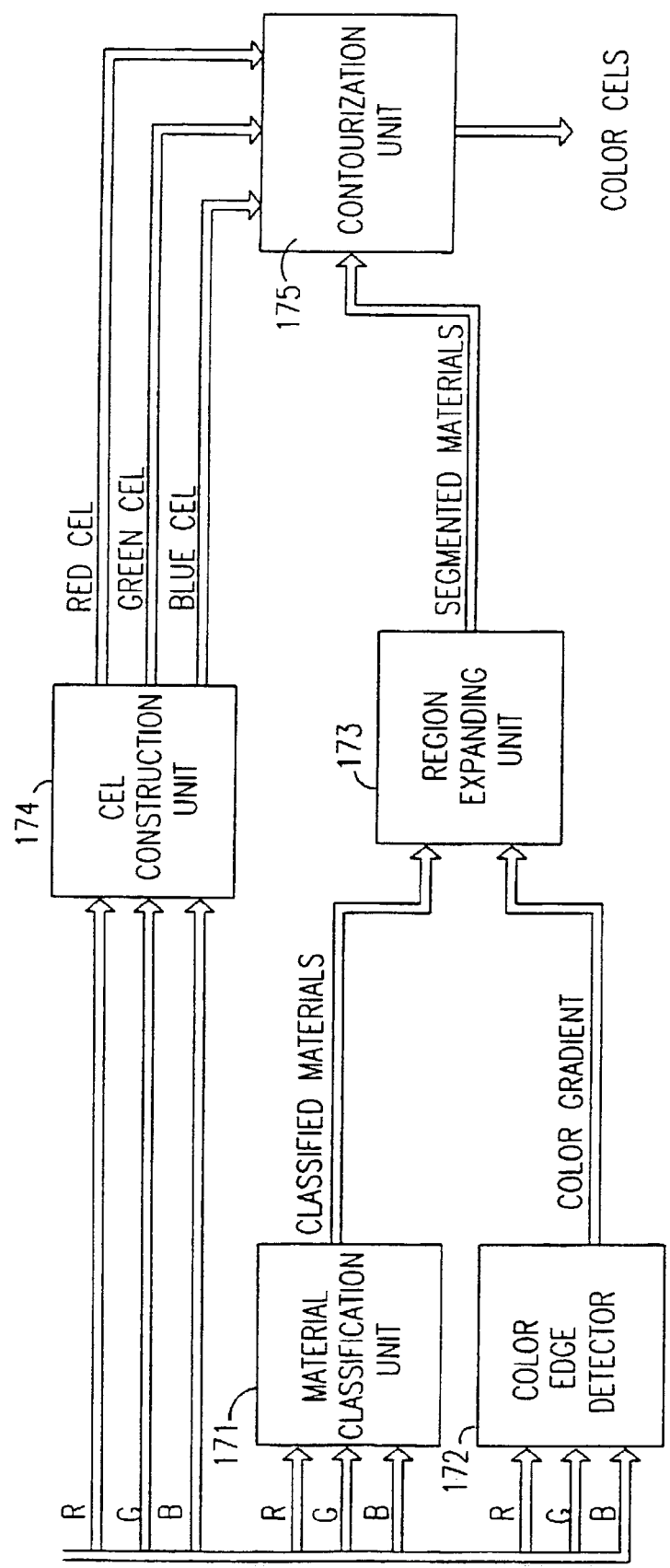
FIG. 2 is a simplified block diagram illustration of a preferred implementation of the material identification subunit 170 and material contours unit 180 of FIG. 1.

Reference is now made to FIG. 2, which is a simplified block diagram illustration of a preferred implementation of the material identification subunit 170 and the material contours subunit 180 comprised in the CLRP unit 120 of FIG. 1.

Generally, the task of the material identification subunit 170 is to produce, from color information of an input image, as much information as possible about homogeneous color population regions in the input image. In the material identification subunit 170, a region of homogeneous color population is generally identified with a particular material or combination of materials as may result from the presence of a translucent or partially transparent coating or overlay covering another material. For example, when the object being inspected is a BGA, typical optically distinguishable materials and materials combinations include copper conductor, copper conductors that are coated or plated with gold, substrate, and those parts of any of the aforementioned materials which are covered by a solder-mask overlay. It is appreciated that other objects being inspected might include other materials and material combinations such as, for example, silver. Therefore, the primary task of the material identification subunit 170 is to identify, in the input image and based on the color information, areas of homogenous color population.

The term "translucent overlay", as used throughout the present specification and claims, includes, for example, a translucent or partially transparent solder mask or, for example, a translucent substrate through which a conductor located on an opposite side thereof may be seen.

Generally, areas of homogenous color population are referred to herein as representing areas of a particular material, which is generally the case when an input image to be analyzed is an image of a physical object. It is appreciated, however, as explained above, that the present invention is not limited to analyzing only input images which are images of a physical object, and that the use of the term "material" in a case where an image may not be an image of a material object is by way of analogy and is not meant to be limiting.

Generally, the task of the material contours unit 180 is to produce, from color information of an input image and from the output of the material identification subunit 170, an indication of borders between areas of homogenous color populations, said borders preferably being identified at a subpixel level.

The apparatus of FIG. 2 preferably comprises the following:

1. a material classification unit 171;
2. a color edge detector 172;
3. a region expanding unit 173;
4. a cel construction unit 174; and
5. a contourization unit 175.

The material classification unit 171 preferably receives color component data, typically comprising RGB values for each pixel in the input image, and is preferably operative to classify areas of largely homogenous color population as belonging to a particular material. In a preferred implementation, the material classification unit 171 is implemented as a hardware LUT, so that classification of each pixel is based directly on the color component values, typically RGB values, of that pixel, so that RGB values falling within a color space associated with a particular material or material combination will be associated with that material.

Preferably, in a typical case where a plurality of images of objects composed of similar materials is to be analyzed, the LUT may be built by analyzing a representative image using methods well known in the art. It is appreciated that a number of appropriate methods of analyzing a representative image are well known in the art, including simple methods based on histogram-like pixel color distribution analysis, and that any appropriate method may be used. A preferred method for performing such an analysis is described in the following reference, the disclosure of which has been incorporated herein by reference: Dorin Comaniciu and Peter Meer, "Distribution Free Decomposition of Multivariate Date", SPR '98 Invited Submission, Department of Electrical and Computer Engineering, Rutgers University, Piscataway, N.J. 08855, USA.

The materials classification unit 171 preferably outputs classified materials information indicated an assignment of each pixel in the input image to a particular material.

The color edge detector 172 preferably receives the same input as the materials classification unit 171. The color edge detector 172 is preferably operative to compute an approximate first derivative, typically by applying a Sobel operator, as is well known in the art, typically to HSI components of the input image. The Sobel operator is preferably applied separately to each of the HSI components, and then a combined result is derived as explained below.

Sobel edge detection is well known in the art. The magnitude of the gradient of a function $\phi$ is given by the sum of the magnitudes of the partial derivatives of $\phi$ in the x and y directions, which is approximated in Sobel estimation at a point (i,j) as follows:

$$|\phi(i-1,j-1)+2\phi(i,j-1)+\phi(i+1,j-1)-(\phi(i-1,j+1)+2\phi(i,j+1)+\phi(i+1,j+1))|+|\phi(i-1,j-1)+2\phi(i-1,j)+\phi(i-1,j+1)-(\phi(i+1,j-1)+2\phi(i+1,j)+\phi(i+1,j+1))|$$

Sobel edge detection in the present invention preferably uses a circular 3×3 edge detector and, via image convolution, calculates a 2D gradient magnitude as a sum of absolute values of vertical and horizontal gradient components, in accordance with the above formula. Typically, the following kernels may be used for image convolution:

1. Vertical Gradient Kernel:

$$\begin{matrix} -1 & 0 & 1 \\ -2 & 0 & 2 \\ -1 & 0 & 1 \end{matrix}$$

2. Horizontal Gradient Kernel:

$$\begin{matrix} 1 & 2 & 1 \\ 0 & 0 & 0 \\ -1 & -2 & -1 \end{matrix}$$

The color edge detector 172 then preferably computes a color edge as a weighted sum of H, S, and I component gradients as follows:

$$|G_{COLOR}|=(|G_H|\text{Relevance}(I)\text{Weight}H+|G_S|\text{Relevance}(I)\text{Weight}S+|G_I|\text{Weght}I)$$

where:
  $G_{COLOR}$ is the color edge;
  $G_H$ is the gradient of hue;
  $G_S$ is the gradient of saturation;
  $G_I$ is the gradient of intensity;
  Relevance(I) is a color relevance weight function of intensity;
  WeightH is a weight for the hue component;
  WeightS is a weight for the saturation component; and
  WeightI is a weight for the intensity component.

Further discussion of the factors mentioned immediately above is found in Philippe Pujas and Marie-Jose Aldon, "Robust Color Image Segmentation", referred to above, the disclosure of which is hereby incorporated herein by reference.

Figure 3:
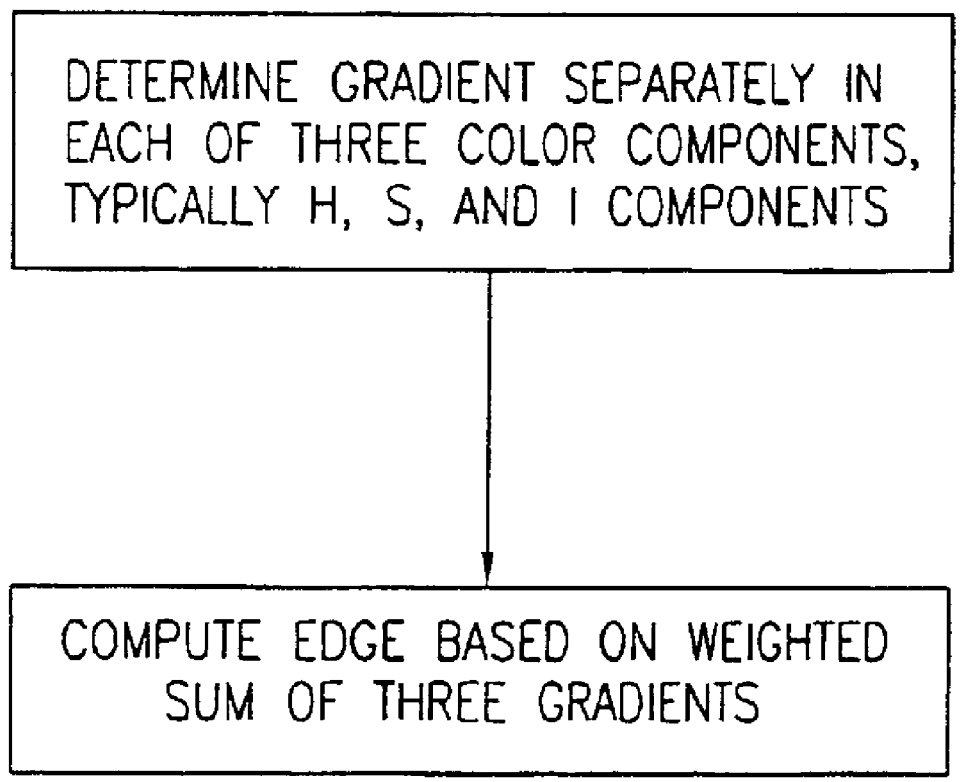
FIG. 3 is a simplified flowchart illustration of a preferred method of a portion of the apparatus of FIG. 2.

Reference is now made to FIG. 3, which is a simplified flow chart illustration of a preferred method of operation of the color edge detector 172. The flow chart of FIG. 3 is self-explanatory with reference to the above discussion.

Referring back to FIG. 2, the region expanding unit 173 preferably receives the outputs produced by the material classification unit 171, comprising classified materials information, and the output produced by the color edge detector 172, comprising color gradient information. The region expanding unit 173 is preferably operative to extend each region comprising a homogeneous color population as identified by the material classification unit as far as possible, so that the borders between homogeneous color populations are as narrow as possible.

Figure 4:
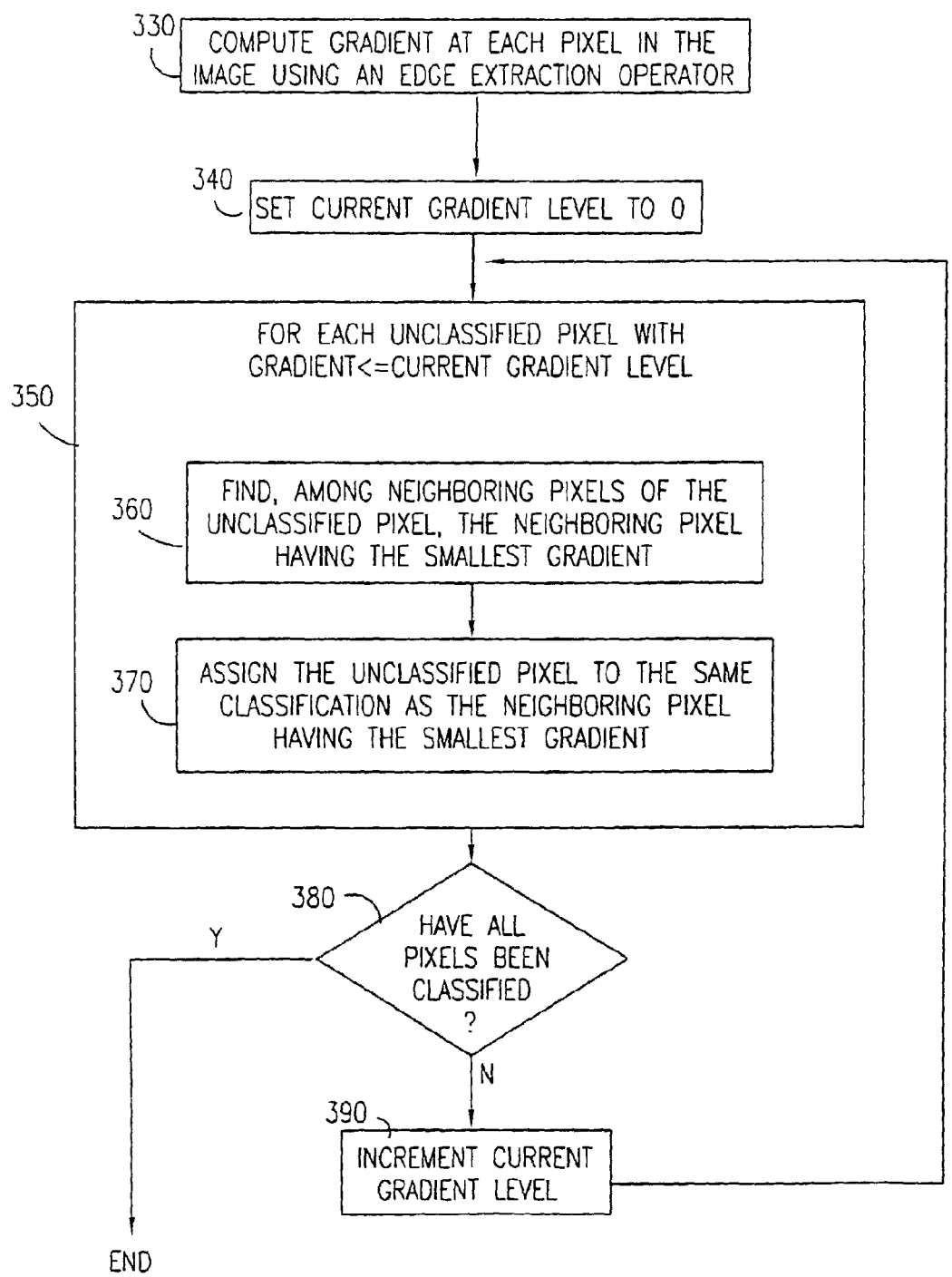
FIG. 4 is a simplified flowchart illustration of a preferred method of operation of the region expanding unit 173 of FIG. 2.

Reference is now additionally made to FIG. 4, which is a simplified flowchart illustration of a preferred method of operation of the region expanding unit 173 of FIG. 2. In the method of FIG. 4 unassigned pixels are assigned to a neighboring region of homogeneous color which has a low gradient, indicating that the unassigned pixel is, in so far as possible, assigned to a neighboring region having the least clear border with the unassigned pixel. The method of FIG. 4 preferably includes the following steps:

A gradient is computed at each pixel in the image using an appropriate edge extraction operator as described above (step 330). A current gradient level, indicating a gradient level of unclassified pixels to be classified at the current stage of the method of FIG. 4, is set to 0 (step 340).

The following steps are preferably performed for each unclassified pixel whose gradient is less than or equal to the current gradient level (step 350) following stepwise incrementing.

Among neighboring pixels of the unclassified pixel, the neighboring pixel having the smallest gradient is identified (step 360). The neighboring pixels may comprise 4 pixels comprising 2 horizontal neighboring pixels and 2 vertical neighboring pixels. Alternatively, the neighboring pixels may also comprise 4 diagonal neighboring pixels, thus comprising 8 pixels.

The unclassified pixel is assigned to the pixel among the neighboring pixels which was identified in step 360 as having the smallest gradient (step 370). If there is more than one neighboring pixel having the smallest gradient, the first appearing of the more than one neighboring pixels having the smallest gradient is chosen and used.

A check is made as to whether all pixels have now been classified (step 380); if so, the method of FIG. 4 preferably concludes.

If at least one unclassified pixel remains unclassified, the current gradient level is incremented (step 390), and execution of the method of FIG. 4 continues with step 350.

It is appreciated, as stated above, that most components of the system of FIG. 1, including the apparatus of FIG. 2, are preferably implemented in hardware for optimum performance. It is appreciated that a skilled person of the art would implement the method of FIG. 4 in hardware using well-known techniques appropriate to optimized hardware implementation of software algorithms.

The cel construction unit 174 preferably receives the color component input, typically comprising RGB input, received by the materials classification unit 171 and the color edge detector 172. The cel construction unit 174 is preferably operative to distinguish borders among regions of different homogeneous color populations and to determine therefrom cels representing such borders determined at a sub-pixel level separately in each of the R, G, and B gray scale images. Cels, also known as contour elements, are described in more detail below.

Appropriate apparatus and methods for making such a sub-pixel determination in a gray scale image are described in U.S. Pat. No. 5,774,572 to Caspi and U.S. Pat. No. 5,774,573 to Caspi et al, also referred to herein as "the Caspi patents", both of which have been referred to above and the descriptions of which have been incorporated herein by reference. It is appreciated, in the present invention, that determination of a location of a border at a sub pixel level in a single-component gray scale image, such as a red component gray scale image, may be performed using the methods described in the Caspi patents.

As is well known in the art, particularly in the Caspi patents referred to above, convolution with an appropriate difference of Gaussians (DOG) operator may be used to compute a second derivative and thus determine border location; in particular, a large and a small operator may be used. Preferred kernels include 3×1, 5×1, and 5×3 kernels. Reference is now additionally made to FIGS. 5 and 6, which show examples of a preferred 5×5 large kernel and a preferred 3×3 corresponding small kernel, respectively. FIGS. 5 and 6 are self-explanatory.

The contourization unit 175 preferably receives the R, G, and B cels from the cel construction unit 174 and the segmented materials information from the region expanding unit 173 and is preferably operative to produce therefrom color cels representing borders between adjacent materials in the input image.

Figure 7:
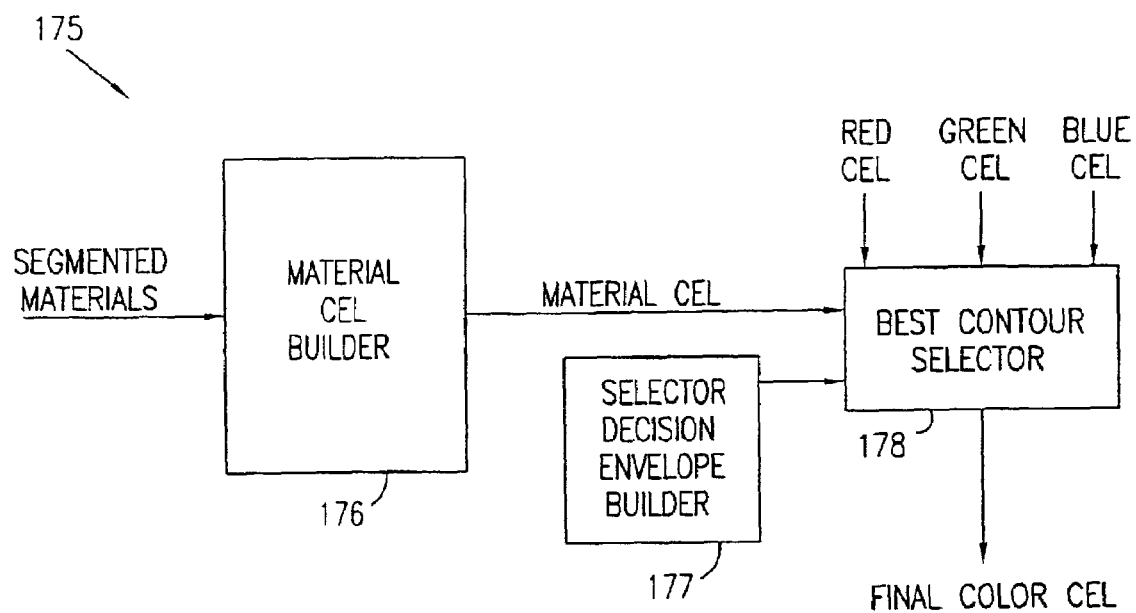
FIG. 7 is a simplified block diagram illustration of a preferred implementation of the contourization unit 175 of FIG. 2.

Reference is now additionally made to FIG. 7, which is a simplified block diagram illustration of a preferred implementation of the contourization unit 175 of FIG. 2. The apparatus of FIG. 7 preferably comprises the following:

1. a material cel builder 176 which preferably receives the segmented materials information and is preferably operative to produce therefrom material cels which represent borders with pixel accuracy;

2. a selector decision envelope builder 177 that builds an envelope, such as a 1 pixel envelope, around each material cel, indicating regions within which a border is to be determined; and 3. a best contour selector 178, preferably receiving the material cels from the material cel builder 176 and the envelope from the selector decision envelope builder 177, as well as the R, G, and B cel information, and preferably operative to produce therefrom a final color cel representing the best border between adjacent materials.

In determining a border in the best contour selector 178 it is appreciated that it is generally difficult or impossible to determine a border with sub pixel accuracy in the vicinity of a junction of edges and therefore it is preferred to use the contourization border in the vicinity of a junction. The vicinity of a junction may be defined in any appropriate manner such as, for example, as within a 3 pixel square neighborhood of a junction.

In a preferred embodiment of the current invention, a decision as to whether to use a sub-pixel R, G, or B border or whether to use a pixel material cel border in areas that are not near a junction is made according to the materials which fall on both sides of the border. Certain materials are known to be best distinguishable, for example, in red; if those materials fall on the two sides of the border, then the red sub-pixel border is used to fix the border at that location. Other materials may not be distinguishable in any of R, G, or B, in which case a pseudo color may be generated, for example by weighting the RGB inputs in a predetermined manner, for border determination, or a material cel border would be used at that point.

Figure 8:
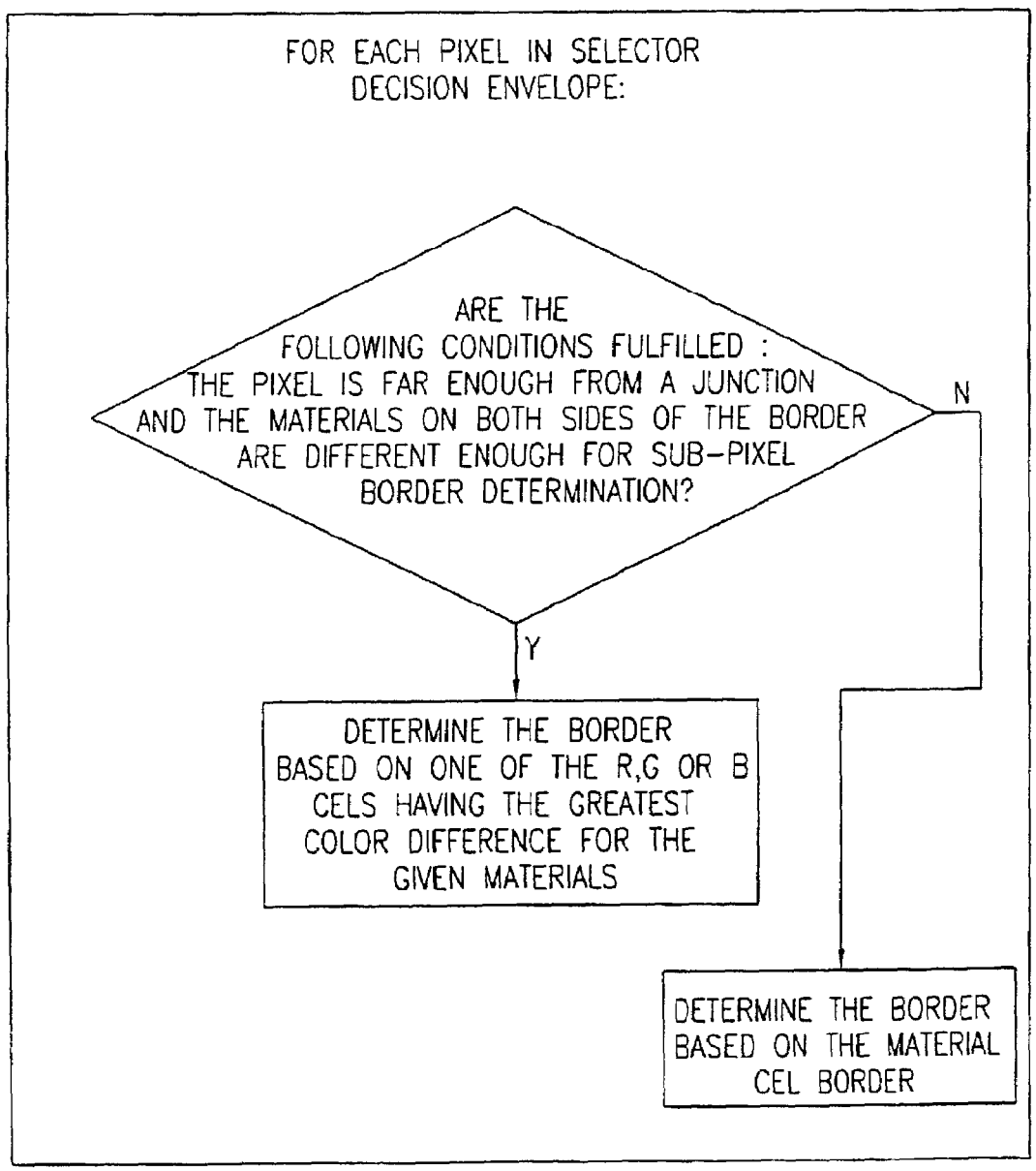
FIG. 8 is a simplified flowchart illustration of a preferred method of operation of the best contour selector 178 of FIG. 7.

Reference is now made to FIG. 8, which is a simplified flowchart illustration of a preferred method of operation of the best contour selector 178 of FIG. 7. The method of FIG. 8 is self-explanatory with reference to the above discussion.

Preferably, sup-pixel accuracy borders as described above are represented as a plurality of contour elements or cels, each cel indicating a sub-pixel accuracy border segment in the vicinity of a single pixel; each cel is roughly equivalent to a small vector of length approximately equal to one dimension of a pixel. One preferred method of defining a cel, including defining the location and orientation of the cel and the homogeneous color population on each side of the cel, wherein each population is correlated to a material or material combination as described above, is as follows:

| description | typical number of bits for storage |
|---|---|
| material edge | index into a table indicating which materials are on each side of the cel |
| direction | 0 if the area of negative DOG is to the left of the cel when traveling from a first end of the cel to a last end of the cel, 1 otherwise |
| edge code | indication of direction of the cel, encoding the first edge and last edge of the pixel |
| first edge | intersection point, in a cyclic coordinate system, of the cel with the first edge |

-continued

| description | typical number of bits for storage |
|---|---|
| last edge | intersection point, in a cyclic coordinate system, of the cel with the last edge |

Figure 9:
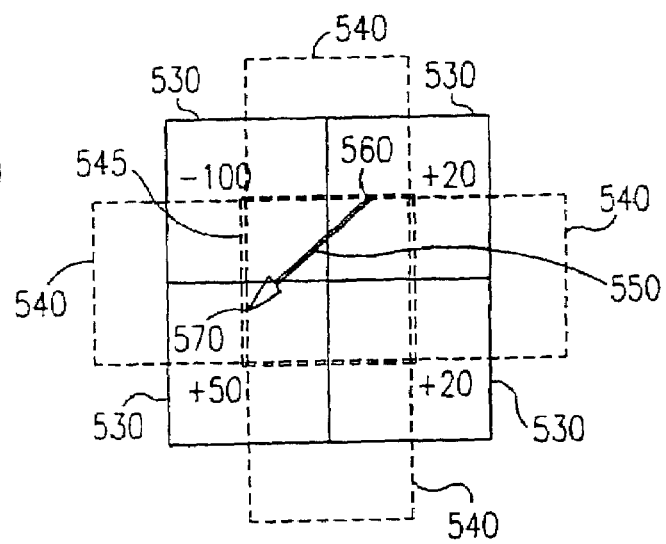
FIGS. 9–11 are simplified pictorial illustrations of preferred cel construction and nomenclature, useful in understanding the present invention.
Figure 10:
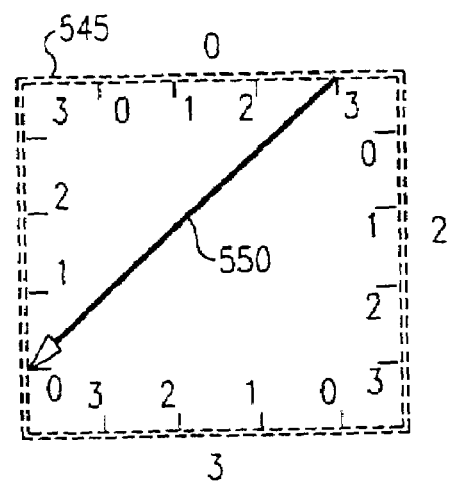
Figure 11:
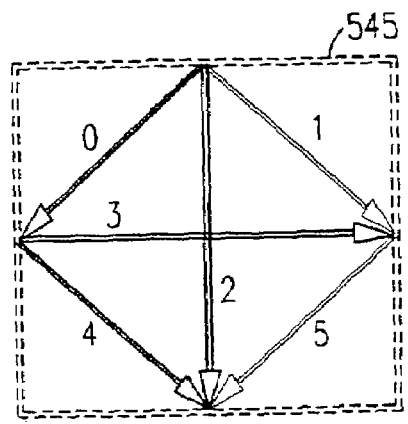

Reference is now additionally made to FIGS. 9–11, which are simplified pictorial illustrations of preferred cel construction and nomenclature, useful in understanding the present invention. The illustration of FIG. 9 comprises a plurality of pixels 530 and a second plurality of virtual cel pixels 540. Typically, each virtual cel pixel 540 is of the same size as each pixel 530 and each virtual cel pixel 540 is centered about a corner of four pixels 530. In FIG. 9, by way of example only, each of four pixels 530, which comprise neighboring pixels of a central virtual cel pixel 545, are shown as having given gradient values of −100, +20, +50, and +20 respectively.

The illustration of FIG. 9 also comprises a cel 550. The location of a first edge intersection point 560 of the cel 550 is preferably fixed by linear interpolation between the adjacent cel gradient values, for example +20 and −100 as shown, in order to estimate the zero-crossing point, as is well-known in the art. Similarly, the location of a last edge intersection point 570 of the cel 550 is preferably fixed by linear interpolation between adjacent cel gradient values, for example +50 and −100 as shown.

FIG. 10 depicts a preferred circular coordinate system for describing the first edge and last edge of the cel 550, as well as an edge numbering system in which the top, left, right, and bottom edges of the cell 550 are numbered 0, 1, 2, and 3 respectively. FIG. 11 depicts a preferred scheme for describing the edge code indicating the direction of the cel 550 of FIGS. 9 and 10.

A preferred method of determining edge code and direction based DOG sign values in four neighboring pixels would be to perform a lookup table based on the following:

| DOG sign | edge code | Direction |
|---|---|---|
| ++ ++ | 7 | 0 |
| −+ ++ | 0 | 1 |
| +− ++ | 1 | 0 |
| −− ++ | 3 | 0 |
| ++ −+ | 4 | 1 |
| −+ −+ | 2 | 1 |
| +− −+ | 6 | 1 |
| −− −+ | 5 | 1 |
| ++ +− | 5 | 0 |
| −+ +− | 6 | 0 |
| +− +− | 2 | 0 |
| −− +− | 4 | 0 |
| ++ −− | 3 | 1 |
| −+ −− | 1 | 1 |

-continued

| DOG sign | edge code | Direction |
|---|---|---|
| +− −− | 0 | 0 |
| −− −− | 7 | 0 |

In the immediately preceding list of edge codes, it is appreciated that code 6 represents a saddle and code 7 represents "no cel".

The first and last edges of a cel, according to the numbering system of FIG. 10, may be determined from the following:

| edge code | number of first edge | number of last edge |
|---|---|---|
| 0 | 0 | 1 |
| 1 | 0 | 2 |
| 0 | 0 | 3 |
| 3 | 1 | 2 |
| 4 | 1 | 3 |
| 5 | 2 | 3 |
| 6 | 2 | 3 |
| 7 | undefined | undefined |

In a preferred embodiment of the present invention, the cels, which are calculated as described above, are collected into an image map representing the cel borders between homogeneous color populations, and indicating for each cel which of the colors of the homogeneous color population is located on either side of the cel. It is readily appreciated that by correlating materials to homogeneous color populations as hereinabove described, color cel image maps include data as to the identity and location of materials present on the object being inspected.

In a preferred embodiment of the present invention, the collection of cels is preferably included in a report of features of the object inspected, which may be further processed as desired. An additional report preferably includes a reduced color map, specifying regions of homogeneous color population, of the object being inspected, which may be used for example by the binarization and cel production unit 200 to produce binary cels in order to generate a color morphology map, as well be described in greater detail below. Additionally, color cels may be analyzed to ascertain the shape and location of various coatings, such as partially transparent overlays, and output defect reports when detected as being defective.

Surface Defect Detection

Figure 12:
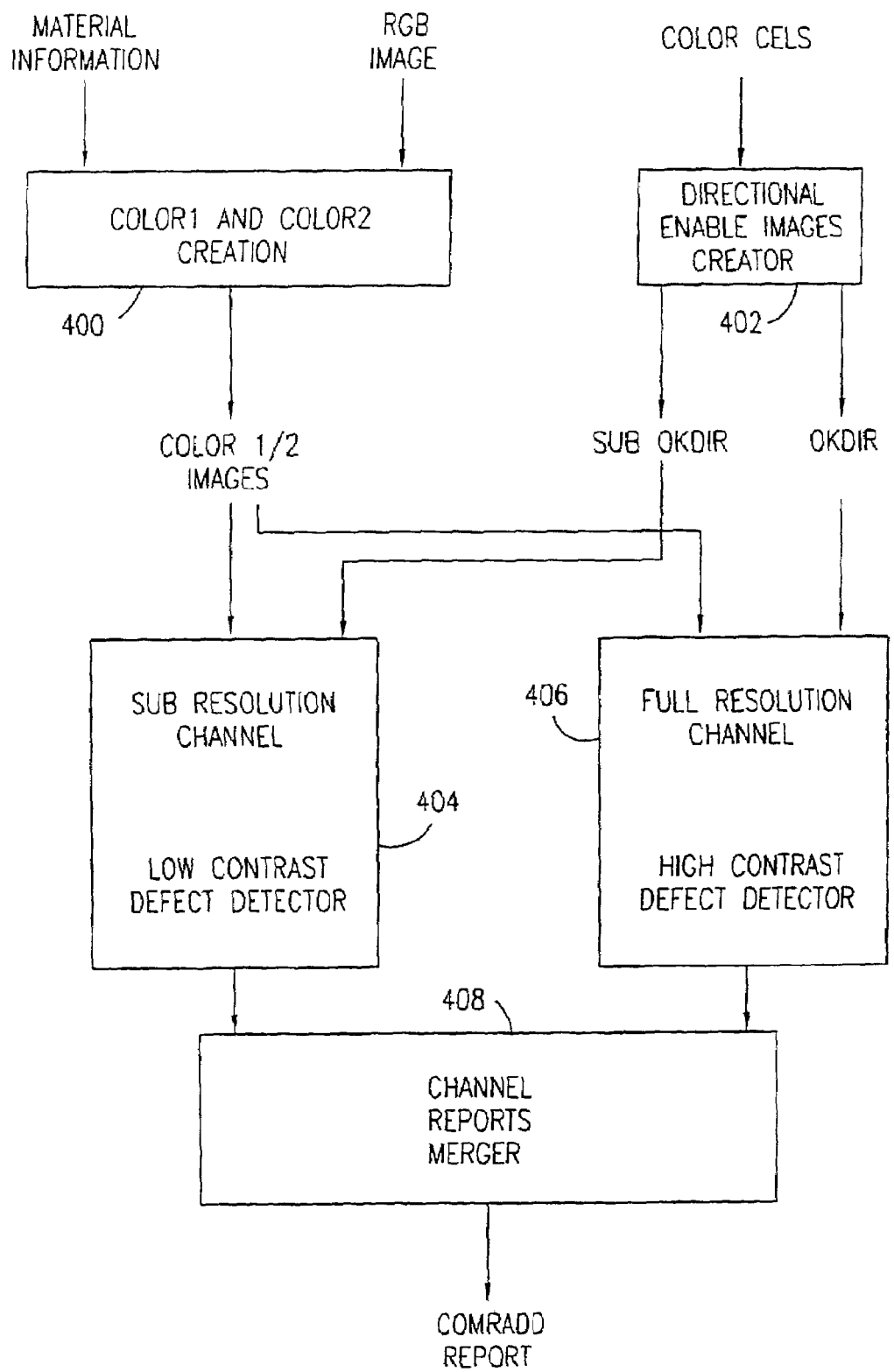
FIG. 12 is a simplified block diagram illustration of a preferred implementation of the color surface defects subunit 190 of FIG. 1.

Reference is now made to FIG. 12, which is a simplified block diagram illustration of a preferred implementation of the color surface defects subunit 190 of FIG. 1. For brevity of reference, the color surface defects subunit 190 is sometimes referred to herein as COMRADD 190.

Surface defects, also known as area defects can be described as local abnormalities within a randomly textured surface, and typically include: residues such as process residues remaining on the surface of an article being inspected, voids in various coatings and platings, irregulari ties in the surface topography of the article including and in particular in metal coatings, scratches, foreign materials, stains, and oxidation of various metals and metal coatings. Surface defects are preferably classified into two groups:

high contrast defects, which generally comprise defects with well defined edges on which a strong gradient can be measured, such as a scratch or a pit; and low contrast wide area defects, which generally comprise defects with unclear edges, on which a relatively weak gradient is measurable, such as a water stain or an oxidized region.

Defects may also be classified in other ways, such as:

chromatic defects, which generally differ from their surroundings mainly by color; oxidized regions are an example of chromatic defects; and achromatic defects, or intensity oriented defects, that is, defects which are either brighter or darker than their surrounding, such as, for example, pits, scratches, and stains.

Generally, the apparatus of FIG. 12 seeks to detect surface defects as described above, even on topologically complex surfaces comprising a variety of materials and textures. Preferably, the apparatus of FIG. 12 is designed to operate inside a material, ignoring the edges thereof, and thus is designed to receive an input segmented into materials and edges, such as the output produced by the material contours subunit 180, described above. Preferably, the apparatus of FIG. 12 achieves its results using multi-resolution detecting, applying chromatic and achromatic detectors in parallel at different resolutions. The apparatus of FIG. 12 can preferably be configured to operate at different sensitivities for different materials, and at different sensitivities as a function of distance from material edges. Preferably, the apparatus of FIG. 12 produces a report of detected surface defects. Preferably, the surface defects are considered candidate defects, and the report is accompanied by a snapshot image of each possibly defective location in the image being inspected; the report and the snapshot image may be further processed as desired.

Thus, it will be appreciated that, in the present invention, preferred inputs to the apparatus of FIG. 12 include the color image data defining the object or image being inspected, material information as produced by the material identification subunit 170, and color cel information as produced by the material contours unit 180.

Preferably, for purposes of efficiency of operation, the apparatus of FIG. 12 is preferably implemented partly or wholly in special purpose hardware, as is well-known in the art, with the remainder, if any, being implemented in software and general purpose hardware.

The apparatus of FIG. 12 preferably comprises the following units:

1. A color1/color2 creation unit 400 which preferably receives the color information and the material information and is preferably operative to derive therefrom two derived color images, known herein as color1 and color2.

Preferably in the present invention, a preferred color is predefined for detecting chromatic defects in each material, and a preferred color is predefined for detecting achromatic defects in each material. The color1 image is then defined as the best image for detecting achromatic defects, and the color2 image is similarly defined as the best image for detecting chromatic defects. Each of the color1 image and the color2 image preferably comprises a collage in which each pixel, according to its associated material, is assigned a pixel taken from one of four possible gray scale images: R, G, B, and one of the HSI transformations thereof; the chosen one of the three HSI transformations is preferably chosen to be effective for the materials which are expected to be present in the image (FIG. 13).

Figure 13:
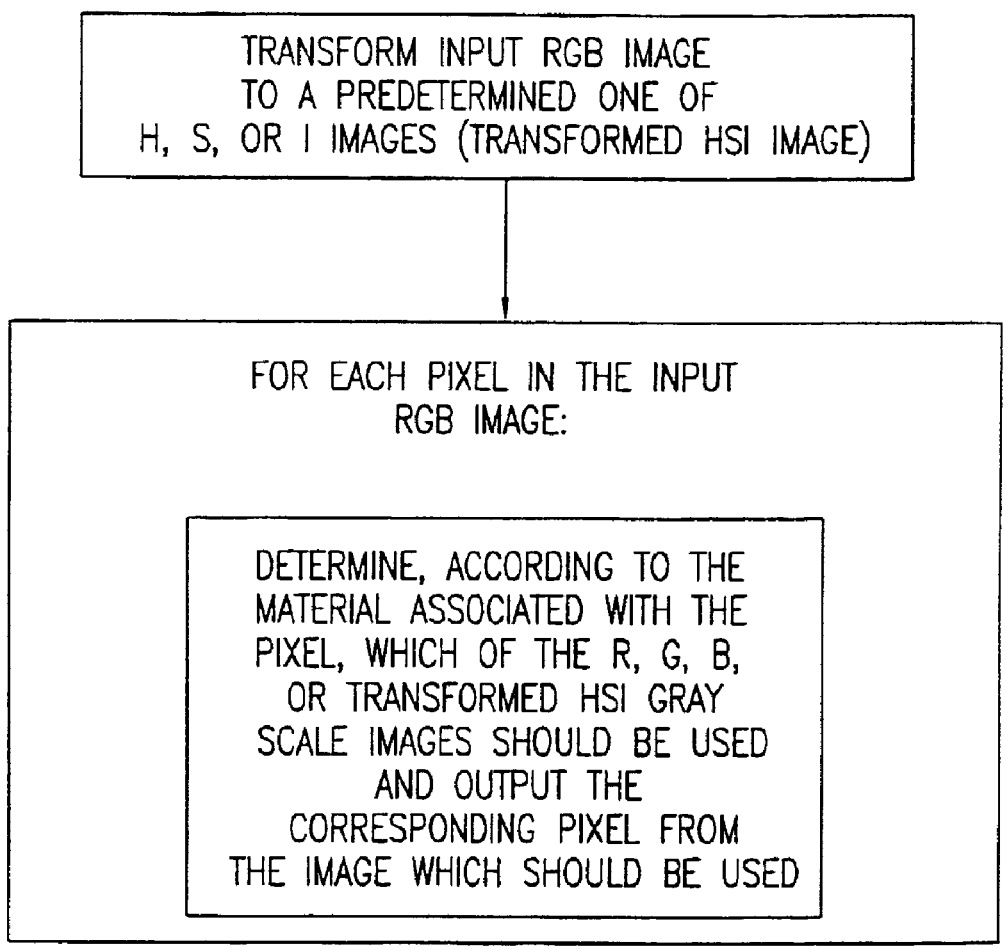
FIG. 13 is a simplified flowchart illustration of a preferred method of operation of the color1/color2 creation unit 400 of FIG. 12.

Reference is now additionally made to FIG. 13, which is a simplified flowchart illustration of a preferred method of operation of the color1/color2 creation unit 400 of FIG. 12. The method of FIG. 13 is self-explanatory with reference to the above discussion.

2. A directional enable images creator 402 which receives the color cel information and is preferably operative to produce two directional enable images, okdir and sub-okdir, which are preferably used to control further operation of the apparatus of FIG. 12. It will be appreciated by persons skilled in the art that, in applying a sensitive defect detector on a poly-material image it is very desirable to avoid false alarms that originate from material edges.

Strong gradients are generally measured on material edges; therefore, in the present invention, particularly with respect to surface defect detection, it is desirable to disable gradient measurement at or near material edges. The following strategy is used in the present invention to make it possible to find defects near material edges without incurring false alarms from gradients associated with the material edges. The image is preferably divided into three main groups: on the edges, no measurements are taken; near the edges, measurements are only taken in a direction parallel to the local edge direction, this direction of measurement being termed herein the "okdir" direction; in other places, normal measurements are performed. Preferably, an okdir map is used for full resolution measurement, while a derived "sub okdir" map is used for sub resolution measurement.

The term "sub resolution", as used herein, refers generally to the use of a sub sampled image, such as an image in which only every nth pixel in each dimension, such as every 5th pixel in each dimension, of the original image is used. By "shrinking" the image using a sub sampled image, it is appreciated, as is well known in mathematics, that certain computed values such as gradient values are increased, since distances shrink without pixel value shrinking. In this way, low contrast defects may become more apparent.

A preferred implementation of the portion of the directional enable images creator 402 which creates okdir is described in more detail below with reference to FIG. 14, and of the portion which creates sub okdir below with reference to FIG. 21.

3. and 4. Multi-resolution gradient measuring apparatus comprising a sub resolution channel low contrast defect detector 404 and a full resolution channel high contrast defect detector 406, each preferably receiving the color1 and color2 images, the low contrast detect detector 404 preferably receiving the sub-okdir enable image and the high contrast detect detector 406 preferably receiving the okdir enable image, each of the low contrast detect detector 404 and the high contrast defect detector 406 being operative to perform gradient analysis and to produce a report of defects. Preferably, a total of four edge detectors are employed, one each for each of the color1 and color2 images in each of the low contrast defect detector 404 and the high contrast defect detector 406. In addition, two small defect detectors are preferably employed only in the full resolution channel high contrast defect detector 406, one for each of the color1 and color2 images. Thus, preferably a total of six detectors are employed.

5. A channel reports merger 408 which is preferably operative to receive reports from each of the low contrast defect detector 404 and the high contrast defect detector 406 and to produce therefrom an appropriate merged report.

Figure 14:
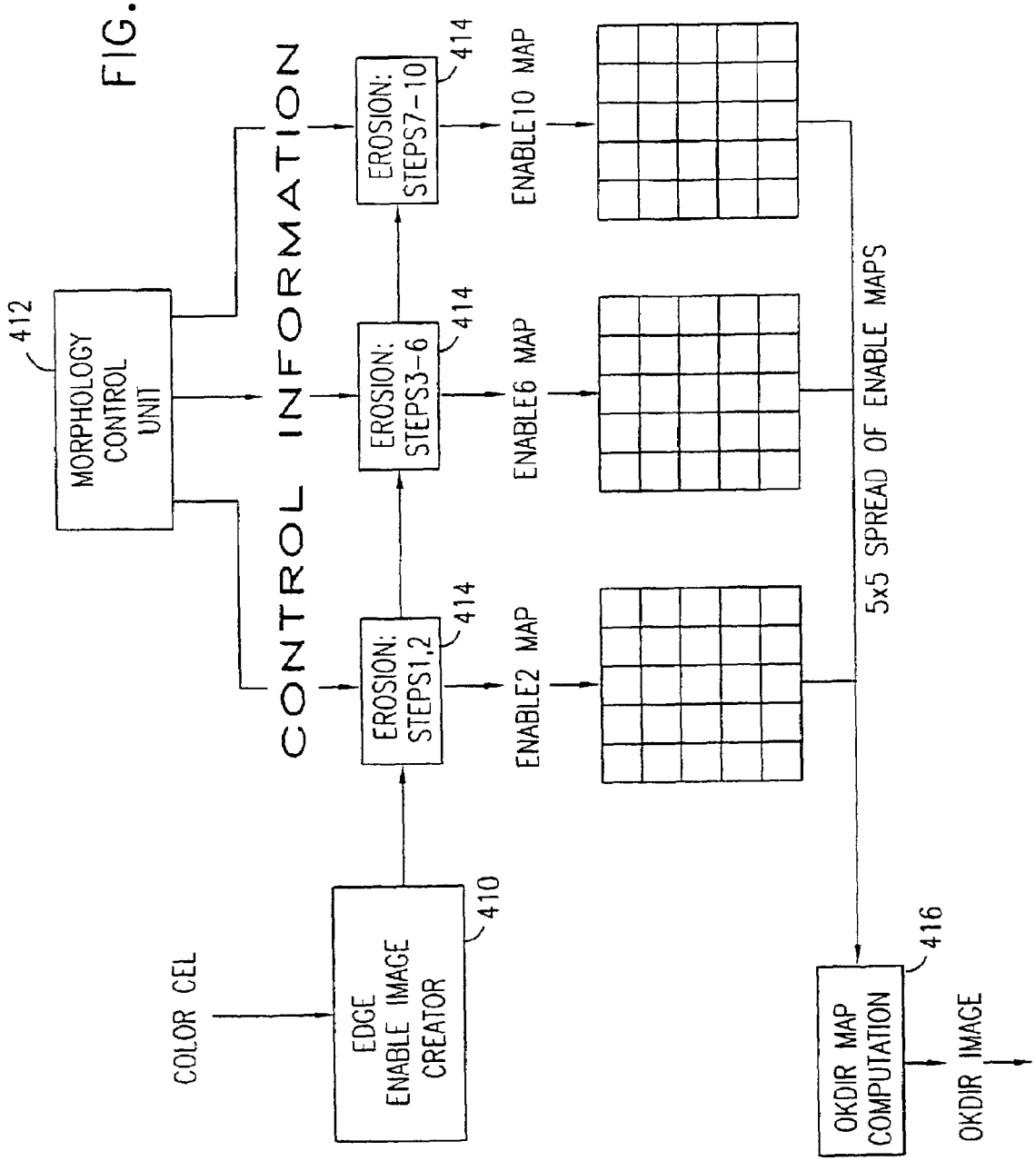
FIG. 14 is a simplified block diagram illustration of a preferred implementation of a first portion of the directional enable images creator 402 of FIG. 12.

Reference is now made to FIG. 14, which is a simplified block diagram illustration of a preferred implementation of a first portion of the directional enable images creator 402 of FIG. 12. The portion of the directional enable images creator 402 illustrated in FIG. 14 is the portion which creates okdir; the portion which creates sub okdir is described below with reference to FIG. 21.

The apparatus of FIG. 14 preferably comprises an edge enable image creator 410, which preferably receives color cel information as input and is preferably operative to derive therefrom an edge enable image. In the edge enable image all pixels which "touch" any cel are preferably marked as edge pixels while all other pixels are left unmarked, representing material pixels; thus the edge enable image is created as a binary image.

Figure 15:
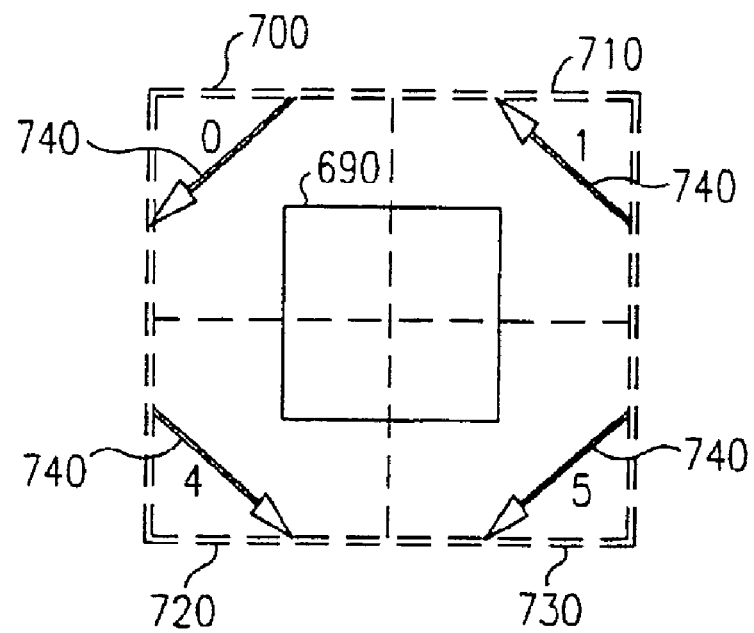
FIG. 15 is a simplified pictorial illustration of an image pixel and neighboring virtual cel pixels, useful in understanding the operation of the apparatus of FIG. 14.

Reference is now additionally made to FIG. 15, which is a simplified pictorial illustration of an image pixel and neighboring virtual cel pixels, useful in understanding the operation of the apparatus of FIG. 14. Typically, for each image pixel such as an image pixel 690, a neighborhood of four virtual cel pixels centering around the image pixel 690, such as virtual cel pixels 700, 710, 720, and 730 is considered. The virtual cel pixels 700, 710, 720, and 730 are typically numbered 0, 1, 2, and 3 respectively according to their position.

If no cel is found in any of the four neighboring virtual cel pixels 700, 710, 720, and 730 the image pixel 690 is not considered to be an edge pixel. If a cel is found in any of the four neighboring virtual cel pixels 700, 710, 720, and 730, the image pixel 690 is considered to be an edge pixel unless all such cels are excluded cels 740 as indicated in FIG. 15. In accordance with FIG. 10 and the description thereof above, the excluded cels 740 comprise:

| virtual cel picture number | reference number | excluded cel number |
|---|---|---|
| 0 | 700 | 0 |
| 1 | 710 | 1 |
| 2 | 720 | 4 |
| 3 | 730 | 5 |

Referring back to FIG. 14, the apparatus of FIG. 14 preferably comprises a morphology control unit 412, typically implemented as a LUT, which is preferably operative to provide control information to a plurality of erosion units 414, typically comprising 3 erosion units 414. Each of the 3 erosion units 414 is preferably operative to apply erosion, as is well known in the art, to the edge enable image created by the edge enable image creator 410. Typically, a first erosion unit 414 applies 2 levels of erosion and produces an enable2 map; a second erosion unit 414 applies 4 more levels of erosion and produces an enable6 map; and a third erosion unit 414 applies 4 more levels of erosion and produces an enable10 map. Typically, except for their inputs and control information received, each of the three erosion units 414 is identical.

Preferably, each erosion step is carried out according to an erosion key having a value; one possible example of an erosion key value is as follows: "0C CCCT CC00". Preferably, each character of the erosion key represents a single erosion step, reading from left to right, each step being preferably interpreted according to an erosion operator as follows:

| key character | description of erosion operator |
|---|---|
| 0 | do not erode, output = input |
| S | save, do not consume open ends |
| C | do not break connectivity |
| N | allow breaking of connectivity |
| T | smooth edge by eating small protrusions |

Preferably, all of the erosion operators comprise orthogonal operators, that is, operators that consume a central pixel if one of the central pixel's four first order neighbors is already eaten. It is appreciated that the enable2 map is preferably produced by operations "0C", the enable6 map by further operations "CCCT", and the enable10 map by further operations "CC00". It will be appreciated by persons skilled in the art that the "0" erosion steps are preferably included for ease of certain hardware implementations.

The enable maps are preferably used to extend the range, within an edge, from which the edge direction can be determined. The erosion operations tend to increase the size of the original edge enable image, thus allowing a determination of edge detection at a greater distance from the edge; preferably, an okdir-envelope of up to 10 pixels width may be created.

The apparatus of FIG. 14 also preferably includes an okdir map computation unit 416, which is operative to produce an okdir image. Reference is now additionally made to FIG. 16, which is a simplified flowchart illustration of a preferred method of operation of the okdir map computation unit 416. The method of FIG. 16 preferably comprises the following steps:

A relevant enable image, from among the 3 enable images, is determined (step 418).

Figure 16:
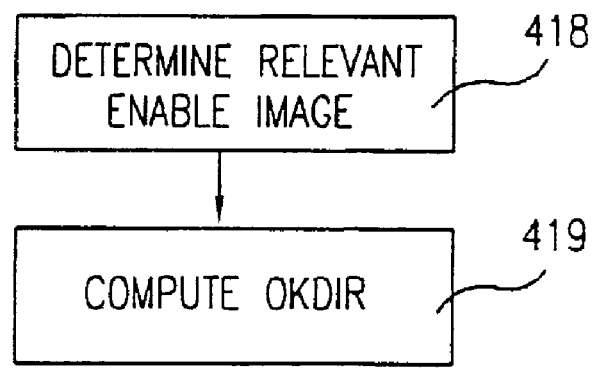
FIG. 16 which is a simplified flowchart illustration of a preferred method of operation of the okdir map computation unit 416 of FIG. 14.
Figure 17:
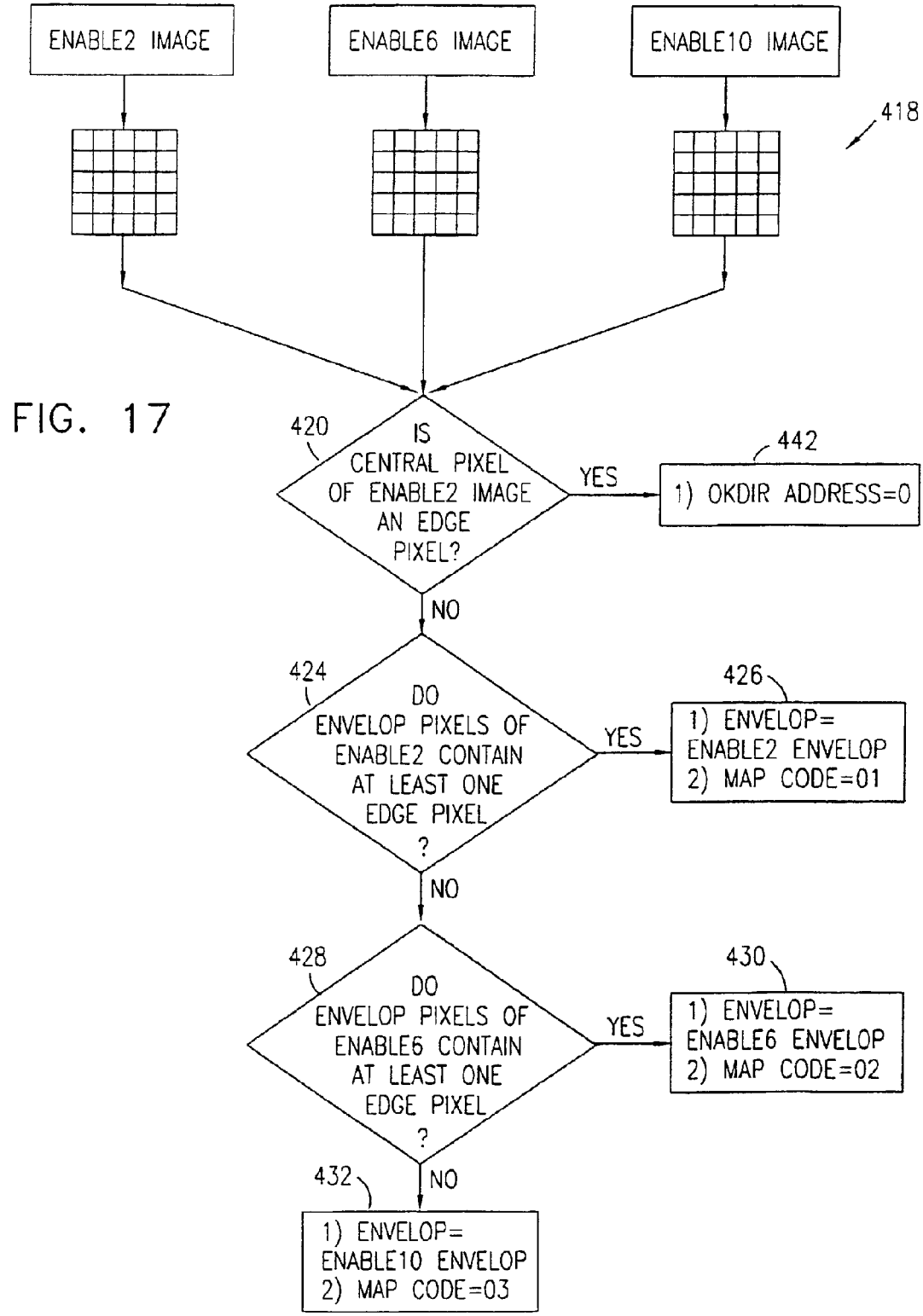
FIG. 17 is a simplified flowchart illustration of a preferred implementation of step 418 of FIG. 16.

Reference is now additionally made to FIG. 17, which is a simplified flowchart illustration of a preferred implementation of step 418 of FIG. 16. The following definitions may be useful in understanding the method of FIG. 17:

envelop pixels: pixels that reside on the borders of a 5×5 matrix;

okdir address: envelop and map code, as described below;

envelop: a bit map of the envelope pixels of a chosen enable image, the chosen enable image being chosen from among the enable2 image, the enable6 image, and the enable10 image, preferably in accordance with the method of FIG. 17;

map code, a code, typically implemented as a 2 bit code, describing a chosen enable map, typically according to the following interpretation:

| code | interpretation |
|---|---|
| 00 | central pixel is an edge pixel |
| 01 | envelop taken from enable2 image |
| 02 | envelop taken from enable6 image |
| 03 | envelop taken from enable10 image |

The method of FIG. 17 preferably receives as input the 3 enable images comprising the enable2 image, the enable6 image, and the enable10 image and preferably comprises the following steps:

A check is made as to whether the central pixel of the enable2 image is an edge pixel (step 420). If so, okdir address is set to 0 (step 422); that is, both envelop and map code are set to 0, and the method of FIG. 17 terminates.

Otherwise, a check is made as whether the envelop pixels of the enable2 image include at least one edge pixel (step 424). If so, envelop is set equal to the enable2 envelop, map code is set equal to 01 (step 426), and the method of FIG. 17 terminates.

Otherwise, a check is made as to whether the envelop pixels of the enable6 image include at least one edge pixel (step 428). If so, envelop is set equal to the enable6 envelop, map code is set equal to 02 (step 430), and the method of FIG. 17 terminates.

Otherwise, envelop is set equal to the enable10 envelop and map code is set equal to 03 (step 432).

Generally, it will be appreciated by persons skilled in the art that the method of FIG. 17 is operative to choose the envelop of the smallest enable map which includes an edge pixel, unless the central pixel of the enable2 image is an edge pixel, in which case no envelop is chosen.

Figure 18:
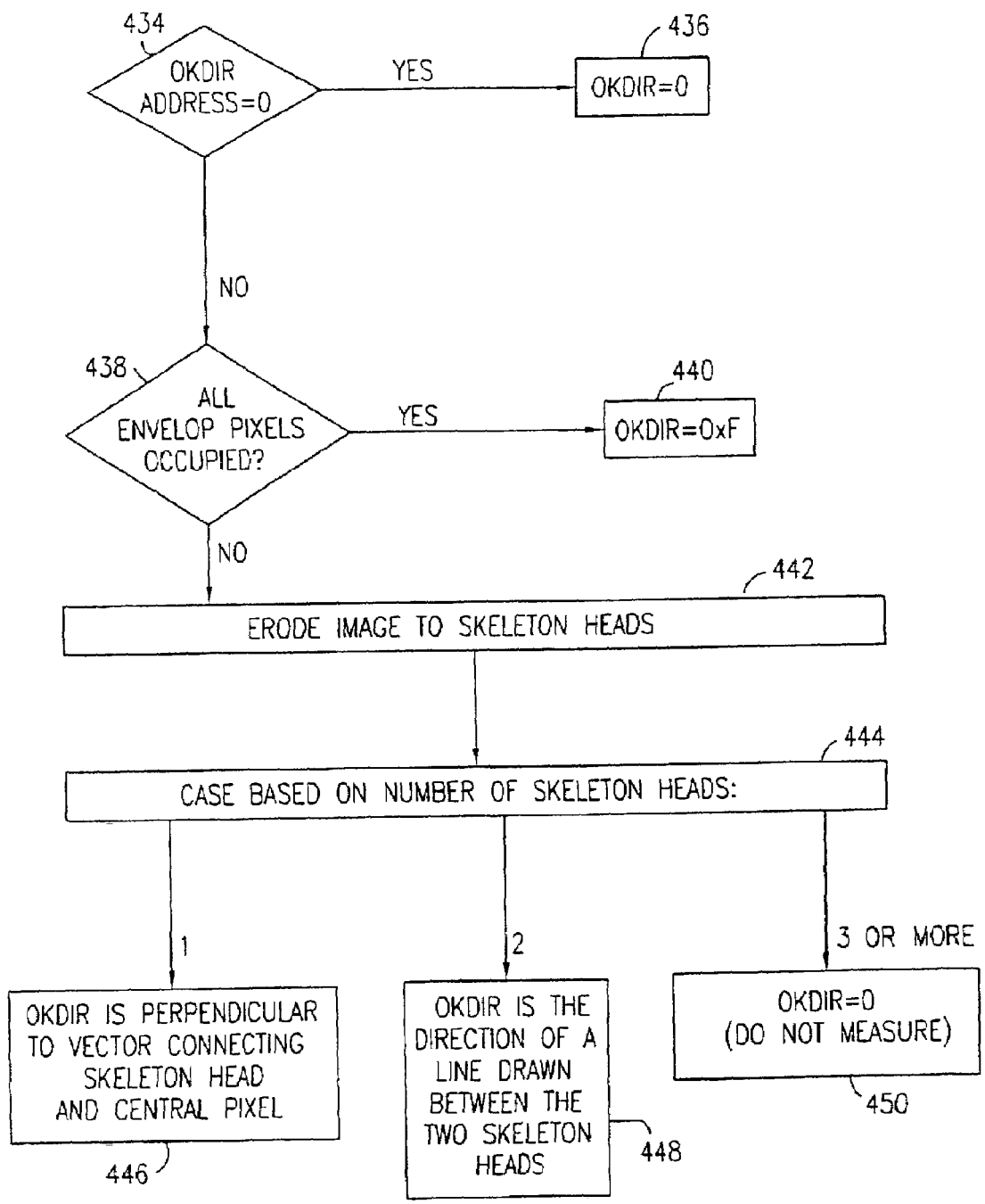
FIG. 18 is a simplified flowchart illustration of a preferred implementation of step 419 of FIG. 16.

Referring back to FIG. 16, the okdir is computed (step 419). Preferably, for reasons of efficiency as described above, step 419 is implemented in hardware in a LUT. Reference is now additionally made to FIG. 18, which is a simplified flowchart illustration of a preferred implementation of step 419 of FIG. 16. The method of FIG. 18 preferably includes the following steps:

A check is made as to whether okdir address equals 0 (step 434); if so, okdir is also set equal to 0 (step 436).

A check is made as to whether all of the envelop pixels are occupied (step 438); if so, okdir is set equal to 15, typically represented as a hexadecimal number 0×F (step 440).

Figure 19:
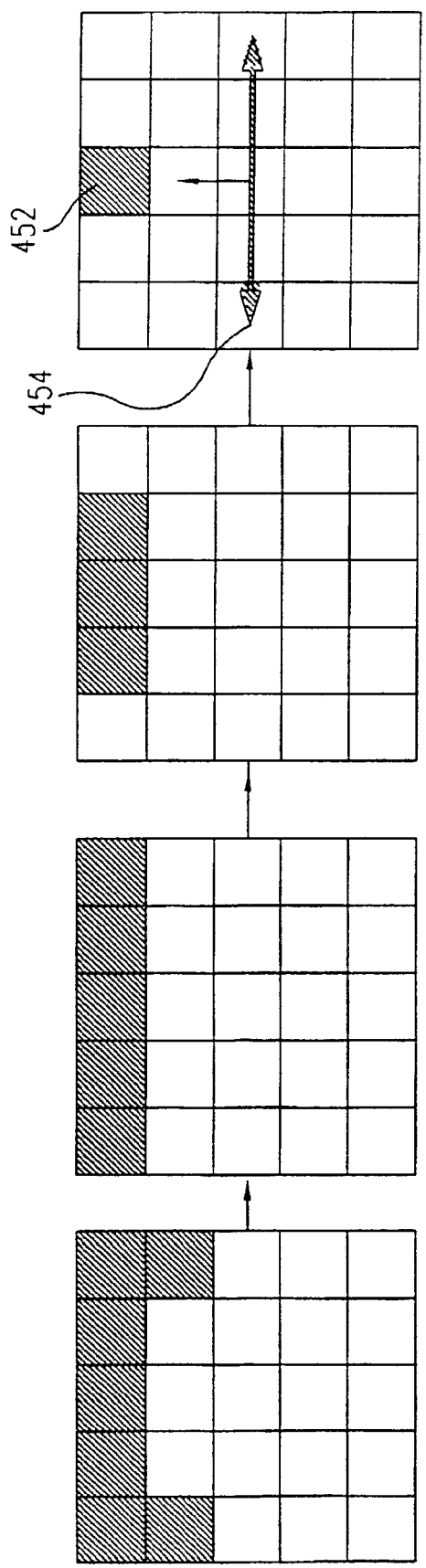
FIG. 19 is a simplified pictorial illustration of an example of a process of erosion, useful in understanding the method of FIG. 18.

The enable image is then eroded to skeleton heads (step 442); a skeleton head is a single isolated pixel which remains after erosion. Reference is now additionally made to FIG. 19, which is a simplified pictorial illustration of an example of a process of erosion resulting in one skeleton head 452.

Referring back to FIG. 18, an action is taken based on one of three possible cases concerning the number of skeleton heads (step 444):

If there is 1 skeleton head, okdir is perpendicular to a vector connecting the skeleton head and the central pixel of the spread (step 446). This case of okdir direction is shown as reference number 454 in FIG. 19.

If there are 2 skeleton heads, okdir is the direction of a line drawn between the two skeleton heads (step 448).

If there are 3 or more skeleton heads, okdir is set to 0, indicating that no measurement is to be taken.

Reference is now additionally made to FIG. 20, which is a table showing okdir values, corresponding directions of measurement, and a preferred gradient operator for measuring. In the table of FIG. 20, "LinearDiff" refers to a linear differential operator, as is well known in the art, while "HalfSobel" refers to a modified Sobel operator, called a half Sobel operator, which is described in more detail below. The table of FIG. 20 is otherwise self-explanatory.

Figure 21:
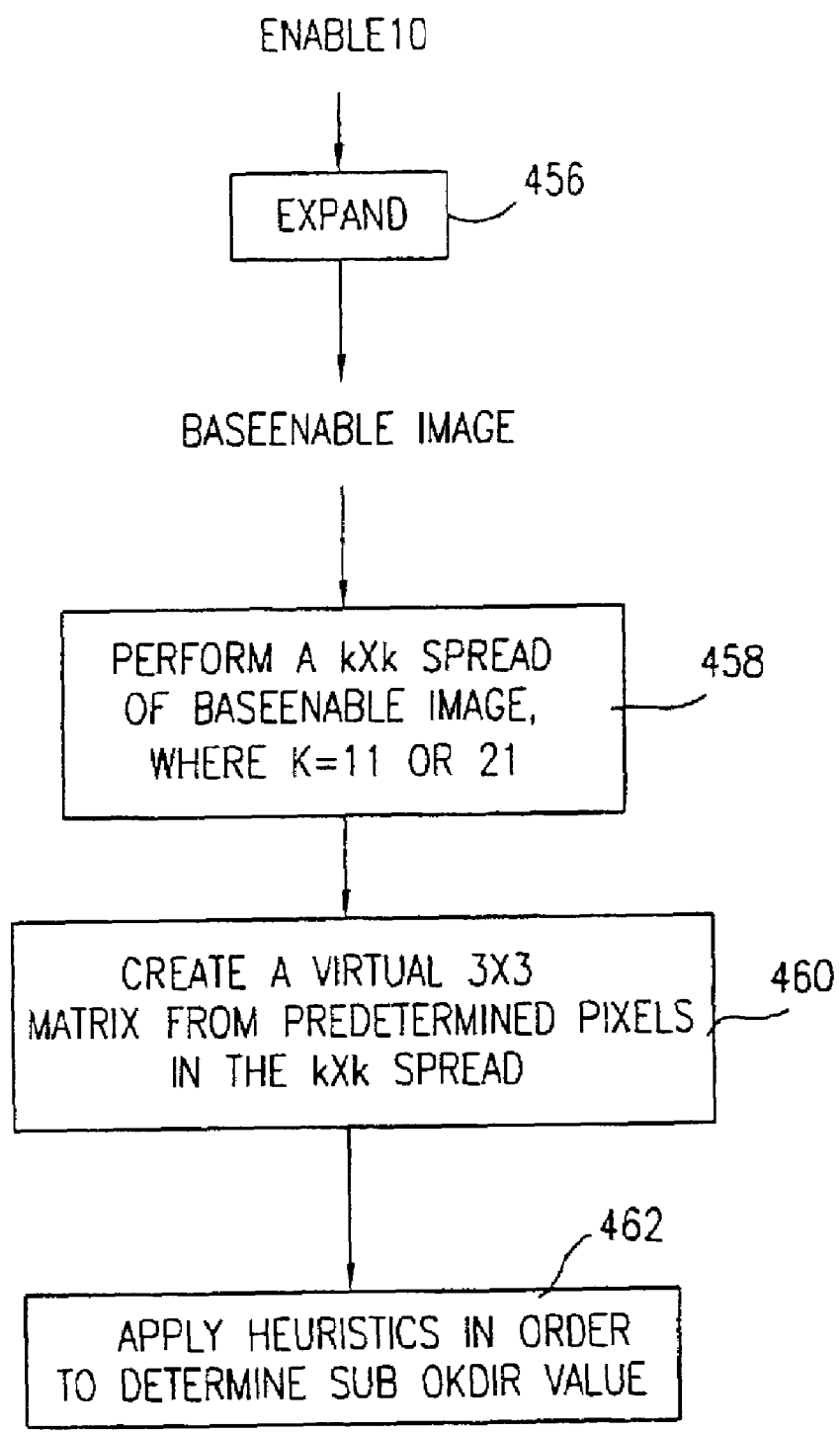
FIG. 21 is a simplified flowchart illustration of a preferred method of operation of a second portion of the directional enable images creator 402 of FIG. 12.

Reference is now made to FIG. 21, which is a simplified flowchart illustration of a preferred method of operation of a second portion of the directional enable images creator 402 of FIG. 12; the method of FIG. 21 is directed towards production of the sub okdir image.

The method of FIG. 21 preferably comprises the following steps:

An enable10 image, produced as described above with reference to FIG. 14, is received as input and is expanded (step 456). Preferably, expanding the enable11 image includes performing a 5×5 spread and, if any one of the pixels in the expansion is an edge pixel, setting the central pixel of the spread to be an edge pixel. The image thus produced is referred to herein as a "baseenable" image.

Figure 22:
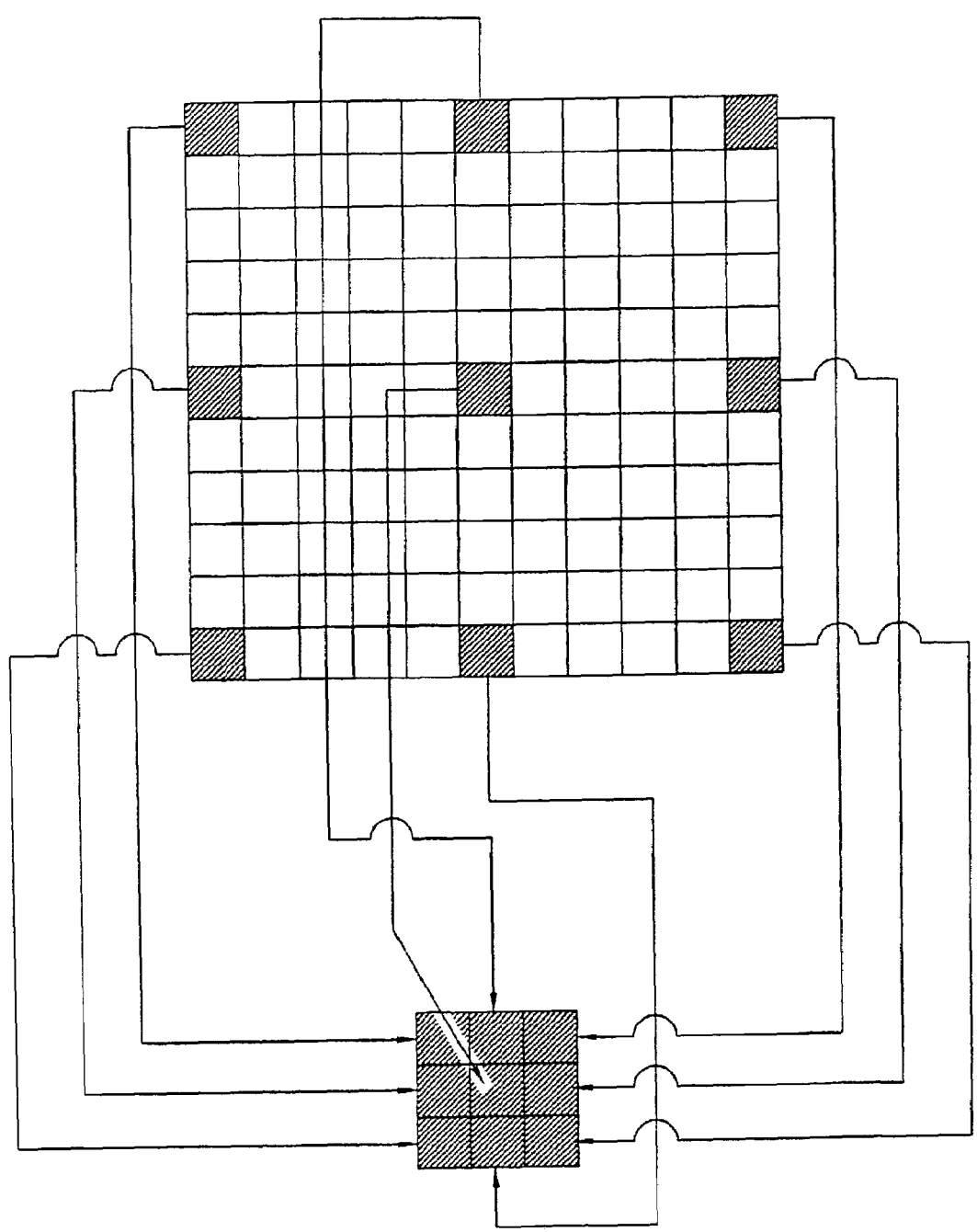
FIG. 22 is a simplified pictorial illustration of a preferred choice of predetermined pixels, useful in understanding the method of FIG. 21.

A k×k spread of the baseenable image is performed, with k preferably equal to 11 or 21 (step 458). A virtual 3×3 spread is then created from 9 predetermined pixels in the k×k spread (step 460). Reference is now additionally made to FIG. 22, which illustrates a preferred choice of predetermined pixels for an 11×11 spread, it being appreciated that a similar choice of predetermined pixels may be made for a 21×21 spread or for another spread. It will further be appreciated that the choice of 9 pixels from the k×k comprises a form of subsampling.

A set of heuristics is applied in order to determine the sub okdir value from the virtual 3×3 spread (step 462). Reference is now additionally made to FIG. 23A, which is a table illustrating preferred heuristics for use in step 462 of FIG. 21, and to FIG. 23B, which is a simplified pictorial illustration showing a naming convention for the 9 pixels of the 3×3 virtual spread, the names of FIG. 23B being used in FIG. 23A. FIGS. 23A and 23B are self-explanatory.

Reference is now made to FIG. 24, which is a simplified flowchart illustration of a preferred method of operation of a portion of the apparatus of FIG. 12. The flowchart of FIG. 24 comprises a preferred method of operation of the full resolution channel 406, the sub resolution channel 404, and the channel reports merger 408 of FIG. 12. Portions of the flowchart of FIG. 24 relating to the aforementioned portions of FIG. 12 are indicated generally in FIG. 24 by reference numbers 404, 406, and 408.

Preferably, as described above with reference to FIG. 12, both the full resolution channel 406 and the sub resolution channel 404 receive as input both the color1 image and the color2 image.

The method of FIG. 24 preferably comprises the following steps:

1. Steps relating to the full resolution channel 406:

The input images are smoothed, preferably with a 3×3 mirror Gaussian filter (step 464). As is well known in the art, a Gaussian filter may be used to smooth an image and to reduce texture effects therein. It is appreciated that a Gaussian filter has a disadvantage in that pixels which are next to an edge may be influenced by neighboring edge pixels, effectively expanding the edge towards the material; this problem may be referred to as an "edge effect". In the present invention, a mirror Gaussian operator, combining a Gaussian operator with a mirror operator which transforms pixels in a 3×3 spread into the pixel on the opposite side of the 3×3 spread, is used to overcome the edge effect known in the prior art, and thereby to smooth image data relating to non border regions in a manner which is not influenced by image data relating to borders.

Figure 25:
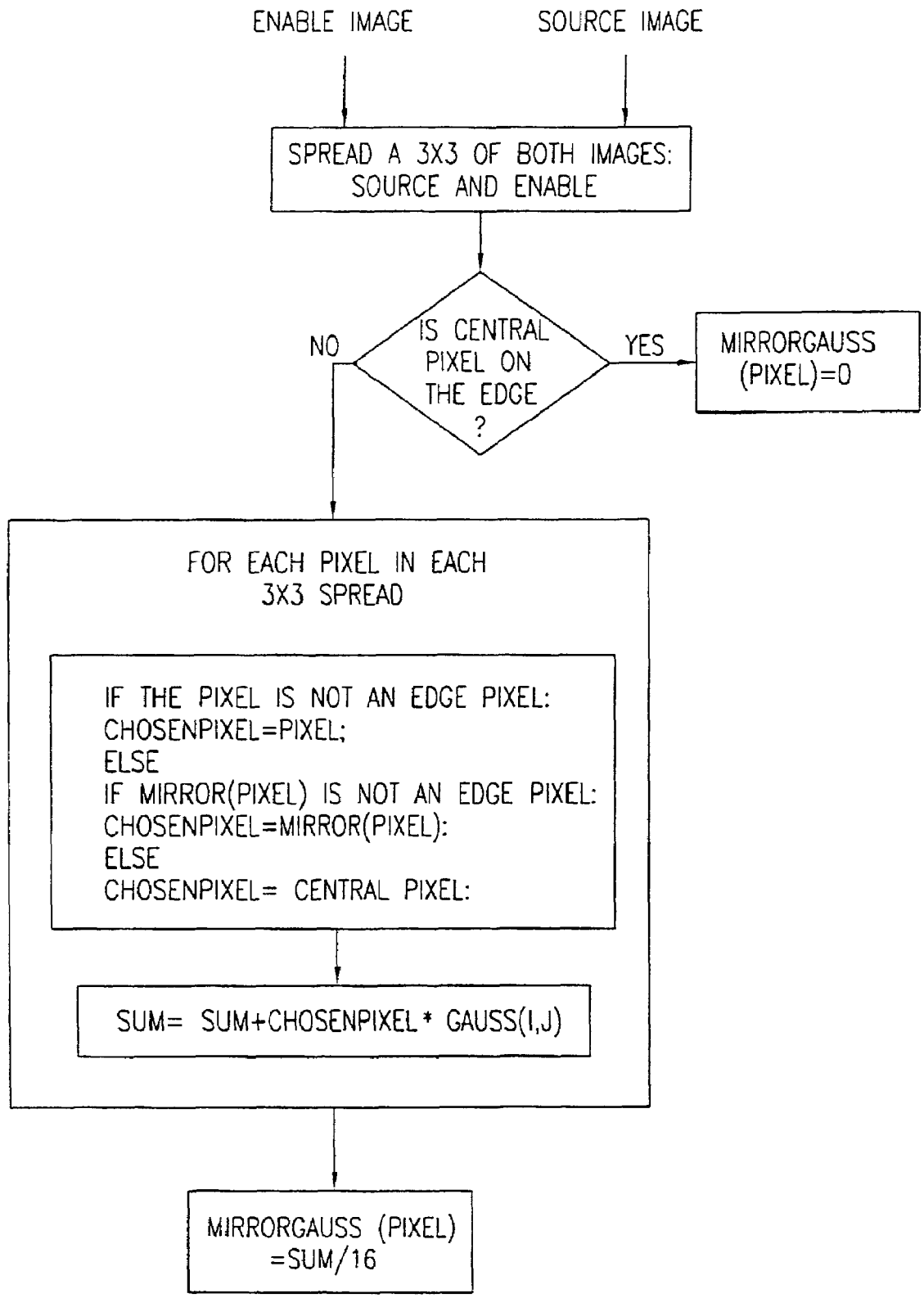
FIG. 25 is a simplified flowchart illustration of a preferred implementation of step 464 of FIG. 24.

Reference is now additionally made to FIG. 25, which is a simplified flowchart illustration of a preferred implementation of step 464 of FIG. 24, in which Gauss(i,j) represents application a standard Gaussian function. The method of FIG. 25 is self-explanatory.

Returning to FIG. 24, an appropriate gradient operator is applied (step 466), the gradient operator typically comprising a half Sobel detector within material regions and a linear differential detector (LinearDiff) along edges.

In the present invention applying a linear differential detector preferably comprises measuring in the okdir direction, or in the sub okdir direction in the case of the sub resolution channel, a difference in pixel value between the head "b" of a short vector and the tail "a" of the short vector. The value of the linear differential detector is preferably the value at "b" minus the value at "a".

A Sobel operator, as is well known in the art and as described herein, is a gradient operator combining a gray level derivative along the principal horizontal and vertical axes, convoluted with a gray level derivation along the diagonals. As described below, in the method of FIG. 24 the Sobel operator is used in the sub resolution channel. Typically a Sobel operator may be implemented as two separately applied operators, a horizontal operator such as:

$$\begin{matrix} 1 & 0 & -1 \\ 2 & 0 & -2 \\ 1 & 0 & -1 \end{matrix}$$

and a vertical operator such as:

$$\begin{matrix} 1 & 2 & 1 \\ 0 & 0 & 0 \\ -1 & -2 & -1 \end{matrix}$$

In the present invention, an improved Sobel-type operator known as the half Sobel operator is used, preferably in step 466, with the purpose of adding to the properties of the Sobel operator detection of local minima and/or maxima. Typically, a half Sobel horizontal operator has the form:

$$\begin{matrix} 1 & 0 & 0 & 0 & -1 \\ 0 & 0 & 0 & 0 & 0 \\ 2 & 0 & -/+4 & 0 & -2 \\ 0 & 0 & 0 & 0 & 0 \\ 1 & 0 & 0 & 0 & -1 \end{matrix}$$

while a half Sobel vertical operator typically has the form:

$$\begin{matrix} 1 & 0 & 2 & 0 & 1 \\ 0 & 0 & 0 & 0 & 0 \\ 0 & 0 & -/+4 & 0 & 0 \\ 0 & 0 & 0 & 0 & 0 \\ -1 & 0 & -2 & 0 & -1 \end{matrix}$$

Typically, a half Sobel operator is applied in two steps. Taking the following form of a half Sobel horizontal operator, where the entries refer to the values of the pixels falling under the operator, with the "–" symbol indicating that the operator has a zero value at that pixel location:

| A1 | — | — | — | B1 |
|---|---|---|---|---|
| A0 | — | C | — | B0 |
| A2 | — | — | — | B2 |

Let Dif0=(2*A0+A1+A2)−4*C; let Dif1=4*C−(2*B0+B1+B2). Then the gradient Grad computed with the half Sobel operator is given by:

Grad=*Dif0+Dif1*

If the signs of Dif0 and Dif1 are different, there may be a local extremum, comprising a local minimum or a local maximum, at or near the C pixel.

The output of step 466 comprises horizontal and vertical gradient images, separately obtained from the color1 and color2 images.

The gradient is then normalized (step 468), preferably with a normalization operator based on distance from an edge, and preferably separately for Dif0 and Dif1. In operation of surface detectors on several materials simultaneously, problems arise because each material has a different inherent texture, creating a different level of gradients sometimes referred to as "noise". A gradient noise level which indicates a defect in one material might be regarded as normal texture in a second material.

It is appreciated that various methods might be employed to overcome the problem of different texture in different materials. One method would be to apply adaptive threshold. Alternatively, a separate normalization function may be provided for each material, within one threshold then being applied to the normalized gradients thus obtained.

In step 468 of the present invention, gradient normalization is preferably used. For each material, an appropriate normalization function is set in advance, the normalization functions being picked to obtain uniform results. Preferably appropriate normalization functions may be determined as follows: a histogram of gradients of all materials is obtained; a median gradient value is determined for each material; and a normalization operation, as is well known in the art, is applied to obtain normalization functions.

In step 468, the normalized gradient is then preferably computed as follows:

NormGrad=NormFun(material distance from edge)
*Gradient*EdgeFactor(NarrowArea)

where:
NormGrad is the normalized gradient value;
NormFunction(material distance from edge) is the normalization function for the material, which may be determined as described above;
Gradient is the input gradient value;
and EdgeFactor(NarrowArea) is a factor, generally ranging between 0 and 1, and chosen to give less weight to gradients near an edge; EdgeFactor(NarrowArea) preferably has, for example, a value of 0.8 near an edge.

Figure 26:
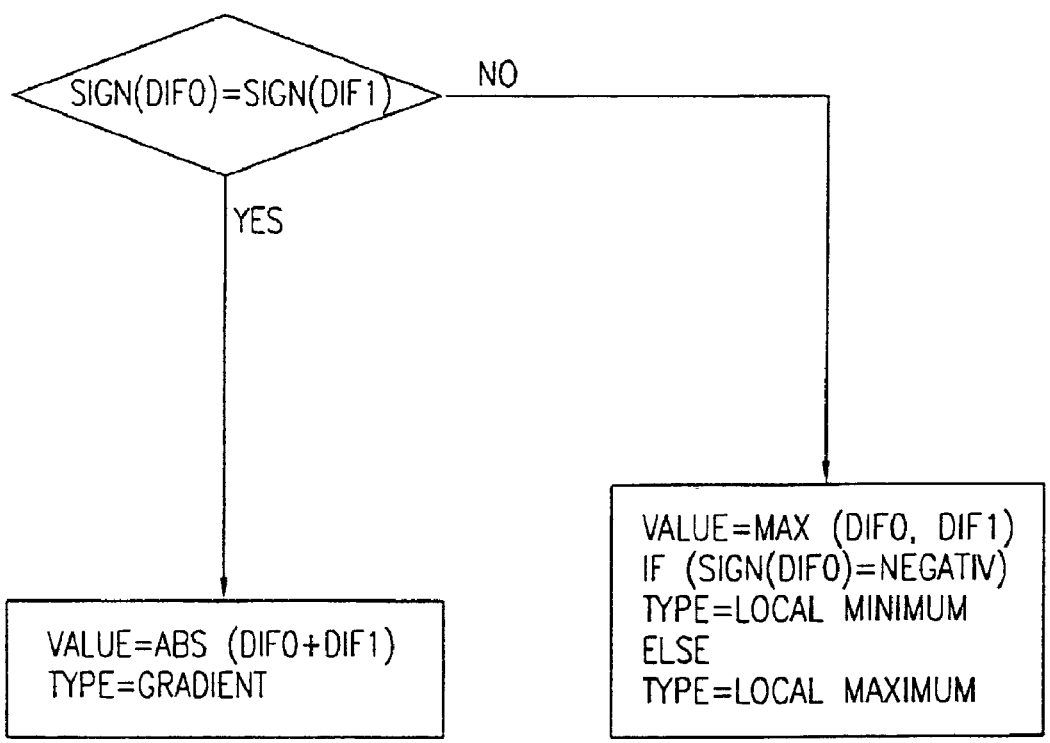
FIG. 26 is a simplified flowchart illustration of a preferred implementation of a portion of step 470 of FIG. 24.

Gradients, whose computation was described above, are analyzed, classified, and thresholded (step 470). Reference is now additionally made to FIG. 26, which is a simplified flowchart illustration of a preferred implementation of a portion of step 470 of FIG. 24, including analysis and classification. In FIG. 26, Dif0 and Dif1 are preferably as described above with reference to step 466. It is appreciated that, in a case where a LinearDiff operator is used, as described above, Dif0 and Dif1 are preferably measured linearly and represent differences between a central pixel and head and tail pixels of a vector along the direction (corresponding to the current okdir direction) on which LinearDiff is measured. In a case, for example, where c is the gray value of a central pixel and b and a are gray values of head and tail pixels, Dif0 and Dif0 are preferably given by:

*Dif0=c−b*; and

*Dif1=a−c.*

The method of FIG. 26 is self-explanatory.

Referring back to FIG. 24, in step 470 thresholding is then applied. Based on predetermined criteria, typically derived from previous analysis of images, a threshold is applied to gradient and maxima/minima determinations, preferably to grade each gradient or maxima/minima report as follows:

| | |
|---|---|
| 0 | no report |
| 1 | weak report |
| 2 | medium report |
| 3 | strong report |

The output of step 470 preferably comprises separate color1 and color2 reports, for local minima/maxima defects and for gradient defects in each case. The color1 and color2 reports are unified (step 472), preferably by applying a "survival of the strongest" rule, typically represented by the following logic:

If (report value (color1)>=report value (color2))
report color=color1
report value=report (color1)
report type=report type (color1)
Else
report color=color2
report value=report (color2)
report type=report type (color2)

Results of step 472 are then filtered (step 474), typically by analyzing a 3×3 spread of reports, computing a weighted sum, and applying a predetermined threshold; preferably, this operation is performed in a hardware LUT.

2. Steps Relating to the Sub Resolution Channel 404:

The image is smoothed, preferably with a 5×5 chessboard median filter (step 476); this step is parallel to step 464 in the full resolution channel. In the sub resolution channel, large defects are searched for; hence, it is desirable to ignore small features, even if they have a large variance from the surrounding area. It is therefore preferred to use a large kernel size filter designed to ignore pixels which vary greatly from their neighbors. Preferably, a median filter is used, in which data is sampled and the median value is determined and used, as is well-known in the art. For ease of implementation, it is desired to perform the median computation on a sub-sample, such as a 5×5 chessboard sub-sample such as the following, in which pixels marked with an X are sampled and those marked with a 0 are not sampled:

```
X 0 X 0 X
0 X 0 X 0
X 0 X 0 X
0 X 0 X 0
X 0 X 0 X
```

Gradient detectors are applied (step 478); this step is parallel to step 466, and is preferably similar to step 466 except that a Sobel detector is used within the material. Sobel detectors are described above, particularly in reference to step 466.

Gradient normalization takes place (step 480), parallel to and preferably similar to the gradient normalization of step 468.

In step 482, gradient thresholding, similar to the thresholding in parallel step 470, is performed, and the color reports are unified. Unification of color reports in step 482 is preferably similar to step 472. A report image, including unfiltered gradient defects, is thus produced.

A large area results filter is applied (step 484); this step is parallel to step 474. In step 484, preferably a 3×3 filter similar to that described above with reference to step 474 is first applied. Then, the result of the 3×3 filter is used to make a lager spread, such as a 9×9 spread, which is then similarly filtered based on thresholding of a weighted sum. Preferably, the 9×9 spread is subsampled after filtering, typically according to the following pattern, with X representing pixels that are sampled and 0 representing pixels that are not sampled:

```
0 0 0 0 0 0 0 0 0
0 X 0 0 X 0 0 X 0
0 0 0 0 0 0 0 0 0
0 0 0 0 0 0 0 0 0
0 X 0 0 X 0 0 X 0
0 0 0 0 0 0 0 0 0
0 0 0 0 0 0 0 0 0
0 X 0 0 X 0 0 X 0
0 0 0 0 0 0 0 0 0
```

Optionally, the result is then diluted when there is a report "cloud" of clustered reports, with external reports defining the edge of the cloud not being diluted, while internal reports are diluted, thus saving storage space by keep a smaller number of representative reports.

3. Merging of the Sub Resolution Channel Report and the Full Resolution Channel Report.

The sub resolution channel report and the full resolution channel report are merged (step 468). Merging is done by the following rules:

1. "Survival of the strongest", similar to that described above with reference to step 472.

2. When two reports have the same strength, that of the finer detector is used, according to the following order:
local minima/maxima>full gradient>sub gradient In a typical implementation, each item in the final report comprises a 9 bit word, with a typical structure as follows:

| Field | Bits | Values/interpretation |
|---|---|---|
| Report type | 2 | 0 sub gradient |
| | | 1 full gradient |
| | | 2 local maximum |
| | | 3 local minimum |
| Report strength | 2 | 0 no report |
| | | 1 weak report |
| | | 2 strong report |
| | | 3 diluted report |
| Report color | 1 | 0 intensity oriented (color1) |
| | | 1 chromatic oriented (color2) |
| Wide/Narrow | 1 | 0 wide area (within material) |
| | | 1 narrow area (close to material edge) |
| Report material | 3 | 0–7 (based on color classification) |

Morphological Skeleton Production

Reference is now made to FIG. 27, which is a simplified flowchart illustration of a preferred method of operation of the line and space skeleton subunit 230 of FIG. 1. The method of FIG. 27 comprises an erosion method, erosion methods in general being well known in the art. The line and space skeleton subunit 230 preferably receives as an input binary cels produced by binarization and cel production subunit 200, preferably derived from monochrome image data. The steps of FIG. 27 preferably comprise the following:

The image undergoing erosion for skeleton production pixel by pixel is traversed in predetermined X and Y scanning directions (step 490), such as, for example, left to right along each row in the X direction followed by top to bottom in the Y direction.

For each pixel, erosion is performed, typically according to the 4 or 8 nearest neighbors of the pixel being eroded (step 492). Reference is now additionally made to FIGS. 28A and 28B, which are simplified pictorial illustrations of an array of pixels, before and after partial erosion, useful in understanding the method of FIG. 27. In FIG. 28A a pixel being eroded 496, marked as A4, may be eroded in accordance with pixel values of either:

four horizontal and vertical neighbors 498, marked as A1, A3, A5, and A7; or eight nearest neighbors comprising the four horizontal and vertical neighbors 496 and four diagonal neighbors 500, marked as A0, A2, A6, and A8.

Which nearest neighbors are chosen may vary according to the analysis being performed. Persons skilled in the art will appreciate that erosion based on four nearest neighbors favors the principal horizontal and vertical axes, while erosion based on eight nearest neighbors allows erosion along the diagonals as well. In principle, in order to allow more uniform erosion it would be preferable to erode both using four and using eight nearest neighbors, but in practice either one of four or eight nearest neighbors may be used. In either case, erosion is preferably from black pixels taken to have the value of 1 to white pixels taken to have the value of 0, it being appreciated that erosion from white to black and/or assigning of opposite values from those mentioned above to white and black pixels is also possible. Preferred erosion rules are as follows:

for four neighbors, set the central pixel 496 to 0 if any of the four horizontal and vertical neighbors 498 has a value of 0; and for eight neighbors, set the central pixel 496 to 0 if any of the four horizontal and vertical neighbors 498 or any of the diagonal neighbors 500 has a value of 0.

Preferably but not necessarily in the present invention, connectivity is preserved during erosion; that is, connected black pixels should stay connected and not be "broken" even after erosion. If connectivity is to be preserved, connectivity conditions, typically comprising Euler's conditions, which are well known in the art, are applied (step 494). Euler's conditions are geometric conditions which are meant to preserve connectivity if the sum or score indicated by Euler's conditions is preserved before and after erosion. To preserve connectivity, erosion does not take place if Euler's conditions are violated.

Figure 29:
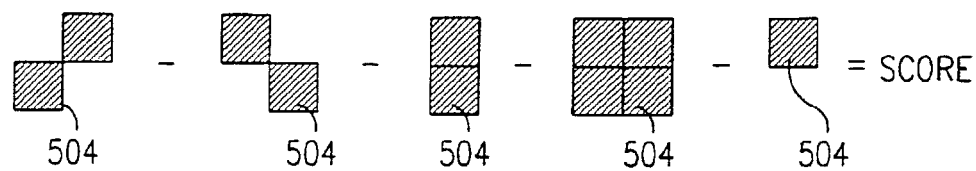
FIG. 29 is a simplified pictorial depiction of Euler's conditions, useful in understanding the method of FIG. 27.

Referring to FIG. 28B, pixels which have already been eroded 502 are indicated as P0, P1, P2, P3. The pixel being eroded 496 is preferably eroded only if the conditions mentioned above with respect to step 492 are fulfilled, and Euler's conditions are also fulfilled. Reference is now additionally made to FIG. 29, which is a simplified pictorial depiction of Euler's conditions. In FIG. 29, the number of occurrences of a plurality of patterns 504 is to be added and subtracted as indicated in FIG. 29 in order to obtain the sum which should be invariant before and after erosion.

Preferably, the method of FIG. 27 is implemented in custom hardware for efficiency of operation, as described above. It is appreciated that the method of FIG. 27 may be performed one or a plurality of times for each image, thus performing one or more stages of erosion. Preferably, the number of stages of erosion performed varies according to the maximum thickness of any feature being eroded, so that, at the end of erosion, a skeleton of one pixel width is obtained. Each stage may be performed with 4 or 8 neighbors, and with or without preserving connectivity, it being appreciated that use of 4 neighbors on some erosions and 8 neighbors on other erosions may aid in obtaining isotropy of erosion.

Figure 30A:
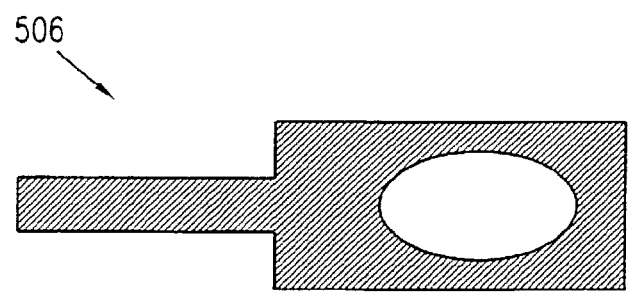
FIGS. 30A–30C are simplified pictorial illustrations useful in understanding a preferred method of operation of the morphology subunit 240 of FIG. 1.
Figure 30B:
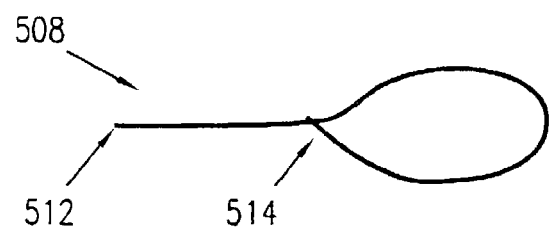
Figure 30C:
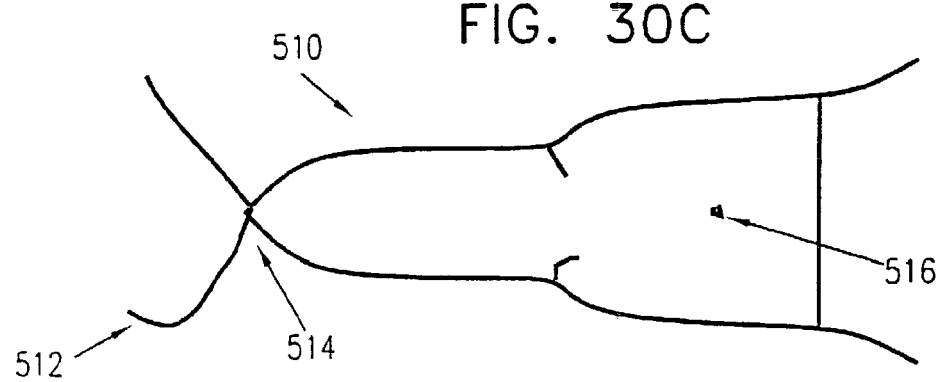

Reference is now made to FIGS. 30A–30C, which are simplified pictorial illustrations useful in understanding a preferred method of operation of the morphology subunit 240 of FIG. 1. The morphology subunit 240 preferably receives an input from the line and space skeleton subunit 230 and an image of homogeneous color populations from the material identification In FIG. 30A an example of an image before erosion 506 is depicted. In FIG. 30B, an example of a result of erosion of black 508 of the image before erosion 506 of FIG. 30A, is depicted. In FIG. 30C, an example of a result of erosion of white 510 of the image before erosion 506, of FIG. 30A is depicted.

In FIGS. 30B and 30C, examples of typical morphological events which are to be detected are shown as follows: open ends 512; junctions 514; and a blob junction 516.

Figure 31A:
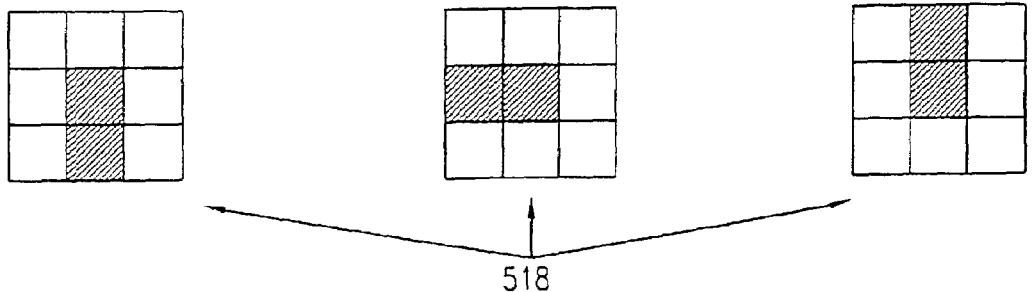
FIGS. 31A–31C are simplified pictorial illustrations of operators, useful in understanding FIGS. 30A–30C.
Figure 31B:
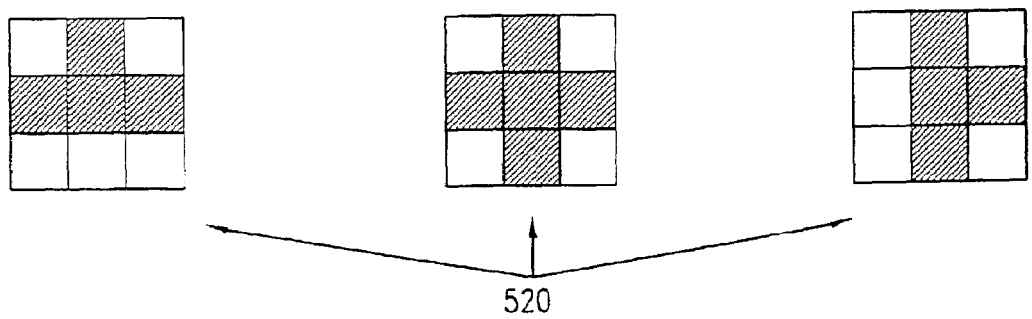
Figure 31C:
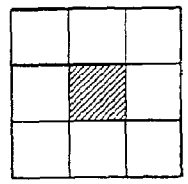

Reference is now made to FIGS. 31A–31C, which are simplified pictorial illustrations of operators, useful in understanding FIGS. 30A–30C. In a preferred embodiment of the present invention, examples of operators, also known as kernels, depicted in FIGS. 31A–31C may be applied, as is well known in the art to either the image of FIG. 30B or the image of FIG. 30C to detect morphological events. In FIG. 31A open end kernel operators 518 are depicted. In FIG. 31B, junction operators 520 are depicted. In FIG. 31C, a blob junction operator 522, which may be used for depicting "black" islands surround by white, is depicted.

It is readily appreciated that although shown with respect to a black and white image, or binary image, originating from the binarization and cel production subunit 200, in accordance with a preferred embodiment of the present invention, regions and features in the eroded binary images shown in FIGS. 30B and 30C are correlated to homogeneous color populations. In this way particular features, such as 512; junctions 514; and a blob junction 516 may be related to homogeneous color populations, and by further correlation as described above, to the materials and material combinations represented by the respective homogeneous color populations.

Figure 32:
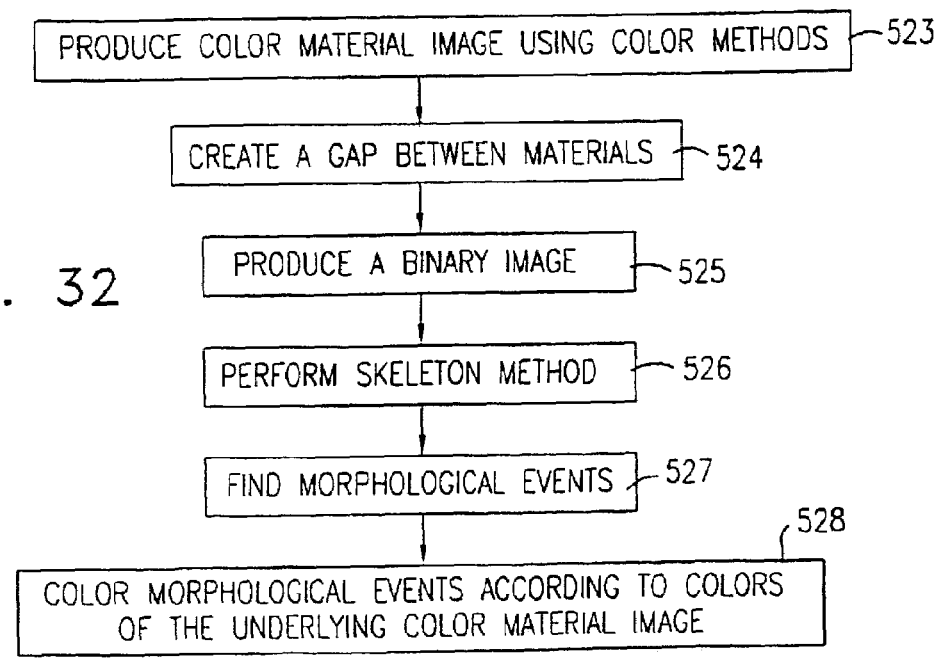
FIG. 32 is a simplified flowchart illustration of a preferred method of color morphology analysis of an image.

Reference is now made to FIG. 32, which is a simplified flowchart illustration of a preferred method of color morphology analysis of an image. The method of FIG. 32 is described, for purposes of simplicity of description, after the description of binary morphology analysis of an image, it being appreciated that the method of FIG. 32 might be, for example, implemented, at least in part, in the CLRP unit 120 of FIG. 1, in which color information is available. It is appreciated that the method of FIG. 32 is generally useful for color morphology analysis of an image, and may therefore be useful in other contexts of color image analysis as well, outside the specific scope of the CLRP unit 120 of FIG. 1. It will be appreciated by persons skilled in the art that the method of FIG. 32 may be used for analysis of any appropriate optical characteristic of an image, and in particular that the method of FIG. 32 is not limited to morphology analysis.

The method of FIG. 32 preferably comprises the following steps:

A color material image is produced using color methods (step 523), typically as described above with reference to color processing. The color material image is preferably produced by material identification sub-unit 170, and each material is correlated to a homogeneous color population. It is readily appreciated that production of the color material image typically significantly reduces the number of different color populations relative to the number of populations in the color image data.

A gap is preferably created between materials (step 524), typically by assigning an artificial color value to pixels in each area along each border between materials, in order to separate the material areas for further processing. A binary image is produced from the output of step 524 (step 525), typically using methods, such as thresholding, which are well known in the art. Alternatively, the color image may converted to a gray level monochrome image, by any conventional method known in the art, and provided to binarization and cel production sub-unit 200 which produces therefrom a binary image.

A skeleton method is performed on the output of step 525 (step 526); preferably, the method of FIG. 27 is used. Morphological events in the output step 526 are identified (step 527), preferably as described above with reference to FIGS. 30A–30C.

The morphological events are then correlated to homogenous color populations, for example by "coloring" the features according to the colors of corresponding locations in the underlying material image produced by step 523 above (step 528). In accordance with a preferred embodiment of the present invention, the coloring step is carried out by superimposing the eroded skeleton image and the material image so that the features in the skeleton image receive colors according to on of the colors of the homogeneous color populations in the superimposed material image.

Thus, a color morphology image, comprising a morphology map having colors from the homogeneous color populations, or materials, assigned to features, is produced.

Nick and Protrusion Processing

Figure 33A:
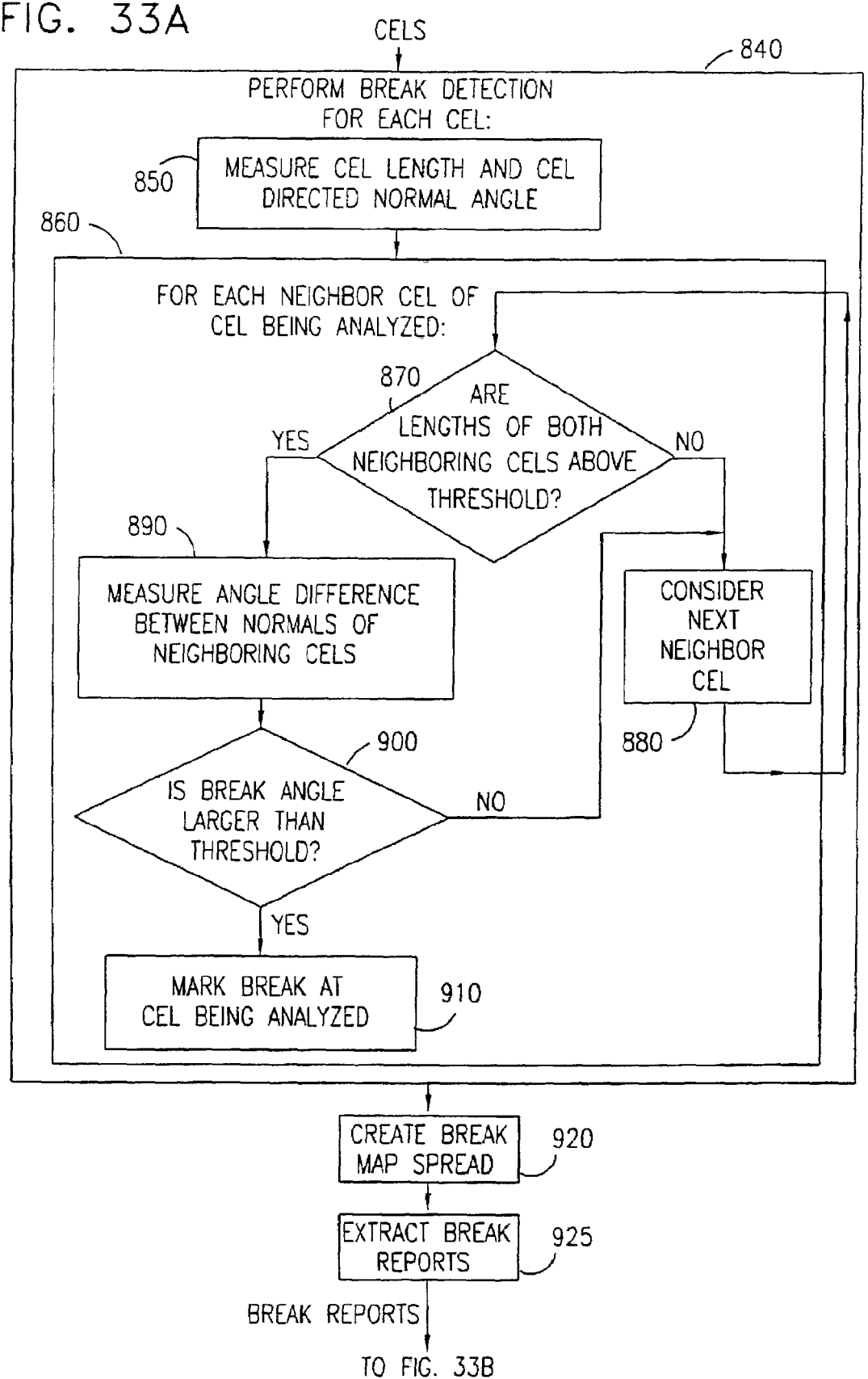

Reference is now made to FIGS. 33A and 33B, which, taken together, comprise a simplified flowchart illustration of a preferred method of operation of the nicks and protrusions subunit 220 of FIG. 1. The terms "nick" and "protrusion" refer to small defects on an edge; a nick is a defect that extends into the edge, while a protrusion is a defect wherein the edge extends outward from its proper location. The nicks and protrusions subunit 220 of FIG. 1 is preferably operative to identify nicks and protrusions and to distinguish nicks and protrusions from normal features of an object whose image is being analyzed such as, for example, corners. It is appreciated that detection of nicks and protrusions is especially interesting in inspecting objects such as described herein, in which a multiplicity of small features having straight edges is present, and in which defects such as nicks and protrusions are fairly common, and typically not desirable.

Figure 35:
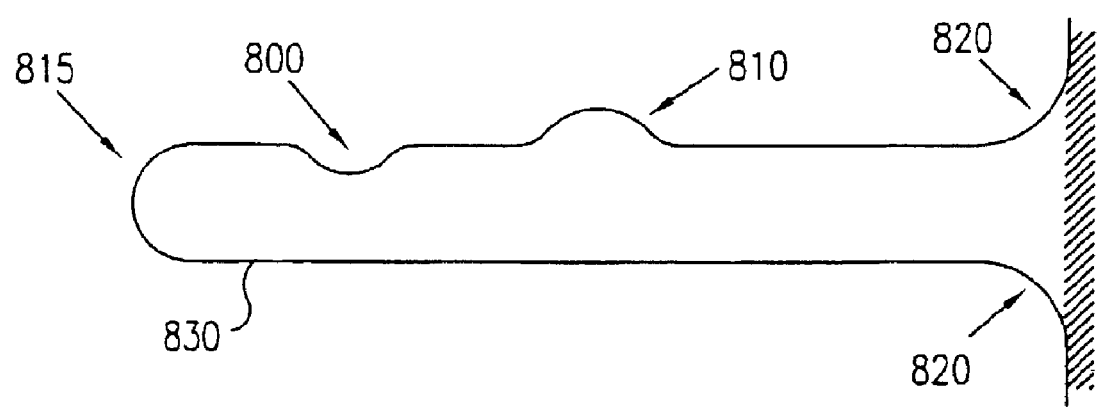
FIG. 35 is a simplified pictorial illustration of a portion of an image to be analyzed, useful for understanding the method of FIGS. 33A and 33B.

Reference is now additionally made to FIG. 35, which is a simplified pictorial illustration of a portion of an image to be analyzed, useful for understanding the method of FIGS. 33A and 33B. The image of FIG. 35 includes a nick 800, a protrusion 810, a corner-in 815 and two corners-out 820, all falling along an edge 830. In a preferred embodiment of the present invention, nick and protrusion detection is based on analyzing edge contours which define borders between different materials, preferably by measuring an aperture of deviation among neighboring contour elements, and classifying suspected defects by a change in an angle of a normal to the edge 830, as one travels along the edge 830.

It will be appreciated that nicks and protrusions have opposite profiles of angle change of the normal, such that the nick 800 might be characterized as having an in-out-in" change, while the protrusion 810 has an "out-in-out" angle change. The corner-in 815, on the other hand, has an "in-in-in" angle change, while the corners-out 820 have an "out" angle change. It is therefore appreciated than an appropriate method of measuring and analyzing normal angle changes should be capable of distinguishing between nicks, protrusions, and normal features such as corners.

The method of FIGS. 33A and 33B preferably includes the following steps:

It is appreciated that, for the sake of efficiency of operation, steps 840 and 930 (both described below) are preferably implemented in parallel, each of steps 840 and 930 receiving cels to be analyzed as input.

Break detection is performed for each cel being analyzed in an image, typically for all cels in the image (step 840). Step 840 preferably comprises the following steps 850, 860, 870, 880, 890, 900, and 910:

At a cell being analyzed, the cel length and cel directed normal angle are measured (step 850). Referring back to FIGS. 9–11, it will be appreciated that there are preferably only a small predetermined number of possible cels, and therefore it may be preferred to determine cel length and cel angle from a LUT.

The following steps 870, 880, 890, 900, and 910 are then preferably performed for each neighbor cel of the cel being analyzed (step 860). It is appreciated that each cel has only 4 neighbors since, referring again back to FIGS. 9–11, it is appreciated a cel can only continue in the direction of one of the 4 neighbors and not in one of the 4 "corner" directions.

The length of the neighbor cel is checked to make sure that the neighbor cel length is above a predefined threshold such as, for example, a threshold of ¼ pixel (step 870). If the neighbor cel length is not above the predefined threshold, processing continues with the next neighbor cel (step 880).

If the neighbor cel length is above the predefined threshold, neighbor cel directed normal angles are determined, preferably using a method similar to that described above with reference to step 850, and a break angle is computed (step 890). Reference is now additionally made to FIG. 34, which is a simplified pictorial illustration helpful in understanding step 890 of FIG. 33A. FIG. 34 depicts a cel 891 and neighbor cels 892 and 893. Normals 894 and 895 to cels 892 and 893 respectively are shown. A break angle 896 is then the break angle of the cel 891.

A check is made as to whether the break angle is larger than a predetermined threshold such as, for example, a threshold of approximately 22 degrees. (step 900). If the break angle is not larger than the predetermined threshold, processing continues with step 880, referred to above.

If the break angle is larger than the predetermined threshold, a break is marked for the cel being analyzed (step 910), typically in a suitable map.

In order to make sure that the region of cels around the cel being analyzed in step 840 is marked as having a problem, a break map spread is created, thus effectively expanding the break report; that is, two neighboring pixels, comprising two pixels in which the cel being analyzed continues, are also marked as having a break (step 920). In expanding the break report, preferably no previous report recorded for a neighboring pixel is overwritten, in order prevent a reported break from being overwritten by the expansion of a neighboring break.

Break reports are then extracted (step 925) and passed on to step 980, described below.

Preferably in parallel to the above-described steps of FIG. 33A, feature characterization is performed for each cel being analyzed in an image, typically for all cels in the image (step 930). Step 930 preferably comprises the following steps 940, 950, 960, and 970:

A midpoint of the cel is determined (step 940). It will be appreciated, as described above, that since there are only a limited number of possible cels in each virtual cel pixel, it may be preferred and most efficient to find the cel midpoint via a LUT.

Two edge cels for the feature which the cel currently being analyzed is part of are determined within a spread around the cel being analyzed, typically within a 5 by 5 array of virtual cel pixels centering around the cel being analyzed (step 950). It is appreciated that, for regions of efficiency of implementation, it would be desirable to determine the feature depth and aperture from the edge cels via a LUT, but a straightforward LUT implementation using a 5 by 5 array would required 25 bits of LUT address, or $2^{25}$ entries, which is considered to be number of entries which is too difficult to process in practice.

Figure 36:
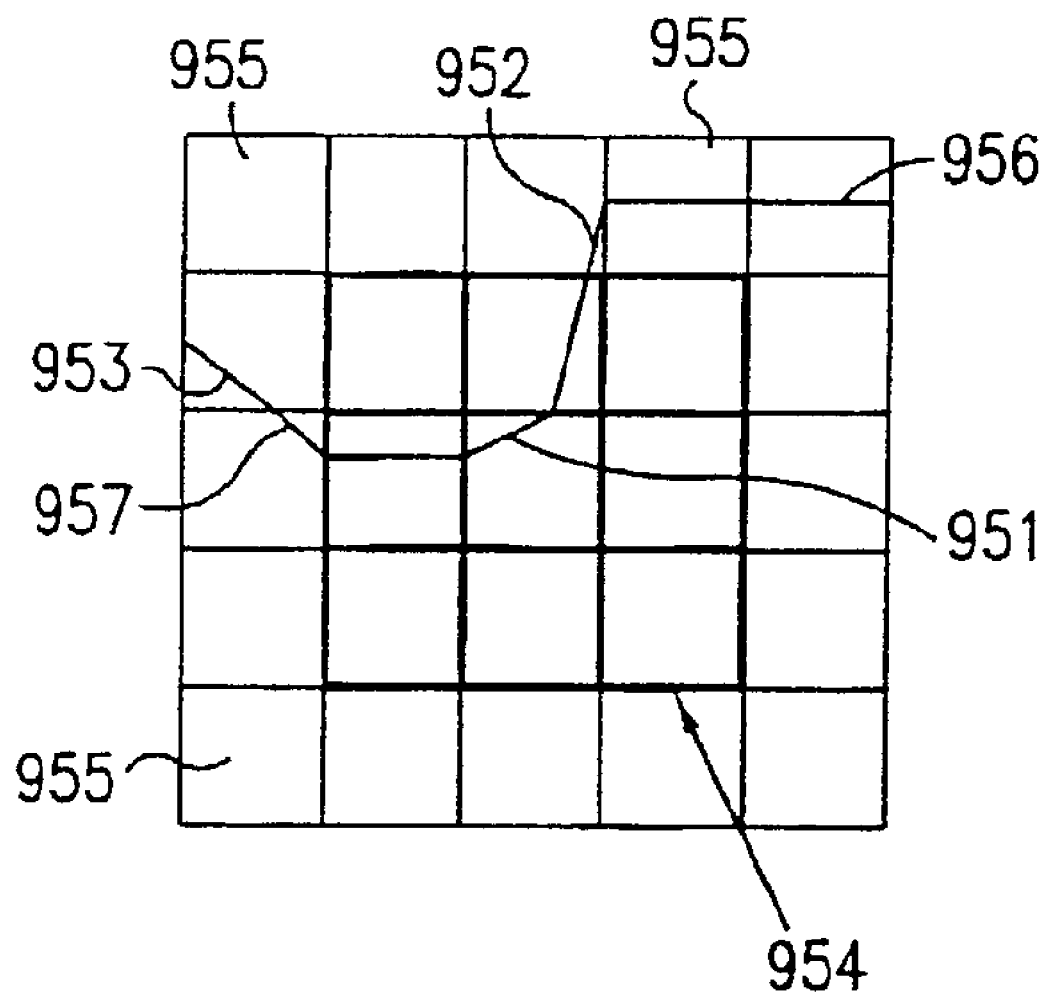
FIG. 36 is a simplified pictorial illustration of an array of virtual cel pixels useful in understanding the method of step 950 of FIG. 33B.

A preferred method for finding the edge cels in step 950 comprises the following. Reference is now additionally made to FIG. 36, which is a simplified pictorial illustration of an array of cel virtual pixels, useful in understanding step 950 of FIG. 33B. In the example of FIG. 36, a cel currently being analyzed or central cel 951 is known. A first shoulder cel 952 and second shoulder cel 953 are to be determined.

Preferably, 3×3 connectivity analysis is first performed on nine central virtual cel pixels 954, comprising the virtual pixel of the central cel 951 and the eight first order neighbors thereof. The purpose of the connectivity analysis is to assign a type to the contour being inspected, typically in accordance with the following:

| Connectivity type | Connectivity code |
| --- | --- |
| Main diagonal | 0 |
| Secondary diagonal | 1 |
| Vertical | 2 |
| Horizontal | 3 |
| Upper left | 4 |
| Upper right | 5 |
| Bottom left | 6 |
| Bottom right | 7 |
| No connectivity | 8 |
| Defective contour | 15 (0Fx) |

Figure 37A:
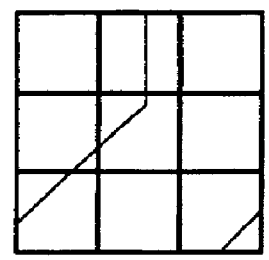
FIGS. 37A and 37B are simplified pictorial illustrations of examples of contours.
Figure 37B:
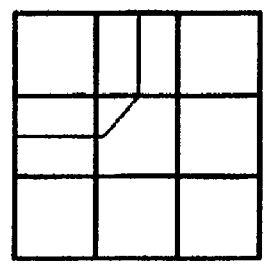

Reference is now made to FIGS. 37A and 37B, which comprise simplified pictorial illustrations of examples of contours, helpful in understanding the above table. FIG. 37A comprises an example of a defective contour, which is generally determined to exist when more than one contour is found. FIG. 37B comprises an example of an upper left contour, similar to that depicted in FIG. 36.

Preferably, analysis of connected components, such as connected cels, of the 16 edge virtual cel pixels 955 is performed. Referring back to the example of FIG. 36, first and second contours are, for example, found in the 16 edge virtual cel pixels 955. The following logic is then preferably applied, where n represents the number of distinct contours found in the 16 edge virtual cel pixels 955:

| n | Operation |
| --- | --- |
| 0 or 1 | unconnected contour found, do not report |
| 2 or 3 | proceed as described below |
| >3 | report defective contour (space violation or nick/protrusion) |

Next, two contours of the contours previously found are selected as most likely to be connected together, preferably based on distance measures, so that the two contours closest to the central contour located in the nine central virtual cel pixels 954 are preferably used.

Preferably, the two cels of the two selected contours which are closest to each other, according to Euclidean distance, are found and reported as the shoulders of the suspected contour. For example, the first shoulder cel 952 and the second shoulder cel 953 in FIG. 36 are determined by the above-described method.

Referring back to FIG. 33B, three characterizing points, based on the two edge cels determined in step 950 and the midpoint determined in step 940, are, in a preferred embodiment of the present invention, transformed for simplicity of further processing (step 960). It is appreciated that, in another embodiment of the present invention, step 960 may be omitted, since step 960 is present primarily to aid in efficient computation. It is appreciated that the central cel may be characterized by 4 bits of information, while the two edge cels can each be characterized by 4 bits of location information and 4 bits of cel address information, for a total of 20 bits of information. By performing a rigid transformation to the three points, shifting the central cel midpoint to the center of the central cel virtual pixel or to another appropriate fixed point whose location is known a priori, less data is needed. Typically, 4 bits of information may be omitted, thus requiring only 16 bits of information.

Figure 38:
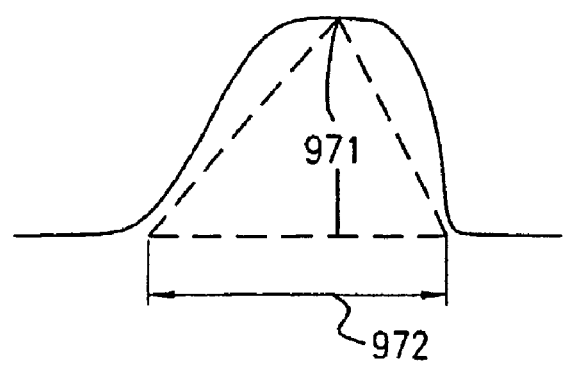
FIG. 38 is a simplified pictorial illustration of a typical example of a protrusion.

Feature depth and aperture are now determined based on the transformed points as transformed in step 960 (step 970). Preferably, the depth and aperture are determined via a LUT based on the 16 bits of information described above with reference to step 960, based on a depth measurement from the bottom right corner of the central cel virtual pixel to a line connecting the first and last cels. Reference is now additionally made to FIG. 38, which is a simplified pictorial illustration of a typical example of a protrusion, showing a depth 971 and aperture 972 thereof.

Figure 39A:
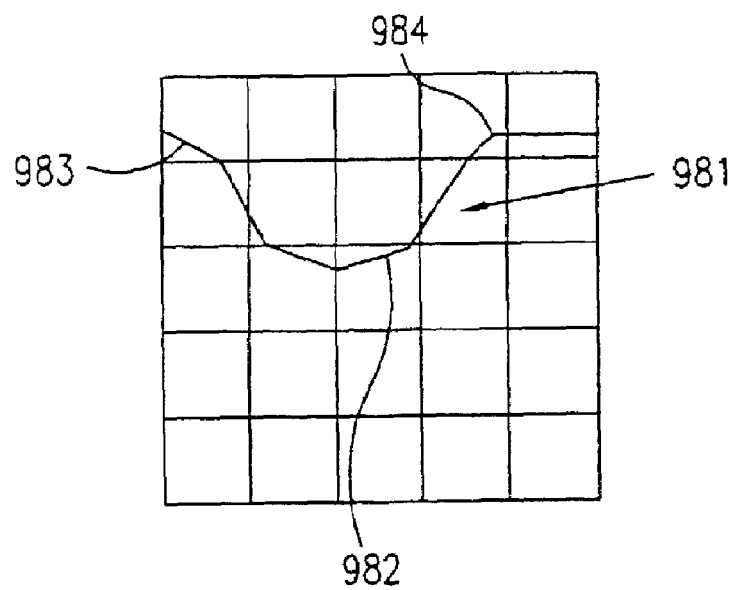
FIGS. 39A and 39B are simplified pictorial illustrations of an array of virtual cel pixels, useful in understanding step 980 of FIG. 33B.
Figure 39B:
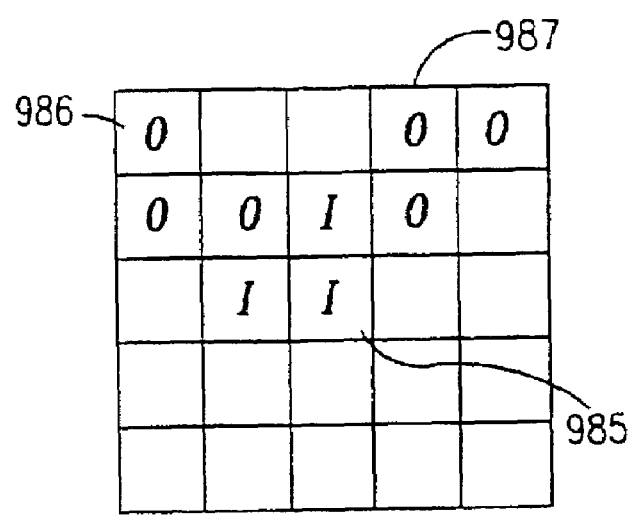

Reference is now made to FIG. 39A, which is a simplified pictorial illustration of an array of virtual cel pixels, useful in understanding step 980 of FIG. 33B. The array of FIG. 39A comprises an inspected contour 981, having a central virtual cel pixel 982, a first shoulder 983, and a last shoulder 984. Reference is additionally made to FIG. 39B, which is a simplified pictorial illustration of the array of virtual cel pixels of FIG. 39A, showing locations of "in" and "out" break reports, denoted by "I" and "O" respectively, associated with analysis of the inspected contour 981. Preferably, only break reports 985, 986, and 987, corresponding respectively to the central pixel 982, the first shoulder 983, and the last shoulder 984, are input into step 980, described below.

Step 980 preferably receives output both from step 925 and from step 930, both described above. Preferably, in step 980 a result is determined based on the input received from steps 925 and 930 by implementing a decision table, typically comprising a LUT. The result of step 980 is preferably determined from an appropriate LUT. Typically, input to the LUT includes contour depth and aperture; and breaks recorded in the center of the contour and on the shoulders thereof, also referred to as central, first, and last breaks respectively. The results of the LUT typically comprise one of the following: nick; protrusion; corner; no report. The LUT implements an appropriate method, typically comprising a brute force decision method, comprising a series of logical operations leading to a decision. Preferred logical operations may be described in heuristics such as, for example:

a break sequence in-in-in indicates a corner but may be reported as a protrusion if its depth greatly exceeds a depth threshold such as, for example, more than twice a depth threshold;

a break sequence in-out-in indicates a nick and will be reported as a nick if a minimal nick depth threshold is exceeded; and a break sequence of none-out-in is reported (where the term "none" refers to a case where no break is reported) only if its depth is great enough and its width is narrow enough.

Typically, depth thresholds are specific to the application or to the type of object being examined, and might typically vary between ¾ of a pixel and 2 or 3 pixels, while aperture threshold are typically 2.5 pixels in width.

The results of step 980 are preferably reported, the results comprising the report of nick/protrusion detection, and may be post processed to produce a report, typically comprising a trigger for such post processing. The results, as described above, may typically comprise: nick; protrusion; corner; or no report.

Figure 39C:
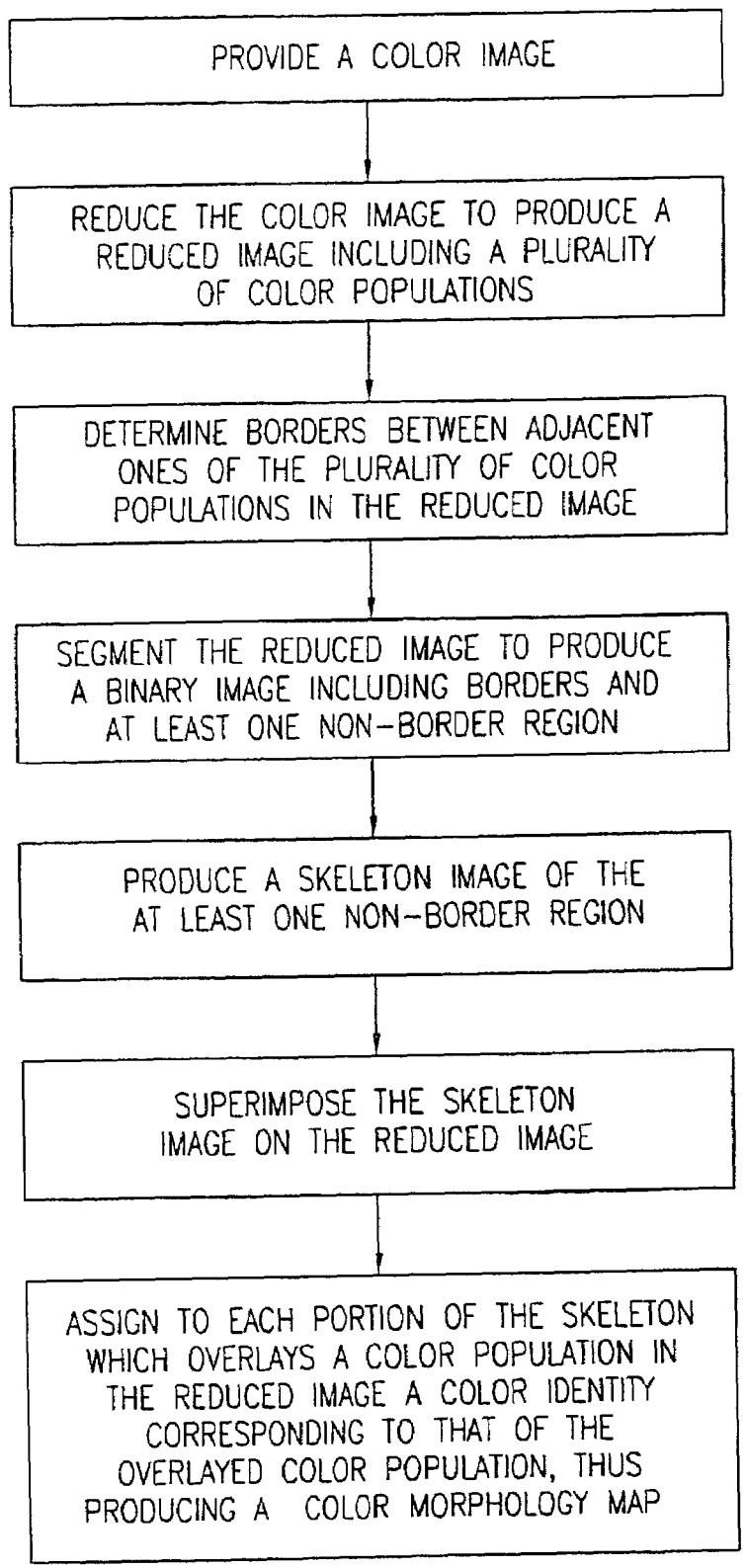
FIGS. 39C and 39D are simplified flowchart illustrations of methods useful in conjunction with the system of FIG. 1.
Figure 39D:
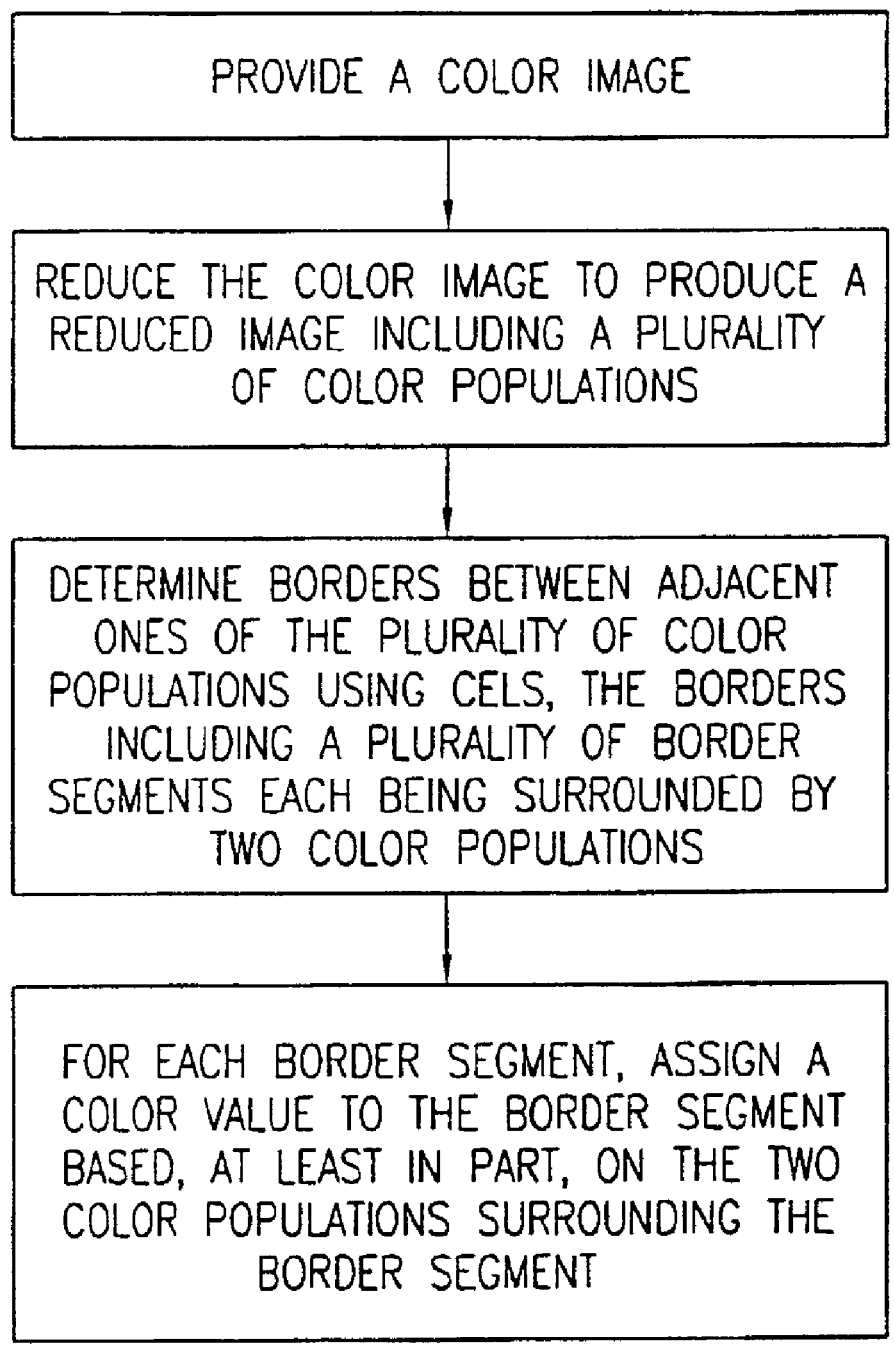

Reference is now made to FIGS. 39C and 39D, which are simplified flowchart illustrations of methods useful in conjunction with the system of FIG. 1. The method of FIG. 39C comprises a method for producing a color morphology map from a color image. The method of FIG. 39D comprises a method for determining color cels in a color image. The methods of FIGS. 39C and 39D are self-explanatory in light of the above description.

Figure 40:
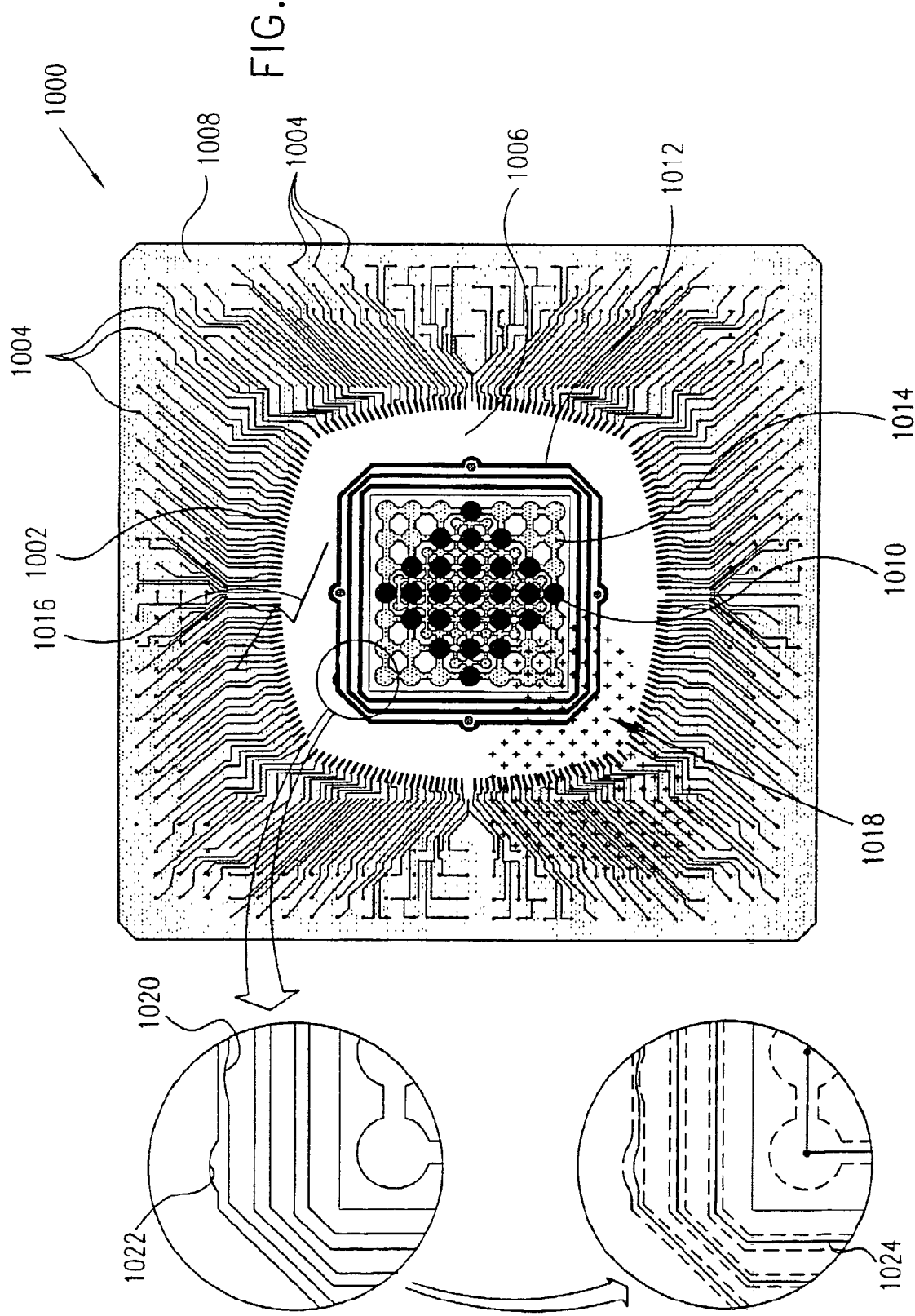
FIG. 40 is a simplified pictorial illustration of an example of an electrical circuit, useful for understanding the operation of the present invention.

Reference is now made to FIG. 40, which is a simplified pictorial illustration of an example of a patterned article such as an electrical circuit, useful for understanding the operation of the present invention. The apparatus of FIG. 40 is intended to provide a particular example of an object which may be analyzed using the present invention. The example of FIG. 40 is not meant to be limiting.

The apparatus of FIG. 40 comprises an electrical circuit 1000, comprising in the example of FIG. 40 a ball grid array (BGA) substrate. The BGA 1000, as is well known in the art, typically comprises: regions of copper conductor, regions of copper conductor which are covered by a partially transparent or translucent coating such as a solder mask 1004, regions of bare substrate 1006, regions of substrate covered by partially transparent or translucent solder mask 1008, regions of copper conductor coated with a metal plating such as gold, for example balls 1010 and power lines 1012. Additionally, some of the regions plated with gold may also be covered by partially transparent or translucent solder mask, such as covered balls 1014.

It is appreciated that each of the regions of different materials and materials combinations described hereinabove are characterized by a different distinguishing color population. For example, regions of bare copper and gold plated copper are distinguishable by color. Solder-mask is typically green, and copper covered by solder mask will typically be light green, gold plated copper covered by solder mask will be very light green, and substrate covered by solder mask will be dark green. In the preferred embodiments of the invention described hereinabove, each of the different populations can be identified, and binary cels, color cels and color morphology features can be produced to represent each of the regions.

It will also be appreciated by persons skilled in the art that a patterned article as a BGA may be analyzed, including being analyzed for various surface defects such as, for example, scratches 1016 and surface defects 1018, for example stains, pits, and other defects, using the present invention.

The inventors have found that it may be desirable to further process some regions of a BGA in an external processing step, regardless of whether a defect is detected in that area. For example, some regions may be defined by a user, and some regions may be associated with particular features. Thus, for example, in some regions of interest at particular locations, such as regions of power-lines or balls, a snapshot image is preferably generated, and provided for additional image processing, regardless of whether any particular feature or defect is found in that region. Additionally and alternatively, upon the detection of certain features, for example an open end in a gold plated copper connector, regardless of where located on the BGA, a snapshot image is preferably generated, and provided for additional image processing, regardless of location or whether any particular defect is found with respect to the feature.

In order to identify features, a cel map may be generated, a part of which is shown in FIG. 40, which may be used for further processing. The cel map may identify both contours, and correlate each contour to the existence of a material on either side thereof, for example gold plated copper on one side and substrate on the other side, as would be the result for power lines 1012. The cels are preferably operated on directly to detect nicks 1020 and protrusions 1022.

Using the present invention, a morphology map is also generated, a part of which is shown in FIG. 40, in which a morphology skeleton is produced for the object. In the morphology map, a skeleton 1024 of the features is generated, and the skeleton 1024 is preferably correlated to a particular material. Thus, for example, features on skeleton 1024, which represents a region of power line 1024 would be correlated to gold plated copper.

Referring back to FIG. 1, as described above the image analysis system 100 is preferably operative to analyze an input image and to pass results of the analysis on for further processing. Preferably, as further described in detail above with reference to FIGS. 1–40 for the various components of the image analysis system 100, results of the analysis which are made available for further processing include:

1. information characterizing defects: surface defects; nick and protrusion defects; and defective color contour elements (cels).

2. information characterizing the article being expected: binary cels, a skeleton, skeleton features, a color skeleton, and color cels.

3. a snapshot, typically comprising a color RGB snapshot, of an area around each region of interest, for example around each predetermined type of feature, such as power lines 1012 and balls 1010 (FIG. 40), each user defined area, and each defect.

Without limiting the generality of the foregoing, each of the lists of results immediately above are typically output in separate data channels for further processing as desired. Preferably, the separate data channels comprise two physical channels as follows:

A first channel preferably includes the following reports and data:

A report of binary cels;

a report of color cels;

a report of morphological and skeleton features; and a report of defects such as nicks and protrusions.

A second channel preferably includes the following reports and data:

A color defect report indicating reports of color surface defects from the COMRADD 190 and gray surface defects from the CABS unit 130; and a snapshot report including snapshots of regions of interest, for example, each region of reported defect, each morphological feature of interest and each user defined region of interest.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. An automated optical inspection device suitable for inspection of an article, comprising:

at least one detector providing a polychromatic image output of at least a portion of an article; and processing circuitry receiving said polychromatic image output and providing edge detection to sub-pixel accuracy operative to distinguish borders among regions of different color wherein said processing circuitry is operative to distinguish a border between a first color region associated with a first color population and a second color region associated with a second color population by identifying an approximate border location between said first color region and said second color region and determining a location of a border between said first color region and said second color region by using a preferred method for identifying the location of a border between said first color population and said second color population.

2. An automated optical inspection device according to claim 1, wherein said polychromatic image output comprises a color image represented using a color image representation method having a plurality of color defining characteristics, and each said preferred method is selected from a plurality of available methods, and the plurality of available methods includes, for each color defining characteristic within the plurality of color defining characteristics, a method comprising performing an edge locating method in a component of the color image associated with said color defining characteristic.

3. An automated optical inspection device according to claim 2 and wherein the edge locating method comprises a sub-pixel contour-element locating method.

4. An automated optical inspection device suitable for inspection of an article, comprising:

at least one detector providing an image output of at least a portion of an article having at least three different regions, each of which regions is distinguished at least by an optical characteristic detectable by said detector; and processing circuitry receiving said image output and providing edge detection to sub-pixel accuracy operative to distinguish borders of at least two of said at least three different regions, wherein said processing circuitry receives said image output and provides edge detection to sub-pixel accuracy operative to distinguish borders of said at least three different regions.

5. An automated optical inspection device according to claim 4 and wherein said processing circuitry provides mapping based at least partially on said image output which identifies materials in each of said different regions having a common border.

6. An automated optical inspection device suitable for inspection of an article comprising:

at least one detector providing a polychromatic image output of at least a portion of an article;

processing circuitry receiving said polychromatic image output and providing at least one of the following inspection functionalities:

segmentation of said polychromatic image into a segmented color image comprising a plurality of color regions each having one of a plurality of representative color possibilities;

binarization of the segmented color image into a binary image including regions and borders;

morphological erosion of the regions to provide a skeleton representing the regions; and assignment of color regions to elements in the skeleton;

wherein the processing circuitry is operative to superimpose the skeleton and the segmented color image, and to assign data representative of regions to elements in the skeleton as a function of the superimposition.

7. An automated optical inspection device according to claim 6 and wherein the processing circuitry is operative to assign data representative of regions to elements in the skeleton the superimposed location of an element of the skeleton in a color region.

8. An automated optical inspection device suitable for inspection of an article, comprising:

at least one detector providing a polychromatic image output of at least a portion of an article, said article comprising an electrical circuit formed on a printed circuit board; and processing circuitry receiving said polychromatic image output and providing a color image representing said article, the color image comprising a map which indicates borders between different regions of an article and identifies materials in each of said different regions having a common border said different regions including uncoated metal conductors, coated metal conductors, uncoated substrate, and coated substrate.

9. An automated optical inspection device according to claim 8 and wherein colors of portions of said map indicate materials at various regions of the article.

10. An automated optical inspection device according to claim 9 and wherein each color comprises a color chosen from among a predetermined possibility of colors.

11. An automated optical inspection device according to claim 8 and wherein said processing circuitry receives said image output and provides border indication to sub-pixel accuracy.

12. An automated optical inspection device according to claim 8 and wherein the electrical circuit comprises a ball grid array substrate.

13. An automated optical inspection device according to claim 8 and wherein the patterned article comprises a lead frame.

14. An automated optical inspection device according to claim 8 and wherein the different materials include different metals.

15. An automated optical inspection device according to claim 8 and wherein the patterned article comprises an etched metal substrate.

16. An automated optical inspection device according to claim 8 and wherein the patterned article comprises an engraved metal substrate.

17. An automated optical inspection device suitable for inspection of a patterned article, comprising:
- at least one detector providing an image output of at least a portion of a patterned article comprising a plurality of materials having detectable borders between the plurality of materials said plurality of materials comprising at least three materials; and
- processing circuitry receiving said image output and providing an inspection functionality comprising pattern analysis of image data relating to the borders to provide an indication of the presence of nicks and protrusions along said borders.

18. An automated optical inspection device according to claim 17 and wherein said patterned article comprises an electrical circuit.

19. An automated optical inspection device according to claim 18 and wherein said patterned article comprises a printed circuit board.

20. An automated optical inspection device according to claim 19 and wherein said printed circuit board comprises a ball grid array substrate.

21. An automated optical inspection device according to claim 18 and wherein said patterned article comprises a lead frame.

22. An automated optical inspection device according to claim 18 and wherein said patterned article comprises an etched metal substrate.

23. An automated optical inspection device according to claim 18 and wherein the patterned article comprises an engraved metal substrate.

24. An automated optical inspection device according to claim 17 and wherein said materials include materials from the following group: uncoated metal conductors, coated material conductors, uncoated substrate, coated substrate.

25. An automated optical inspection device according to claim 17 and wherein said inspection functionality comprising pattern analysis includes:
- identifying an ordered plurality of points along a border defined by the image data relating to the borders, each of said ordered plurality of points having at least one neighboring point in the ordered plurality of points;
- determining a normal direction to the smooth curve at each of said ordered plurality of points; and
- identifying a point of said ordered plurality of points as being part of an irregularity comprising one of a nick and a protrusion based, at least in part, on a local normal difference comprising a difference between the normal direction to the smooth curve at said point and a normal direction to the smooth curve at said at least one neighboring point of said point.

26. An automated optical inspection device suitable for inspection of an electrical circuit, comprising:
- at least one detector providing an image output of at least a portion of an electrical circuit comprising multiple materials; and
- processing circuitry receiving said image output and providing an output indication of the presence of at least one predetermined material, said processing circuitry providing an output indication of the presence of at least two materials out of a group of at least three predetermined materials.

27. An automated optical inspection device according to claim 26 and wherein said electrical circuit comprises a printed circuit board.

28. An automated optical inspection device according to claim 27 and wherein said printed circuit board comprises a ball grid array substrate.

29. An automated optical inspection device according to claim 28 and wherein said electrical circuit comprises a flat panel display substrate.

30. An automated optical inspection device according to claim 26 and wherein said processing circuitry provides an output indication of the presence of at least three predetermined materials.

31. An automated optical inspection device according to claim 26 and wherein said processing circuitry provides an output indication of the presence of copper.

32. An automated optical inspection device according to claim 26 and wherein said processing circuitry provides an output indication of the presence of gold.

33. An automated optical inspection device according to claim 26 and wherein said processing circuitry provides an output indication of the presence of a solder mask material.

34. An automated optical inspection device according to claim 26 and wherein said processing circuitry provides an output indication of the presence of silver.

35. An automated optical inspection device according to claim 26 and wherein said processing circuitry provides an output indication of the presence of photoresist residue.

36. An automated optical inspection device according to claim 26 and wherein said processing circuitry provides an output indication of the presence of oxidized metal.

37. An automated optical inspection device according to claim 26 and wherein said image output represents a portion of the electrical circuit as viewed through a translucent overlay.

38. An automated optical inspection device suitable for inspection of a patterned article, comprising:
- at least one detector providing an image output of at least a portion of a patterned article through a translucent overlay at least partially covering the patterned article; and
- processing circuitry receiving said image output and providing an output indication which is independent of the translucent overlay, said processing circuitry being operative to provide an indication of parts of the pattern covered by the translucent overlay and parts of the pattern not covered by the translucent overlay.

39. An automated inspection device according to claim 38 and wherein the patterned article comprises an electrical circuit.

40. An automated inspection device according to claim 39 and wherein the electrical circuit comprises a printed circuit board.

41. An automated inspection device according to claim 40 and wherein the printed circuit board comprises a ball grid array substrate.

42. Apparatus for automatically optically inspecting color images of objects, comprising:
- a sensor operative to acquire polychromatic images of an object;

an image processor operative to process the polychromatic images and output a report indicating candidate defects and features chosen from among a predetermined set of features, and to provide an image of a region surrounding each said candidate defect and feature, said image processor including a binary image processor operative to process binary images generated from the polychromatic image, and a color image processor operative to process the polychromatic images.

43. Apparatus according to claim 42 and further comprising a morphological image processor operative to generate a skeleton map from a multicolor image derived from the polychromatic image.

44. An automated optical inspection device suitable for inspection of an article and comprising:
  at least one detector providing an image output of at least a portion of an article having at least three different regions, each of which regions is distinguished at least by an optical characteristic detectable by said detector; and
  processing circuitry receiving said image output and providing edge detection to sub-pixel accuracy operative to distinguish borders of at least two of said at least three different regions, wherein said processing circuitry provides mapping based at least partially on said image output which identifies materials in each of said different regions having a common border.

45. An automated optical inspection device suitable for inspection of an article comprising:
  at least one detector providing a polychromatic image output of at least a portion of an article;
  processing circuitry receiving said polychromatic image output and providing at least one of the following inspection functionalities:
  segmentation of said polychromatic image into a segmented color image comprising a plurality of color regions each having one of a plurality of representative color possibilities;
  binarization of the segmented color image into a binary image including regions and borders;
  morphological erosion of the regions to provide a skeleton representing the regions; and
  assignment of color regions to elements in the skeleton;
  wherein the processing circuitry is operative to assign data representative of regions to elements in the skeleton the superimposed location of an element of the skeleton in a color region.

46. An automated optical inspection device suitable for inspection of an article comprising:
  at least one detector providing a polychromatic image output of at least a portion of an article; and
  processing circuitry receiving said polychromatic image output and providing a color image representing said article, the color image comprising a map which indicates borders between different regions of an article and identifies materials in each of said different regions having a common border, said different materials including different metals.

47. An automated optical inspection device suitable for inspection of a patterned article comprising:
  at least one detector providing an image output of at least a portion of a patterned article comprising a plurality of materials having detectable borders between the plurality of materials, said materials include materials from the following group: uncoated metal conductors, coated material conductors, uncoated substrate, coated substrate; and
  processing circuitry receiving said image output and providing an inspection functionality comprising pattern analysis of image data relating to the borders to provide an indication of the presence of nicks and protrusions along said borders.

48. An automated optical inspection device suitable for inspection of a patterned article comprising:
  at least one detector providing an image output of at least a portion of a patterned article comprising a plurality of materials having detectable borders between the plurality of materials; and
  processing circuitry receiving said image output and providing an inspection functionality comprising pattern analysis of image data relating to the borders to provide an indication of the presence of nicks and protrusions along said borders, said inspection functionality comprising pattern analysis including:
  identifying an ordered plurality of points along a border defined by the image data relating to the borders, each of said ordered plurality of points having at least one neighboring point in the ordered plurality of points;
  determining a normal direction to the smooth curve at each of said ordered plurality of points; and
  identifying a point of said ordered plurality of points as being part of an irregularity comprising one of a nick and a protrusion based, at least in part, on a local normal difference comprising a difference between the normal direction to the smooth curve at said point and a normal direction to the smooth curve at said at least one neighboring point of said point.

* * * * *